(12) United States Patent
Hashimoto et al.

(10) Patent No.: US 11,352,270 B2
(45) Date of Patent: Jun. 7, 2022

(54) POROUS MEMBRANE FOR MEMBRANE DISTILLATION, AND METHOD FOR OPERATING MEMBRANE DISTILLATION MODULE

(71) Applicant: Asahi Kasei Kabushiki Kaisha, Tokyo (JP)

(72) Inventors: Tomotaka Hashimoto, Tokyo (JP); Hiroyuki Arai, Tokyo (JP); Kazuto Nagata, Tokyo (JP); Noboru Kubota, Tokyo (JP); Hiroki Takezawa, Tokyo (JP); Takehiko Otoyo, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/495,876

(22) PCT Filed: Mar. 23, 2018

(86) PCT No.: PCT/JP2018/011892
§ 371 (c)(1),
(2) Date: Sep. 20, 2019

(87) PCT Pub. No.: WO2018/174279
PCT Pub. Date: Sep. 27, 2018

(65) Prior Publication Data
US 2020/0109070 A1    Apr. 9, 2020

(30) Foreign Application Priority Data

Mar. 24, 2017  (JP) .............................. JP2017-060155
Mar. 31, 2017  (JP) .............................. JP2017-071569
(Continued)

(51) Int. Cl.
*C02F 1/44* (2006.01)
*B01D 61/36* (2006.01)
(Continued)

(52) U.S. Cl.
CPC ............ *C02F 1/447* (2013.01); *B01D 61/364* (2013.01); *B01D 61/366* (2013.01); *B01D 69/02* (2013.01); *B01D 69/081* (2013.01); *B01D 71/26* (2013.01)

(58) Field of Classification Search
CPC ....... C02F 1/447; B01D 61/364; B01D 71/26; B01D 69/081; B01D 69/02; B01D 61/366;
(Continued)

(56) References Cited

U.S. PATENT DOCUMENTS 3,477,917 A * 11/1969 Rodgers ............... B01D 61/364
203/10
5,022,990 A   6/1991 Doi et al.
(Continued)

FOREIGN PATENT DOCUMENTS

CN   102471099 A   5/2012
CN   106076121 A   11/2016
(Continued)

OTHER PUBLICATIONS

Supplementary European Search Report issued in corresponding European Patent Application No. 18772255.8 dated Apr. 1, 2021.
(Continued)

*Primary Examiner* — Krishnan S Menon
(74) *Attorney, Agent, or Firm* — Morgan, Lewis & Bockius LLP

(57) ABSTRACT

A membrane distillation device, provided with a membrane distillation module including a plurality of hydrophobic porous hollow fiber membranes, and a condenser for condensing water vapor extracted from the module. The average pore diameter of the porous hollow fiber is 0.01-1 μm. The filling ratio of the porous hollow fiber of the membrane distillation module is 10-80%, and the pressure condition for
(Continued)

the membrane distillation is equal to or greater than 1 kPa and equal to or less than the saturated vapor pressure of water at the temperature of the water being treated.

12 Claims, 18 Drawing Sheets

(30) Foreign Application Priority Data

| Mar. 31, 2017 | (JP) | ................................ | JP2017-071574 |
|---|---|---|---|
| Mar. 31, 2017 | (JP) | ................................ | JP2017-071589 |
| Mar. 31, 2017 | (JP) | ................................ | JP2017-071633 |
| Mar. 31, 2017 | (JP) | ................................ | JP2017-071644 |
| Mar. 31, 2017 | (JP) | ................................ | JP2017-071676 |
| May 24, 2017 | (JP) | ................................ | JP2017-102927 |
| May 24, 2017 | (JP) | ................................ | JP2017-102943 |
| May 24, 2017 | (JP) | ................................ | JP2017-102946 |
| May 24, 2017 | (JP) | ................................ | JP2017-102952 |
| May 24, 2017 | (JP) | ................................ | JP2017-102953 |
| May 24, 2017 | (JP) | ................................ | JP2017-102965 |
| May 24, 2017 | (JP) | ................................ | JP2017-102973 |

(51) Int. Cl.
  *B01D 71/26* (2006.01)
  *B01D 69/08* (2006.01)
  *B01D 69/02* (2006.01)

(58) Field of Classification Search
  CPC ............ B01D 67/0088; B01D 2325/38; B01D 2325/02; B01D 69/12; B01D 63/02; Y02W 10/37
  See application file for complete search history.

(56) References Cited

U.S. PATENT DOCUMENTS

| 8,353,981 B2 | 1/2013 | Chen et al. | |
|---|---|---|---|
| 2003/0111416 A1 | 6/2003 | Kubota et al. | |
| 2006/0213757 A1* | 9/2006 | Yang | ........................ B01D 3/14 203/1 |
| 2011/0017666 A1 | 1/2011 | Cath et al. | |
| 2011/0180479 A1 | 7/2011 | Cordatos et al. | |
| 2011/0272354 A1 | 11/2011 | Mitra et al. | |
| 2012/0103904 A1 | 5/2012 | Morita et al. | |
| 2012/0234745 A1* | 9/2012 | Jerman | ............. B29C 66/53261 210/321.8 |
| 2015/0041127 A1 | 2/2015 | Kuki et al. | |
| 2015/0096935 A1 | 4/2015 | Mitra et al. | |
| 2016/0002151 A1 | 1/2016 | Dubois et al. | |
| 2016/0031727 A1 | 2/2016 | Yamaguchi et al. | |
| 2016/0038879 A1 | 2/2016 | Yamaguchi et al. | |
| 2016/0089638 A1 | 3/2016 | Schuster et al. | |
| 2017/0173536 A1* | 6/2017 | Nagata | ................... B01D 63/02 |

FOREIGN PATENT DOCUMENTS

| EP | 0882493 A2 | 12/1998 |
|---|---|---|
| JP | S55-163028 U | 11/1980 |
| JP | S55-159808 A | 12/1980 |
| JP | H01-293104 A | 11/1989 |
| JP | H03-008800 U | 1/1991 |
| JP | H03-215535 A | 9/1991 |
| JP | H05-161832 A | 6/1993 |
| JP | H05-051432 U | 7/1993 |
| JP | H06-226066 A | 8/1994 |
| JP | 2010-075808 A | 4/2010 |
| JP | 2011-218247 A | 11/2011 |
| JP | 2013-185127 A | 9/2013 |
| JP | 2015-100775 A | 6/2015 |
| JP | 2016-087545 A | 5/2016 |
| JP | 2016-520535 A | 7/2016 |
| JP | 2016-523698 A | 8/2016 |
| JP | 2016-190220 A | 11/2016 |
| WO | 01/53213 A1 | 7/2001 |
| WO | 2008/088293 A1 | 7/2008 |
| WO | 2015/080125 A1 | 6/2015 |
| WO | 2016/006670 A1 | 1/2016 |
| WO | 2016/172539 A1 | 10/2016 |
| WO | 2019/006670 A1 | 1/2019 |

OTHER PUBLICATIONS

Jeong et al., "Nanostructured PVDF membrane for MD application by an O2 and CF4 plasma treatment," Desalination, 399: 178-184(2016).
International Search Report issued in corresponding International Patent Application No. PCT/JP2018/011892 dated Jun. 19, 2018.
International Preliminary Report on Patentability and Written Opinion issued in corresponding International Patent Application No. PCT/JP2018/011892 dated Oct. 3, 2019.
Supplementary Partial European Search Report issued in corresponding European Patent Application No. 18772255.8 dated Dec. 9, 2020.
Peng, ed., Chemical Engineering and Technology, 1st. edition, p. 128 (2013) (see English summary).
Yan Junfeng ed., "Experiment 15 X-ray Photoelectron Spectroscopy (XPS) Analysis of Electronic Materials," in Electronic Materials and Devices Experiment Course, 58-60 (2016).

* cited by examiner (a)

(b)

C1s spectrum in Survey Scan

POROUS MEMBRANE FOR MEMBRANE DISTILLATION, AND METHOD FOR OPERATING MEMBRANE DISTILLATION MODULE

FIELD

The present invention relates to a membrane distillation module and to a membrane distillation device that includes it. More specifically, the invention relates to a membrane distillation module wherein a bundle of a plurality of hydrophobic porous hollow fiber membranes with through-holes is housed in a cylindrical container, water to be treated is passed through the hollow fiber membrane interiors, and water vapor that has exited from the outer side is cooled and condensed and recovered as permeated water, as well as to a membrane distillation device using the same.

BACKGROUND

Membrane distillation (MD) is a method in which a hydrophobic porous membrane that allows permeation of only the water vapor of water to be treated is used, whereby water vapor that has passed through the hydrophobic porous membrane from heated high-temperature water to be treated (hereunder also referred to as "raw water") is cooled and condensed by the difference in saturated water vapor pressure, and the condensed water is collected as permeated water. Specifically, a membrane distillation method is a technique for separating solutes (salts) and water in water to be treated, with the driving force being the difference in vapor pressure created through the hydrophobic porous membrane, and it may also be considered to be a technique for distilling and purifying water through a porous membrane. Since the driving force for separation in a membrane distillation method is the vapor pressure difference, high pressure is not required and it is thus possible to reduce power energy compared to a reverse osmosis method in which purified water is obtained by applying pressure to raw water and filtering it through a reverse osmosis membrane, and furthermore since solutes do not permeate the membrane, as only the water vapor permeates the membrane, it is possible to obtain very highly pure permeated water and to utilize low-temperature exhaust heat (60 to 70° C.), thus allowing high heat utilization efficiency to be achieved.

Also, as the solute concentration of raw water increases in a reverse osmosis method, the pressure required for water production increases drastically, which places limitations on the solute concentration to which raw water can be concentrated. In a membrane distillation method, water can be produced from raw water with a higher solute concentration than by a reverse osmosis method, and therefore the solutes in raw water can be concentrated to a higher degree.

Since using a membrane distillation method allows high-purity water to be obtained and allows solutes in raw water to be concentrated to a high degree, as explained above, membrane distillation methods may be used not only for production of high-purity water but also for volume reduction of water to be treated and recovery of valuable substances for which waste treatment methods are not suitable. Despite these advantages of membrane distillation methods, in order to obtain high-purity water by membrane distillation methods it is still essential for the components of raw water passing through the membrane to not leak to the permeated water side. If leakage of the raw water components is substantial, then not only is the purity of the obtained permeated water reduced, but the membrane or apparatus also tends to undergo degradation, thus shortening the usable life of the apparatus as a whole.

Water to be treated and water containing valuable substances may also contain organic components such as oils and surfactants. It is therefore preferred for water containing organic components to be purified and concentrated by membrane distillation methods as well. However, when the surface tension of water to be treated is reduced by organic components, it can cause wetting of the interiors of the pores of the porous membrane used for the membrane distillation and passage through the interior of the pores, thus causing leakage from the side of the membrane that contacts the water to be treated through to the other side, a phenomenon known as "wetting". Adhesion of water-insoluble components such as oils is another cause of wetting. When wetting occurs, raw water mixes with the purified water and fouls the purified water, while also making it difficult for the raw water to be concentrated. That is, wetting prevents the function of membrane distillation from being achieved.

The first way to avoid wetting is for the membrane to prevent passage of raw water. For water to be treated that contains organic components such as oils and surfactants, it is also effective to use oil adsorbents and activated carbon for pretreatment to remove the organic components, but pretreatment is expensive and also leads to increased waste matter or reduced recovery of valuable substances. For this reason, there is a demand for a porous membrane for membrane distillation that does not allow permeation of raw water components, and that is resistant to wetting even by water to be treated that contains organic components.

For water production and concentration of raw water by membrane distillation, the volume of water that can be treated per unit time is also an important factor. A greater membrane unit area, i.e. volume of water that can be treated per module, lowers the cost of water production or concentration. This has created a demand for porous membranes, modules and apparatuses for membrane distillation that have high treatable water volumes.

Hydrophobic porous membranes used in membrane distillation methods, on the other hand, are not limited to hollow fiber membranes and can also employ flat membranes, although hydrophobic porous hollow fiber membrane bundles are generally used to increase the compactness of the membrane distillation device as a whole, and to increase the throughput per unit volume of the membrane distillation module including the membranes, which are the main members of the membrane distillation device. When a hydrophobic porous hollow fiber membrane is used, it may employ a system in which high-temperature water to be treated is passed through from the inner side of the hollow fiber membrane and water vapor is collected on the outer side, or conversely, a system in which high-temperature water to be treated is passed through from the outer sides of hollow fibers and water vapor is collected on the inner sides, but in either case, from the viewpoint of cost reduction there is a need to increase the throughput per unit volume of the membrane distillation module to lower running costs. The membrane distillation module has a certain lifetime since it uses a porous membrane, and it is either disposable or is regenerated when possible.

In a membrane distillation method, as mentioned above, the phenomenon in which liquid to be treated flows from the side of the membrane that contacts with the liquid to be treated to the other side, as the hole surfaces inside the porous membrane become wetted with liquid (hereunder referred to as "wetting" or "water leakage") causes problems of contamination of raw water into the permeated water, and lower water throughput capacity and water throughput capacity retention of the membrane, and certain types of water to be treated are more prone to causing wetting, such as raw water with low surface tension, raw water containing surfactants, raw water containing components that hydrophilicize the membrane, and raw water containing large amounts of oils or organic substances.

Measures to counter this problem are described in PTLs 1 and 2, which teach that the pore diameter or surface opening ratio of a hydrophobic porous membrane used in a membrane distillation method contributes to the water throughput capacity or water permeability retention of the membrane, and the compactness of the membrane distillation device.

From the viewpoint of water permeability retention and membrane surface scratch resistance, PTL 1 discloses a porous hollow fiber membrane having an outer surface opening ratio of at least 20% and less than 50%, and being formed of a polyolefin, olefin-olefin halide copolymer, polyolefin halide or the like.

PTL 2 discloses a hydrophobic porous membrane having a surface opening ratio of 20% to 70% on the membrane surface that contacts with water to be treated, as a membrane to be used in a membrane distillation device with water throughput capacity and compactness, and an average pore diameter of no larger than 10 μm is used from the viewpoint of inhibiting wetting.

In addition, PTL 3 discloses modifying the surface of a porous membrane to inhibit wetting during membrane distillation. PTL 3 describes treating the surface of a porous membrane with a fluorinated monomer or other polymer to impart liquid repellency, in order to inhibit the tendency of the surface of the porous membrane made of polytetrafluoroethylene (PTFE), polyvinylidene fluoride (PVDF) or the like to be covered and wetted with oils.

PTL 4 discloses a porous membrane made of polyvinylidene fluoride and having a ratio of 1.2 to 2.5 between the maximum pore diameter and the average pore diameter, from the viewpoint of filtration properties and fractionation properties, but nothing is mentioned regarding the use of the membrane in a membrane distillation device or in a membrane distillation method.

Thus, while there has been development of the actual properties of membranes in membrane distillation devices or membrane distillation methods, sufficient research has still not been carried out on the structures of membrane distillation modules that incorporate hydrophobic porous hollow fiber membranes, in order to render membrane distillation devices more compact as a whole, and to increase the per unit volume throughput of membrane distillation modules that incorporate the membranes as main members of the membrane distillation devices.

The pore diameter of a hydrophobic porous membrane used in a membrane distillation method is known to contribute to the water throughput capacity and wetting resistance of the membrane (PTLs 2 and 5).

In PTL 5 there is proposed a porous membrane having an average pore diameter of 0.01 μm to 10 μm, and membrane distillation of oil-containing water, from the viewpoint of reducing the frequency of membrane clogging.

PTL 2 proposes a hydrophobic porous membrane having a surface open area ratio of 20% to 70% on the membrane surface that contacts with water to be treated, as a membrane to be used in a membrane distillation device with water throughput capacity and compactness, and an average pore diameter of no larger than 10 μm is used from the viewpoint of inhibiting wetting.

However, the hydrophobic porous membrane described in PTL 5 is merely intended to lower the frequency of membrane clogging to improve the water throughput capacity, and it still needs improvement for greater wetting resistance. The hydrophobic porous membrane described in PTL 2 is not investigated in regard to surface modification or liquid repellency, and it has been found to be in need of improvement in terms of increasing the water throughput capacity, thus bringing a new issue to light.

Upon examining the process of wetting in detail, the present inventors have confirmed that porous membranes that have insufficient hydrophobicity and tend to allow permeation of solutes (such as NaCl) to the permeation side of the porous membrane immediately after the distillation process starts are more prone to wetting.

As a separate issue from wetting, the present inventors have found an additional problem with membrane distillation in that solutes in an undissolved state (such as NaCl crystals) precipitate and accumulate on the permeation side surface of the porous membrane and in the interior (the thick membrane sections), a phenomenon known as "salt permeation", which leads to reduction in the water throughput capacity, time-related stability, transportability and handleability of the membrane distillation module or membrane distillation device.

The porous hollow fiber membrane described in PTL 1 is not investigated in terms of its hydrophobized state in light of these problems, and therefore it has room for improvement from the viewpoint of inhibiting wetting and salt permeation. The hydrophobic porous membrane described in PTL 2 is not investigated in regard to surface modification or liquid repellency, and it therefore has room for improvement in terms of increasing the water throughput capacity and inhibiting salt permeation. Nothing is mentioned regarding the structure, and especially the internal structure, of the porous membrane described in PTL 3, while its surface condition is also unknown, and it therefore has room for improvement in terms of inhibiting wetting and salt permeation.

CITATION LIST

Patent Literature

[PTL 1] International Patent Publication No. WO2001/053213
[PTL 2] International Patent Publication No. WO2016/006670
[PTL 3] International Patent Publication No. WO2015/080125
[PTL 4] Japanese Unexamined Patent Publication No. H3(1991)-215535
[PTL 5] Japanese Unexamined Patent Publication No. 2013-185127

SUMMARY

Technical Problem

In light of the technical level of the prior art as described above, the problem to be solved by the present invention is at least one of the following five.

A first problem is to provide an internal pressure membrane distillation module as a system in which high-temperature water to be treated is passed through on the inside of a hydrophobic porous hollow fiber membrane and water vapor is collected on the outside, the internal pressure membrane distillation module having high treatment efficiency per unit volume of the module, as well as a membrane distillation device comprising it as a main member.

A second problem is to provide an external pressure membrane distillation module as a system in which high-temperature water to be treated is passed through on the outside of a hydrophobic porous hollow fiber membrane and water vapor is collected on the inside, the external pressure membrane distillation module having high treatment efficiency per unit volume of the module, as well as a membrane distillation device comprising it as a main member.

A third problem is to provide an end-supplied external pressure membrane distillation module with an end-supplied system, using a hydrophobic porous hollow fiber membrane which is similar to the internal pressure membrane distillation module described above, wherein high-temperature water to be treated is passed through on the outside of the hydrophobic porous hollow fiber membrane and water vapor is collected on the inside, but the direction in which the water to be treated is passed is from one end of the hydrophobic porous hollow fiber membrane, the external pressure membrane distillation module having high treatment efficiency per unit volume of the module, as well as a membrane distillation device comprising it as a main member, and also to increase the compactness of the membrane distillation device as a whole.

A fourth problem is, for a membrane with a large treatable water volume per unit time, and a module and membrane distillation device employing it, to make possible production of purified water and concentrated water from a wide range of raw water types at low cost by a membrane distillation method, without pretreatment. Increasing the range of types of raw water that can be treated is important for the use of a membrane distillation method for volume reduction and valuable substance recovery from water to be treated.

A fifth problem is a problem relating to the hydrophobic porous membrane itself, and it is to provide a porous membrane for membrane distillation that can increase water throughput capacity and minimize not only wetting alone, but both wetting and salt permeation, as well as method for operating a membrane distillation module comprising it.

Solution to Problem

As a result of much ardent research and experimentation with the aim of solving these problems, the present inventors completed this invention upon finding that it is possible to increase the permeated water production efficiency per unit volume of a module by optimizing the structure and configuration of a hydrophobic porous hollow fiber membrane inside a cylindrical container that constitutes a membrane distillation module, optimizing the structure and configuration of an introduction unit for water to be treated which is attached to the cylindrical container, and optimizing the structure and configuration of a steam extractor which is attached to the cylindrical container.

The present inventors also conducted ardent research on the hydrophobic porous membrane itself and completed this invention upon finding that it is possible to minimize salt permeation without lowering permeated water production efficiency by specific physical properties of the membrane and by coating it with a water-repellent material.

Specifically, the present invention provides the following.

[1]

A membrane distillation device comprising:
a membrane distillation module that includes a plurality of hydrophobic porous hollow fibers, and
a condenser for condensation of steam extracted from the membrane distillation module, wherein:
the average pore diameter of the hydrophobic porous hollow fibers is 0.01 µm to 1 µm,
the filling ratio of the hydrophobic porous hollow fibers of the membrane distillation module is 10% to 80%, and
the membrane distillation conditions are 1 kPa or higher and no greater than the saturated vapor pressure of water at the temperature of the water to be treated.

[2]

The membrane distillation device according to [1], wherein a water-repellent agent is present on the surfaces of the hydrophobic porous hollow fibers.

[3]

The membrane distillation device according to [1] or [2], wherein the plurality of hydrophobic porous hollow fibers form a bundle of a plurality of hydrophobic porous hollow fiber membranes, the hydrophobic porous hollow fiber membrane bundle having an effective length of 60 mm to 2000 mm and being disposed in the cylindrical container of the membrane distillation module, and
the ratio $Db/Dh$ between the reduced diameter $Db$ of the porous hollow fiber membrane bundle and the inner diameter $Dh$ of the cylindrical container is no greater than 0.85.

[4]

The membrane distillation device according to [3], wherein:
the bundle of a plurality of hydrophobic porous hollow fiber membranes has the gaps between the hollow fiber membranes and the gaps between the hollow fiber membrane bundle and the cylindrical container, both of the gaps being filled with an anchoring resin at the ends of the plurality of hollow fiber membranes, the inside and outside of each hollow fiber membrane being anchored to the inside of the cylindrical container so as to allow communication only through the through-holes of each hollow fiber membrane,
the upper end face and lower end face of each hollow fiber membrane are open,
a head section having a water flow opening is fitted at each of the upper end and lower end of the cylindrical container, communicating with the inside of each hollow fiber membrane,
on the side wall of the cylindrical container, there is provided at least one side wall opening for extraction of steam present on the outside of each hollow fiber membrane and the inside of the cylindrical container, and
the side wall opening is present at a location from the upper end of the cylindrical container which is 10% to 90% of the full length from the lower end to the upper end of the cylindrical container, and the total cross-sectional area of the side wall openings is 0.2% to 2% of the total inner surface area of each hollow fiber membrane.

[5]

The membrane distillation device according to [4], wherein the cross-section of the side wall opening is circular, the diameter of the circle being 20% to 95% of the inner diameter $Dh$ of the cylindrical container.

[6]

The membrane distillation device according to [3] or [4], wherein the cross-section of the water flow opening of each head section fitted at the upper end and lower end of the cylindrical container is circular, the ratio $Df/Db$ of the diameter $Df$ of the circle and the reduced diameter $Db$ of the bundle of the plurality of hollow fiber membranes being 0.15 to 0.6.

[7]

The membrane distillation device according to [6], wherein the cross-sectional area of each head section fitted at the upper end and lower end of the cylindrical container decreases from the cylindrical container side toward the water flow opening.

[8]

The membrane distillation device according to [3] or [4], wherein the ratio Sm/Sh of the total Sm of the opening cross-sectional area on the upper end face or lower end face of the hollow fiber membrane and the cross-sectional area Sh of the water flow opening of the head section fitted at the upper end or lower end of the cylindrical container is between 0.1 and 5.

[9]

The membrane distillation device according to [3] or [4], wherein the material of the cylindrical container is at least one type selected from the group consisting of polyethylene, polypropylene, polysulfone, polyethersulfone, polyvinylidene fluoride, ABS resin and vinyl chloride resin.

[10]

The membrane distillation device according to [4], wherein the anchoring resin is at least one type selected from the group consisting of epoxy resins, vinyl ester resins, urethane resins, unsaturated polyester resins, olefin-based polymers, silicone resins and fluorine-containing resins.

[11]

The membrane distillation device according to [10], wherein the anchoring resin is a silicone resin.

[12]

The membrane distillation device according to [1] or [2], wherein the pressure resistance in an instantaneous destruction test is 0.2 MPa or greater.

[13]

The membrane distillation device according to [1] or [2], wherein the internal pressure of the condenser is at least 5 kPa and no higher than the saturated vapor pressure of water at the temperature of the water to be treated.

[14]

The membrane distillation device according to [1] or [2], wherein the shortest distance between any one of the plurality of hydrophobic porous hollow fiber membranes anchored in the membrane distillation module and the location where steam inside the condenser condenses is 50 mm or greater.

[15]

The membrane distillation device according to [1] or [2], wherein the temperature of the water to be treated is 50° C. or higher.

[16]

The membrane distillation device according to [1] or [2], wherein the plurality of hydrophobic porous hollow fibers form the bundle of a plurality of hydrophobic porous hollow fiber membranes, and the hydrophobic porous hollow fiber membrane bundle is in a net-covered state.

[17]

The membrane distillation device according to [1] or [2], wherein:

the membrane distillation module comprises a plurality of hydrophobic porous hollow fiber membranes formed from the plurality of hydrophobic porous hollow fibers, and a container that houses the plurality of hydrophobic porous hollow fiber membranes, the hollow fiber membrane effective length L being 60 mm to 2000 mm, the container has a steam extractor with a steam extraction flow channel, the hydrophobic porous hollow fiber membranes are a membrane bundle comprising a plurality of hollow fiber membranes each with one end (E1) and another end (E2) bundled at their one ends (E1) and other ends (E2), the ratio Sp/Sm of the total cross-sectional area Sp of the steam extraction flow channel and the total cross-sectional area Sm of the openings of the plurality of hollow fiber membranes at the other end (E2) is 0.25 to 5, and the ratio L/Dm of the hollow fiber membrane effective length L and the hollow fiber membrane inner diameter Dm is 150 to 1500.

[18]

The membrane distillation device according to [17], wherein the porous hollow fiber membrane bundle is disposed in a cylindrical container, and the shortest distance $D_{min}$ between the outermost surface of the membrane bundle and the inner surface of the container is no greater than 10 mm.

[19]

The membrane distillation device according to [17] or [18], wherein:

the cylindrical container has a circular tubular body portion, a treatment water introduction unit with a treatment water introduction flow channel, a steam extractor with a steam extraction flow channel, and a treatment water extractor with a treatment water extraction flow channel, the gaps between the hollow fiber membranes at the one end and the other end and the gaps between the hollow fiber membranes and the container are filled with an anchoring resin, so as to form the membrane bundle while causing the membrane bundle to be anchored to the cylindrical container, at the one end, the inner surface sides of the hollow fiber membranes are sealed with the anchoring resin while the outer surface sides of the hollow fiber membranes are in fluid communication with the treatment water introduction flow channel, at the other end, the inner surface sides of the hollow fiber membranes are in fluid communication with the steam extraction flow channel while the outer surface sides of the hollow fiber membranes are in fluid communication with the treatment water extraction flow channel, and at the diameter cross section running through the flow channel inlet of the treatment water introduction flow channel, the ratio Sf/Sh of the total cross-sectional area Sf of the treatment water introduction flow channel and the cross-sectional area Sh of the cylindrical container is 0.04 to 0.3.

[20]

The membrane distillation device according to [19], wherein:

the treatment water introduction unit has a plurality of treatment water introduction flow channels, with at least one of the treatment water introduction flow channels having a minimum cross-sectional area of no greater than 800 mm$^2$, and all of the plurality of treatment water introduction flow channels are contained inside the membrane bundle.

[21]

The membrane distillation device according to [20], wherein the treatment water introduction unit has two (2) to fifty (50) of treatment water introduction flow channels having flow channel inlet cross-sections that are circular cross-sections with diameters of 15 mm or smaller.

[22]
The membrane distillation device according to [21], wherein:
the treatment water extractor is a nozzle connected to the side wall of the body portion, and
the inner diameter D2 of the body portion at the location that includes the joint of the nozzle with the body portion is between 1.05 times and 1.5 times the minimum inner diameter D1 of the body portion.

[23]
The membrane distillation device according to [19] or [20], which has a spacer at the other end, between the hollow fiber membranes and the anchoring resin and inside the membrane bundle.

[24]
The membrane distillation device according to [23], which has a current plate and/or filler inside the container.

[25]
The membrane distillation device according to [19] or [20], wherein the ratio Sc/Sf between the total cross-sectional area Sc of the treatment water extraction flow channel at the location of the joint between the treatment water extractor and the body portion, and the total cross-sectional area Sf of the treatment water introduction flow channel, is 0.1 to 1.5, and the angle formed between the direction d1 of the treatment water introduction flow channel and the direction d2 of the treatment water extraction flow channel is no greater than 90 degrees.

[26]
The membrane distillation device according to [25], wherein the treatment water introduction flow channel tapers in such a manner that the cross-sectional area of the treatment water introduction flow channel gradually decreases along the direction in which the water to be treated flows.

[27]
The membrane distillation device according to [17] or [18], wherein the container includes at least one type of material selected from the group consisting of polyethylene, polypropylene, polysulfone, polyethersulfone, polyvinylidene fluoride, ABS resin and vinyl chloride resin.

[28]
The membrane distillation device according to [19], wherein the anchoring resin includes at least one type selected from the group consisting of epoxy resins, vinyl ester resins, urethane resins, unsaturated polyester resins, olefin-based polymers, silicone resins and fluorine-containing resins.

[29]
The membrane distillation device according to [28], wherein the anchoring resin includes a silicone resin.

[30]
The membrane distillation device according to [17] or [18], wherein the pressure resistance in an instantaneous destruction test is 0.2 MPa or greater.

[31]
The membrane distillation device according to [17] or [18], wherein the shortest distance between the other end (E2) and the condensing unit of the condenser is 50 mm or greater.

[32]
The membrane distillation device according to [19] or [20], wherein the temperature of the water to be treated at the treatment water introduction unit is 50° C. or higher.

[33]
The membrane distillation device according to [19] or [20], wherein the pressure in the hollow sections of the hollow fiber membranes and the pressure at the condensing unit communicating with the hollow fiber membranes are each 5 kPa or higher and no higher than the saturated vapor pressure of water at the temperature of the water to be treated at the treatment water introduction unit.

[34]
The membrane distillation device according to [1] or [2], wherein:
the membrane distillation module comprises hydrophobic porous hollow fiber membranes formed of a plurality of hydrophobic porous hollow fibers, a pair of head sections, and a container housing the hydrophobic porous hollow fiber membranes and the pair of head sections,
the hydrophobic porous hollow fiber membranes are a membrane bundle having one end and another end, comprising a plurality of hollow fiber membranes each with one end and another end being bundled by an anchoring resin at their one ends and their other ends while maintaining the openings of the hollow sections,
each of the pair of head sections has a steam extraction flow channel,
each of the pair of head sections is respectively attached to one end and the other end of the membrane bundle in such a manner that the steam extraction flow channel communicates with the hollow sections of the hollow fiber membranes,
the ratio L/Dm of the hollow fiber membrane effective length L and the hollow fiber membrane inner diameter Dm is 100 to 1500, and
the ratio Sp/Sm of the cross-sectional area Sp per steam extraction flow channel and the total Sm of the diameter cross sections of the hollow sections of the hollow fiber membranes forming the membrane bundle is 0.25 to 5.

[35]
The membrane distillation device according to [1] or [2], wherein the membrane bundle is an aggregate of a plurality of split bundles.

[36]
The membrane distillation device according to [35], wherein the membrane bundle has a spacer at the anchoring resin filling section.

[37]
The membrane distillation device according to [34] or [35], wherein the head section includes at least one type of material selected from the group consisting of polyethylene, polypropylene, polysulfone, polyethersulfone, polyvinylidene fluoride, ABS resin and vinyl chloride resin.

[38]
The membrane distillation device according to [37], wherein the anchoring resin includes at least one type selected from the group consisting of epoxy resins, vinyl ester resins, urethane resins, unsaturated polyester resins, olefin-based polymers, silicone resins and fluorine-containing resins.

[39]
The membrane distillation device according to [38], wherein the anchoring resin includes a silicone resin.

[40]
The membrane distillation device according to [1] or [2], which further has a stirring mechanism for stirring of the water to be treated.

[41]
The membrane distillation device according to [34] or [35], wherein the shortest distance between the one ends and the other ends of the hollow fiber membranes of the membrane distillation module and the condensing unit of the condenser is 50 mm or greater.

[42]

The membrane distillation device according to [34] or [35], wherein the temperature of the water to be treated is 50° C. or higher.

[43]

The membrane distillation device according to [34] or [35], wherein the pressure in the hollow sections of the hollow fiber membranes and the pressure at the condensing unit communicating with the hollow fiber membranes are each 5 kPa or higher and no higher than the saturated vapor pressure of water at the temperature of the water to be treated.

[44]

The membrane distillation device according to [1] or [2], wherein the average pore diameter of the porous hollow fiber membranes used in the membrane distillation device is 0.20 μm or greater, the standard deviation of the pore size distribution is no greater than 0.05 μm, the void percentage is 60% or higher, and the surface open area ratio on at least one porous hollow fiber membrane surface is 20% or higher.

[45]

The membrane distillation device according to [1] or [2], wherein the porous hollow fiber membranes used in the membrane distillation device include at least one resin selected from the group consisting of polysulfone, polyethersulfone, polyvinylidene fluoride, polytetrafluoroethylene, ethylene-tetrafluoroethylene copolymer, ethylene-ethylene tetrafluoride copolymer, polyethylene and polypropylene.

[46]

The membrane distillation device according to [1] or [2], wherein the air permeability coefficient of the porous hollow fiber membranes used in the membrane distillation device is $1.6 \times 10^{-7}$ m$^3$/m$^2$·sec·Pa or greater.

[47]

The membrane distillation device according to [1] or [2], wherein the tensile strength of the porous hollow fiber membranes used in the membrane distillation device is 30 kgf/cm$^2$ or greater.

[48]

The membrane distillation device according to [1] or [2], wherein the average pore diameter of the porous hollow fiber membranes used in the membrane distillation device is 0.15 μm or greater and less than 0.20 μm, the standard deviation of the pore size distribution is no greater than 0.05 μm, the surface open area ratio on at least one porous hollow fiber membrane surface is 20% or higher and the contact angle of the surface with purified water is 90° or larger.

[49]

The membrane distillation device according to [1] or [2], wherein the porous hollow fiber membranes used in the membrane distillation device include at least one resin selected from the group consisting of polysulfone, polyethersulfone, polyvinylidene fluoride, polytetrafluoroethylene, ethylene-ethylene tetrafluoride copolymer and polyolefins.

[50]

The membrane distillation device according to [49], wherein the resin is a polyolefin, and the polyolefin includes at least one of polyethylene and polypropylene.

[51]

The membrane distillation device according to [1] or [2], wherein the air permeability coefficient of the porous hollow fiber membranes used in the membrane distillation device is $1.0 \times 10^{-7}$ m$^3$/m$^2$·sec·Pa or greater.

[52]

The membrane distillation device according to [48], wherein the tensile strength of the porous hollow fiber membranes is 30 kgf/cm$^2$ or greater.

[53]

The membrane distillation device according to [1] or [2], which employs porous hollow fiber membranes wherein the maximum pore diameter is no greater than 0.25 μm, the standard deviation of the pore size distribution is no greater than 0.05 μm, the membrane thickness is 60 μm or greater, and the surface open area ratio on at least one surface is 20% or higher.

[54]

The membrane distillation device according to [53], wherein the porous hollow fiber membranes include at least one resin selected from the group consisting of polysulfone, polyethersulfone, polyvinylidene fluoride, polytetrafluoroethylene, ethylene-ethylene tetrafluoride copolymer and polyolefins.

[55]

The membrane distillation device according to [54], wherein the resin is a polyolefin, and the polyolefin includes at least one of polyethylene and polypropylene.

[56]

The membrane distillation device according to [53] or [54], wherein the air permeability coefficient of the porous hollow fiber membranes is $1.0 \times 10^{-7}$ m$^3$/m$^2$·sec·Pa or greater.

[57]

The membrane distillation device according to [53] or [54], wherein the tensile strength of the porous hollow fiber membranes is 30 kgf/cm$^2$ or greater.

[58]

The membrane distillation device according to [2], wherein, when at least a portion of one surface of a porous hollow fiber membrane formed of the hydrophobic porous hollow fibers, the other surface of the porous hollow fiber membrane or the surfaces of the through-holes of the porous hollow fiber membrane, is measured by X-ray Photoelectron Spectroscopy (XPS), the water-repellent agent has a C1s spectrum for $CF_3$- and $CF_2$—$CF_2$ coupled states observed in a range of 295 to 291 eV, a carbon element ratio of $CF_3$- and $CF_2$—$CF_2$ coupled states of 0.5% or higher and lower than 15.0% among the total elements, an O1s spectrum observed in a range of 530 to 538 eV, and an oxygen element ratio of 1.0% or higher and lower than 15.0% among the total elements.

[59]

The membrane distillation device according to [2], wherein, when at least a portion of one surface of a porous hollow fiber membrane formed of the hydrophobic porous hollow fibers, the other surface of the porous hollow fiber membrane or the surfaces of the through-holes of the porous hollow fiber membrane, is measured by X-ray Photoelectron Spectroscopy (XPS), the water-repellent agent has a Si2p spectrum observed in a range of 100 to 102 eV, a silicon element ratio of 3.0% or higher and lower than 20.0% among the total elements, an O1s spectrum observed in a range of 530 to 538 eV, and an oxygen element ratio of 5.0% or higher and lower than 25.0% among the total elements.

[60]

The membrane distillation device according to [58] or [59], wherein the contact angle of the porous hollow fiber membrane with purified water is 95° to 150°, when measured by dropping 2 μL of purified water onto the hollow fiber membrane.

[61]

The membrane distillation device according to [2] or [44], wherein when the membrane distillation module has been subjected to 1 hour of a procedure in which 3.5 weight % brine at 65° C. as raw water is contacted with one surface of each of the porous hollow fiber membranes formed of the hydrophobic porous hollow fibers at a linear speed of 100 cm/sec and the other surface of the porous hollow fiber membrane is subjected to pressure reduction at −90 kPa, the amount of permeated water permeating the porous hollow fiber membranes is 20 kg·L$^{-1}$·hr$^{-1}$ to 80 kg·L$^{-1}$·hr$^{-1}$, and the weight of salt solute precipitating on the other surface of the porous hollow fiber membrane is 0.002 mg·cm$^{-2}$·hr$^{-1}$ to 0.4 mg·cm$^{-2}$·hr$^{-1}$.

[62]

A method of obtaining permeated water using the membrane distillation device according to any one of [1] to [61], wherein the membrane distillation device is continuously operated, while substances that clog the porous hollow fiber membranes formed of the hydrophobic porous hollow fibers are rinsed with a liquid in which the substances are soluble, or the substances are rinsed by contacting the porous hollow fiber membranes with a solvent at a flow rate of 0.1 to 20 m/sec.

Advantageous Effects of Invention

The membrane distillation module of the invention can maintain high permeated water production efficiency while also maintaining high flux, and it therefore has high treatment efficiency per unit volume of the module. Consequently, a membrane distillation device using the membrane distillation module as a main member has low cost and high efficiency.

According to the invention there is provided means for efficiently producing large amounts of purified water with organic components and salts removed, from water to be treated such as waste water that contains organic components including surfactants and oils, and salts, or water containing valuable substances, preferably over prolonged periods. According to the invention there is also provided means for concentrating water to be treated, preferably over prolonged periods, allowing volume reduction of the water to be treated and recovery of valuable substances.

In addition, according to the present invention it is possible to extend the operating life of the membrane distillation device, compared to when a conventional porous membrane and membrane distillation device are used for membrane distillation of organic component-containing water. In particular, the present invention can notably extend the operating life of the membrane distillation device when the water to be treated includes components that lower the surface tension of water to be treated, such as surfactants and organic solvents.

Moreover, according to the invention, with a porous membrane for membrane distillation and a membrane distillation module, membrane distillation device, water production apparatus and water production method using it, it is possible to increase water throughput capacity and minimize wetting, solute precipitation and residue phenomena (salt permeation), and thus to improve the water throughput capacity, stability over time, transportability and handleability of the membrane distillation module, membrane distillation device or water production apparatus.

DESCRIPTION OF EMBODIMENTS

Figure 1:
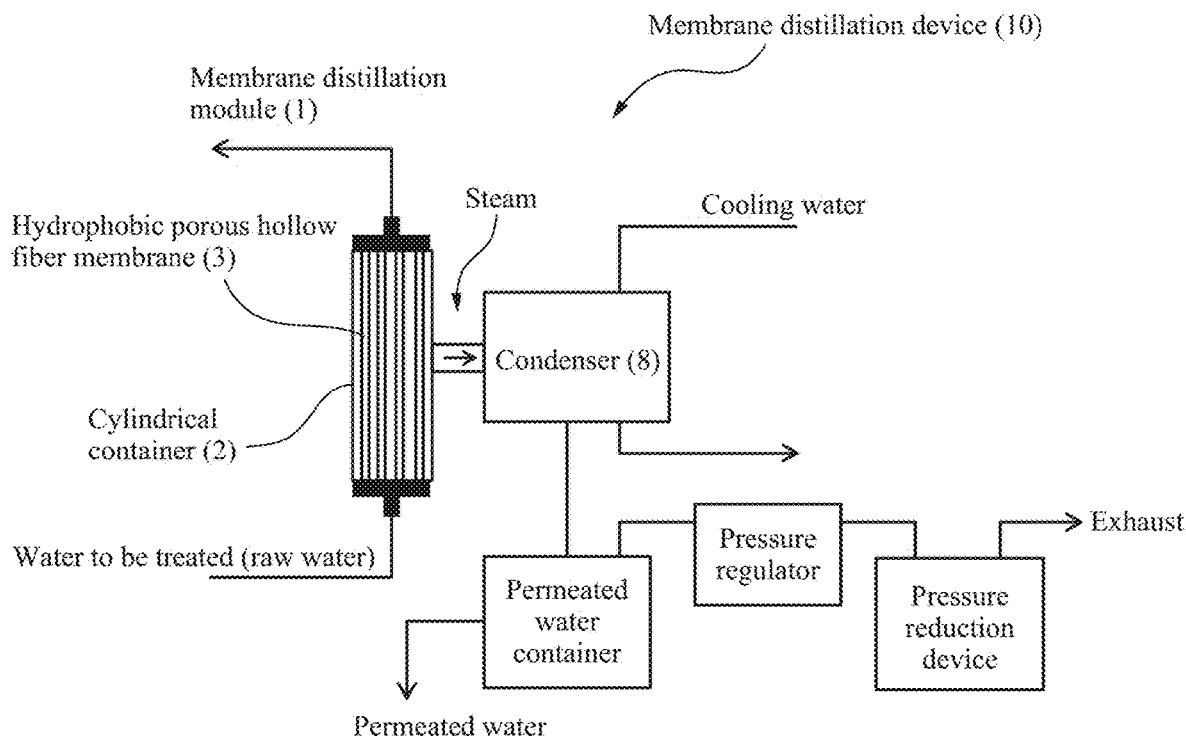
FIG. 1 is a schematic diagram of a membrane distillation device.

An embodiment for carrying out the invention (hereunder referred to as "this embodiment") will now be explained in detail. The present invention is not limited to the embodiment described below, and various modifications may be implemented within the scope of the gist thereof. The same reference numerals used in the drawings throughout the present disclosure indicate similar or corresponding elements.

One mode of the invention relates to a membrane module for membrane distillation and a membrane distillation device using porous membranes that include a hydrophobic resin, and to the porous membranes that include the hydrophobic resin.

The following aspects of the invention will now be explained:
  the membrane module for membrane distillation using porous membranes that include a hydrophobic resin,
  the membrane distillation device including the module, and
  the porous membranes composing the module.

The membrane module for membrane distillation using porous membranes that include a hydrophobic resin, according to the invention, is a structure comprising porous membranes with through-holes, and a heater that heats raw water or an evaporator that causes evaporation of raw water. The membrane module is mounted in the membrane distillation device for membrane distillation, and if desired, the membrane distillation device may be one comprising, in addition to the porous membranes and the heater or evaporator, also a condensing unit that condenses steam that has permeated the porous membranes, a tube that transports raw water or permeated water, a gas phase unit that transports steam, and a container that houses the porous membranes.

[Hydrophobic Porous Hollow Fiber Membranes]

The hydrophobic porous hollow fiber membranes to be used in the membrane distillation module of this embodiment preferably have through-holes, and have communicating pores running from the insides toward the outsides of the hollow fiber membranes. The communicating pores may be included within a network of a membrane material such as a hydrophobic polymer composing the hollow fiber membranes, and they may be branched holes or direct holes.

From the viewpoint of the hydrophobicity of the porous membranes, the water contact angle of the porous membranes is preferably 95° to 150° and more preferably 100° to 150°, when measured by a droplet method. A droplet method is carried out by dropping 2 μL of purified water onto a porous membrane such as a hollow fiber membrane at a temperature of 23° C. and a relative humidity of 50%, for example.

The surface tension of the hollow fiber membranes when coated with the water-repellent agent is preferably 10 mN/m to 25 mN/m. Since the surface tension of a membrane cannot be directly measured, liquid samples with different surface tensions are prepared and their contact angles (θ) are measured. Plotting surface tension (γ) of each liquid and Cos θ yields a linear relationship, and the surface tension extrapolated to θ→0 (zero) is recorded as the surface tension of the membrane.

The hydrophobicity of a porous membrane can be adjusted, for example, by (i) selection or scouring of the porous membrane material, or (ii) hydrophobic coating of at least portions of the inner side of the porous substance and the surfaces of the through-holes of the porous membrane.

Membranes that are porous, have through-holes and are hydrophobic include hydrophobic polymers as their major constituent components. A hydrophobic polymer is a polymer with low affinity for water, and examples include one or more resins selected from the group consisting of polysulfone, polyethersulfone, polyethylene, polypropylene, polyvinylidene fluoride, polytetrafluoroethylene and ethylene/ethylene tetrafluoride copolymers. Polyvinylidene fluoride and ethylene-ethylene tetrafluoride copolymers are preferred from the viewpoint of hydrophobicity, and scouring either after polymerization of the polymers or after formation of the membrane from them can remove impurities such as plasticizer to create pores and form through-holes.

Throughout the present specification, "major constituent component" refers to containing a hydrophobic polymer at 90 weight % or greater among the components forming the hydrophobic porous hollow fiber membrane, this content being preferably 95 weight % or greater and more preferably 99 weight % or greater, from the viewpoint of membrane strength.

A porous hollow fiber membrane to be applied in an internal pressure membrane distillation module will now be described.

When at least a portion of the inside or the through-hole surfaces are coated with the water-repellent agent, the opening ratio of the inner surface of the hydrophobic porous hollow fiber membrane is in the range of preferably 20% to 50%. The pores of the hydrophobic porous hollow fiber membrane preferably have a pore size distribution such that the ratio of the maximum pore diameter with respect to the average pore diameter is in the range of 1.2 to 2.5, and from the viewpoint of minimizing salt permeation, the average pore diameter is preferably in the range of 0.01 μm to 1 μm and the porosity of the membrane is preferably 50% to 85%. While it is not our intention to be constrained by any particular theory, presumably if the ion crystal diameter of solutes (such as NaCl) is smaller than the ion diameter of water during membrane distillation, the rate of salt permeation will be determined by the pore size distribution and maximum pore diameter of the porous hollow fiber membranes for membrane distillation. Consequently, a membrane structure for minimizing salt permeation is preferably one with a relatively sharp pore size distribution, i.e. a relatively large pore diameter.

If the opening ratio on the inner surface of a hydrophobic porous hollow fiber membrane is 50% or lower, it will tend to be easier to minimize wetting and salt permeation, in addition to improving the mechanical strength and water permeability retention of the membrane. The opening ratio on the inner surface is more preferably no greater than 35%. From the viewpoint of water permeability during membrane distillation, the opening ratio on the inner surface is preferably 20% or higher and more preferably 25% or higher.

The opening ratio, pore size distribution and porosity of a porous membrane can be measured by analyzing an electron micrograph image with image analysis processing software, with reference to the methods described in the Examples.

On the other hand, an external pressure membrane distillation module, and porous hollow fibers to be used in an end-supplied external pressure membrane distillation module, may employ hollow fibers similar to those described below.

The outer diameter of the hollow fiber membrane may be 300 μm to 5,000 μm, and is preferably 350 μm to 4,000 μm, and the inner diameter of the hollow fiber membrane may be 200 μm to 4,000 μm, and is preferably 250 μm to 3,000 μm.

The pores of the hydrophobic porous hollow fiber membrane preferably have a pore size distribution such that the ratio of the maximum pore diameter with respect to the average pore diameter is in the range of 1.2 to 2.5, and from the viewpoint of minimizing salt permeation, the average pore diameter is preferably in the range of 0.01 μm to 1 μm and the porosity of the membrane is preferably 50% to 85%. While it is not our intention to be constrained by any particular theory, presumably if the ion crystal diameter of solutes (such as NaCl) is smaller than the ion diameter of water during membrane distillation, the rate of salt permeation will be determined by the pore size distribution and maximum pore diameter of the porous hollow fiber membranes for membrane distillation. Consequently, a membrane structure for minimizing salt permeation is preferably one with a relatively sharp pore size distribution, i.e. a relatively large pore diameter.

The surface opening ratio on the outer walls and inner surfaces of the hollow fiber membranes are preferably 20% or higher, from the viewpoint of water permeability during membrane distillation. From the viewpoint of membrane mechanical strength, on the other hand, and from the viewpoint of preventing water leakage during use under reduced pressure, the surface opening ratio of the hollow fiber membranes is preferably 70% or lower and more preferably 35% or lower.

The outer diameter, inner diameter, average pore diameter, maximum pore diameter and surface opening ratio of a hollow fiber membrane can be measured by analyzing an electron micrograph image with image analysis processing software, based on the methods described in the Examples. The porosity of a membrane can be calculated from the weight of the hollow fiber membrane and the density of the material composing the hollow fiber membrane, based on the methods described in the Examples.

Hydrophobic porous hollow fiber membranes having the pore size distribution, opening ratio on the inner surface and porosity specified above may be obtained or produced in the following manner.

(a) By purchasing commercially available hydrophobic porous hollow fiber membranes with a sharp pore size distribution;

(b) By production using a large pore diameter cutting method, such as a method of controlling the amount of plasticizer extraction or the extraction behavior when membranes formed from a resin material are rendered porous, or a method of filling in large pore diameter sections by pressing silicon powder into the porous membranes.

The shapes of the hydrophobic porous membranes may be flat-membrane, tubular, hollow-fiber or spiral shapes, for any type such as internal pressure type, external pressure type, single-end supply external pressure types, but for the membrane distillation module of this embodiment, hollow fiber membranes that allow the membrane area per unit volume to be increased are preferred from the viewpoint of compactness.

The outer diameters and inner diameters of the hydrophobic porous hollow fiber membranes are preferably in the range of 0.3 mm to 3.0 mm.

For this embodiment, from the viewpoint of the water permeability during membrane distillation and the membrane mechanical strength, the membrane thickness of the hydrophobic porous hollow fiber membranes is preferably 10 μm to 500 μm and more preferably 15 μm to 300 μm. Limiting the membrane thickness to no greater than 500 μm can help prevent reduction in permeated water production efficiency. A membrane thickness of 10 μm or greater, on the other hand, can prevent deformation of the membranes or obstruction of the flow channels during use under reduced pressure.

The permeated water volume (flux) that can be achieved by membrane distillation is set as appropriate for the temperature of the water to be treated, but from the viewpoint of balance between increasing the permeated water production efficiency and minimizing salt permeation, during operation for 1 hour under conditions with 3.5 weight % brine at 65° C., as water to be treated (raw water) being contacted with the inside or outside of a porous membrane at a linear speed of 100 cm/sec, and reduced pressure of −90 kPa (G) on the opposite side, the permeated water volume (flux) is preferably 10 $kg/m^2/hr$ or greater and more preferably 10 $kg/m^2/hr$ to 50 $kg/m^2/hr$. The weight of salts (solute) precipitating on the inside of the porous membrane under the same conditions is preferably 0.002 $mg/cm^2/hr$ to 0.4 $mg/cm^2/hr$.

The amounts of flux and salt precipitation are based on the area of the membrane surface in contact with the water to be treated.

Suitable methods for producing the hydrophobic porous hollow fiber membranes include thermally induced phase separation methods in which a resin membrane is cooled to cause phase separation and form a porous layer, and dry-wet methods (non-solvent phase separation methods) in which a resin membrane is contacted with a poor solvent to cause phase separation and form a porous layer. From the viewpoint of balance between improving permeated water production efficiency and minimizing salt permeation, it is preferred to apply a hydrophobic coating to a porous membrane obtained by a thermally induced phase separation method or non-solvent phase separation method.

The membrane distillation module and membrane distillation device employing the hydrophobic resin-containing porous membranes (hydrophobic porous membranes) will now be described.

[Internal Pressure Membrane Distillation Device]

As shown in FIG. 1, the internal pressure membrane distillation device of this embodiment comprises at least a membrane distillation module having the bundle of a plurality of hydrophobic porous hollow fiber membranes housed inside a cylindrical container, and a condenser for cooling and condensation of steam that has exited out of the hollow fiber membranes, and it may further include a device for heating, pressurization and circulation of the water to be treated, a device for supplying cooling medium (water) for the condenser, a pressure reduction device for reducing the pressure inside the condenser, a pressure regulator, a permeated water container to store the permeated water that has been collected, and a piping system that connects all of them.

The membrane distillation device of this embodiment is a membrane distillation device comprising a membrane module for membrane distillation, described in detail below, and a condenser for condensation of steam that has been extracted from the side wall opening of the membrane module for membrane distillation, wherein the pressure inside the condenser, i.e. the pressure of the gas phase unit, is 1 kPa or higher and no greater than the saturated vapor pressure of water at the temperature of the water to be treated passing through the insides the hollow fiber membranes, and more preferably 5 kPa or higher and no greater than the saturated vapor pressure of water at the temperature of the water to be treated. The shortest distance between any one of the plurality of hydrophobic porous hollow fiber membranes anchored in the membrane module for membrane distillation and the location where steam inside the condenser condenses is preferably 10 mm or greater, more preferably 30 mm or greater and even more preferably 50 mm or greater. If the pressure of the gas phase unit is within this prescribed range, the distance between the membrane distillation module and the condenser will be less restricted, thus facilitating design of the membrane module and allowing space reduction and greater compactness to be realized for the membrane distillation device.

The shortest distance between any one of the plurality of hydrophobic porous hollow fiber membranes anchored in the membrane module for membrane distillation and the location where steam inside the condenser condenses is the shortest distance between the respective outer peripheries of the hydrophobic porous hollow fiber membranes and the cooling unit. If the shortest distance is 10 mm or greater, then high vacuum or sweep gas will not be necessary when membrane distillation is carried out while controlling the pressure of the gas phase unit to within a range of 1 kPa or higher and no higher than the saturated vapor pressure of water at the temperature of the water to be treated, and a compact membrane distillation device exhibiting high flux can be obtained. While there is no particular upper limit on the shortest distance, it is preferably no greater than 3000 mm and more preferably no greater than 1000 mm from the viewpoint of compactness.

If the pressure of the gas phase unit is 1 kPa or higher, it will be possible to minimize energy consumption required for pressure reduction of the pressure reduction device, and it will be possible to obtain high permeated water production efficiency by lowering the pressure to no higher than the saturated vapor pressure of water at the temperature of the water to be treated.

From the viewpoint of energy consumption, the pressure of the gas phase unit is preferably 1 kPa or higher and more preferably 5 kPa or higher. From the viewpoint of permeated water production efficiency, the pressure of the gas phase unit is preferably no higher than the saturated vapor pressure of water at the temperature of the water to be treated, more preferably it is a pressure of 5 kPa below the saturated vapor pressure of water at the temperature of the water to be treated, and even more preferably it is a pressure of 10 kPa below the saturated vapor pressure of water at the temperature of the water to be treated. The pressure reduction device used to reduce the pressure of the gas phase unit to no higher than the saturated vapor pressure of water at the temperature of the water to be treated may be a diaphragm vacuum pump, a dry pump, an oil rotary vacuum pump, an ejector or an aspirator. The method of controlling the pressure, including the pressure regulator, may be a method using a vacuum regulator or leak valve, or a method using an electronic vacuum controller and solenoid valve.

In the membrane distillation device of this embodiment, high flux can be achieved even under reduced pressure of below about −90 kPa (G).

A tube cooling unit is usually provided in the interior space of the condenser, with a cooling medium (water) flowing inside the cooling unit. If the exterior of the cooling unit is in contact with water vapor supplied into the condenser, then the water vapor will be cooled and condensed by the cooling unit, and converted to water (permeated water), and if it is stored and collected in the permeated water container, then permeated water can be recovered from high-temperature water to be treated through the membrane distillation device.

The cooling medium (water) is not particularly restricted so long as it can flow inside the condenser tube and cool the water vapor, and for example, it may be tap water, industrial water, river water, well water, lake water, seawater, industrial waste water (waste water from facilities such as food factories, chemical plants, electronic industrial plants, pharmaceutical plants or cleaning plants), or accessory water discharged during production of petroleum or natural gas. Natural gas includes, in addition to conventional natural gas, also non-conventional natural gas types such as coal bed methane (also known as coal seam gas). The water used as the water to be treated may also be used as the cooling water. The cooling water is preferably at a temperature of no higher than 30° C. and more preferably no higher than 20° C., from the viewpoint of cooling and condensation efficiency. The cooling water may also be heated by a heat source such as a heat exchanger or heater.

[Internal Pressure Membrane Distillation Module]

Figure 3:
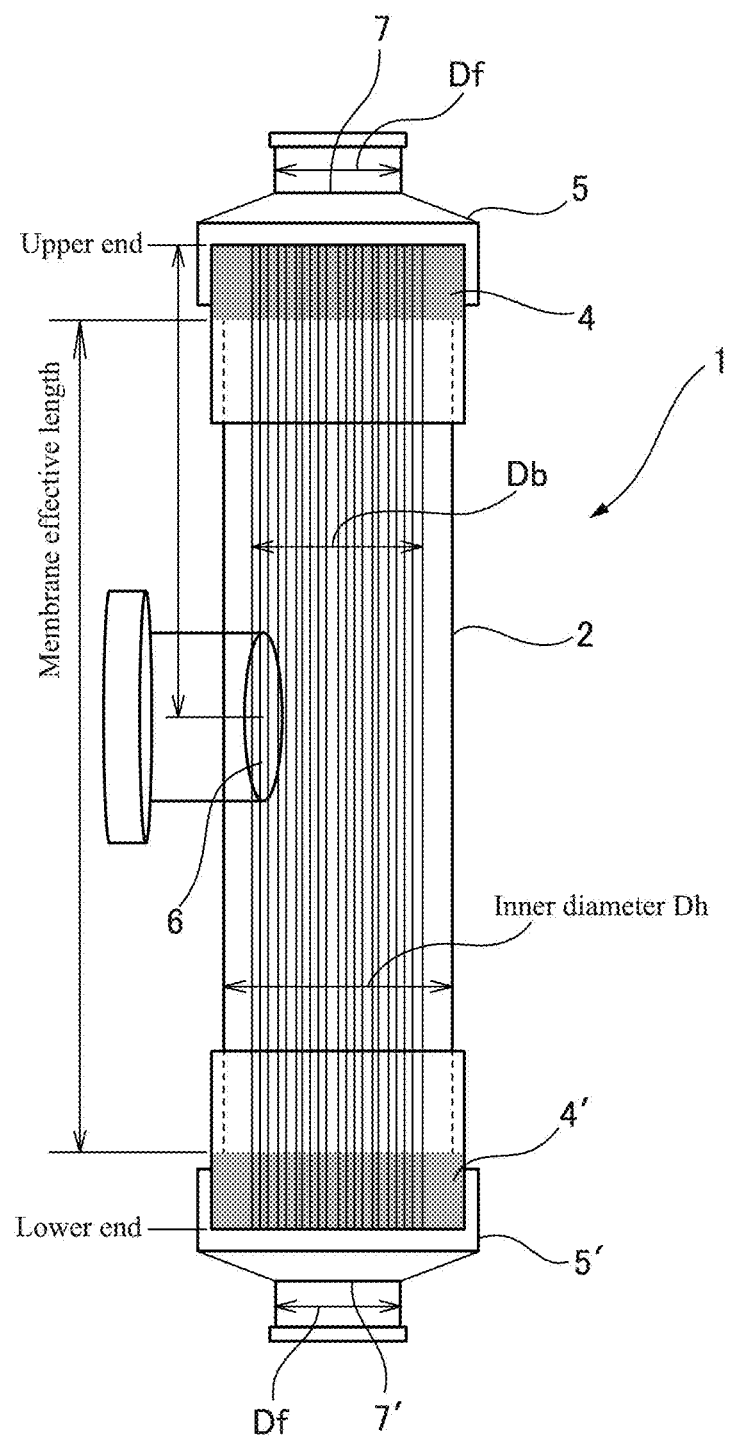
FIG. 3 is a side structure view of a membrane distillation module according to a preferred embodiment.

As shown in FIG. 3, the internal pressure membrane distillation module of this embodiment is a membrane module for membrane distillation (1) with a bundle of a plurality of hydrophobic porous hollow fiber membranes (3) (not shown) having through-holes, inside a cylindrical container (2), the gaps between each hollow fiber membrane and the gaps between the bundle of hollow fiber membranes (3) and the cylindrical container (2) being filled with an anchoring resin (4, 4') at the ends of the plurality of hollow fiber membranes, with the insides and outsides of the each hollow fiber membrane (3) anchored so as to allow communication only through the through-holes of each hollow fiber membrane, and with the upper end face and lower end face of each hollow fiber membrane open, head sections (5, 5') with water flow openings (7, 7') being fitted on the upper end and lower end of the cylindrical container that is communicating with the inside of each hollow fiber membrane, and having on the side wall of the cylindrical container (2), at least one side wall opening (6) for extraction of steam present outside each hollow fiber membrane (3) and inside the cylindrical container (2), wherein the filling ratio as a percentage of the outer diameter total cross-sectional area of each hollow fiber membrane (3) with respect to the inner diameter cross-sectional area of the cylindrical container (2) is 20% to 60%, the ratio Db/Dh of the reduced diameter Db of the bundle of the plurality of hollow fiber membranes (3) and the inner diameter Dh of the cylindrical container (2) is no greater than 0.85, and the membrane effective length of the bundle of the plurality of hollow fiber membranes (3) is 60 mm to 2000 mm. Upper ends and lower ends of the hollow fiber membranes are indicated in the module configuration shown in FIG. 3, but the module may be oriented sideways, and in this case each upper end and lower end are defined as the "one end" and the "other end".

The shape of the container housing the bundle of hollow fibers is not particularly restricted so long as it exhibits the desired effect, but for the membrane distillation module of this embodiment it is cylindrical to increase the production volume of permeated water per unit volume (efficiency) of the module. From the viewpoint of allowing stable operation for membrane distillation, the pressure resistance of the membrane module for membrane distillation of this embodiment in an instantaneous destruction test is preferably 0.2 MPa or greater. The material of the cylindrical container is preferably at least one selected from the group consisting of polyethylene, polypropylene, polysulfone, polyethersulfone, polyvinylidene fluoride, ABS resin and vinyl chloride resin, from the viewpoint of cost reduction when the membrane distillation module is to be disposable, and from the viewpoint of pressure resistance.

The number of hollow fiber membranes composing the hydrophobic porous hollow fiber membrane bundle housed in the cylindrical container will depend on the size of the cylindrical container, but it is preferably 500 to 5000 and more preferably 600 to 4600 per module. The module will be easier to produce if the number of hollow fibers per module is no more than 5000. A number of at least about 500, on the other hand, will improve the permeated water production efficiency per module.

The hydrophobic porous hollow fiber membrane bundle housed in the cylindrical container is preferably covered with an elastic net, in order to avoid displacement or vibration of the hollow fibers situated outside the bundle during operation for membrane distillation, which in some cases may contact with the inner walls of the cylindrical container and lead to tearing or damage of the membranes.

The cross-sectional shape of the hydrophobic porous hollow fiber membrane bundle housed in the cylindrical container is not particularly restricted, but it is preferably circular in order to be housed in a cylindrical container, to make the gap between the outer edge section of the bundle and the inner wall of the cylindrical container more uniform in the circumferential direction, and to avoid deviation in discharge of water vapor.

The water to be treated flowing on the inside of the hydrophobic porous hollow fiber membranes is not particularly restricted and is the water in need of purification or concentration, and it may be, for example, tap water, industrial water, river water, well water, lake water, seawater, industrial waste water (waste water from facilities such as food factories, chemical plants, electronic industrial plants, pharmaceutical plants or cleaning plants), or accessory water discharged during production of petroleum or natural gas. Natural gas includes, in addition to conventional natural gas, also non-conventional natural gas types such as coal bed methane (also known as coal seam gas). The temperature of the water to be treated is preferably 50° C. or higher and more preferably 80° C. or higher. The temperature of the water to be treated may be a heated temperature obtained by a heat source such as a heat exchanger or heater, but it is preferred to use solar heat, or exhaust heat from an industrial process, to control the water temperature as this will eliminate or lower the cost for heat energy required for heating. Exhaust heat can be effectively utilized if the temperature of the water to be treated is 50° C. or higher before heating. There is no upper limit, but from the viewpoint of minimizing energy consumption required for water production it is preferably no higher than 95° C. and more preferably no higher than 90° C.

The bundle of hydrophobic porous hollow fiber membranes in the desired number is anchored in the cylindrical container by filling an anchoring resin (potting resin) in the gaps between the hollow fiber membranes and the gap between the hollow fiber membrane bundle and the inside wall of the cylindrical container, at both the upper and lower ends.

The anchoring resin will depend on the material of the hydrophobic porous hollow fiber membranes and the cylindrical container, but it is a water-resistant and heat-resistant resin that can tightly anchor them, preferred examples being one or more selected from the group consisting of epoxy resins, vinyl ester resins, urethane resins, unsaturated polyester resins, olefin-based polymers, silicone resins and fluorine-containing resins, and silicone resins being more preferred.

Figure 4:
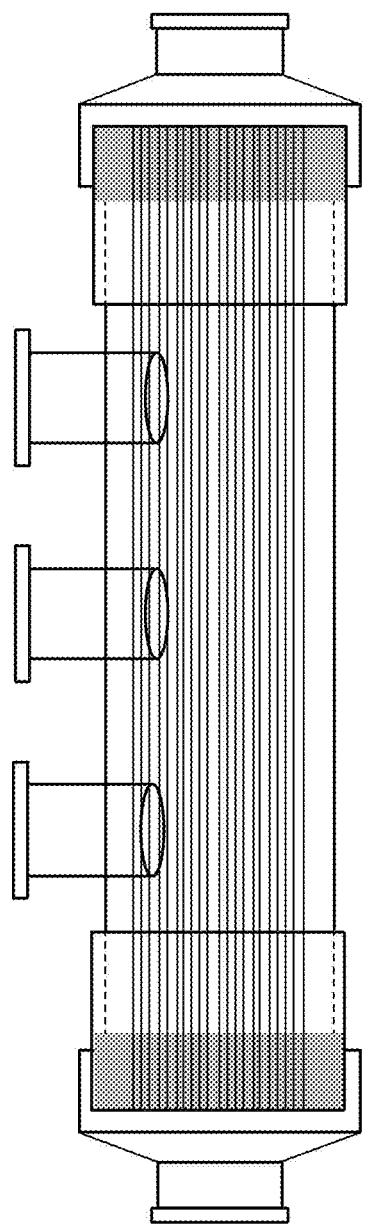
FIG. 4 is a side structure view of a membrane distillation module having a plurality of side wall openings.

At the upper and lower ends of the hollow fiber membranes, the spaces inside the hollow fiber membranes are open, and head sections with water flow openings are fitted at the upper and lower ends of the cylindrical container. A side wall opening is provided on the side wall of the cylindrical container for connection with the condensing unit. The number of side wall openings and connection tubes is not particularly restricted, and there may be one or a plurality. FIG. 4 shows a mode with three openings.

The membrane distillation module or membrane distillation device of this embodiment can be suitably used for the purpose of removing ions, organic materials and inorganic materials present in water to be treated to a high degree of removal, for purification, or for the purpose of removing water from water to be treated, for concentration. Such purposes may include seawater desalination, water production for ships, ultrapure water production (at semiconductor plants), boiler water production (at thermal power plants), fuel cell system water treatment, industrial waste water treatment (at food factories, chemical plants, electronic industrial plants, pharmaceutical plants and cleaning plants), water production for dialysis, production of water for injection, accessory water treatment (for heavy oils, shale oil, shale gas and natural gas, for example) and recovery of valuable materials from seawater. Natural gas includes, in addition to conventional natural gas, also non-conventional natural gas types such as coal bed methane (also known as coal seam gas).

When a membrane distillation module of this embodiment is used for prolonged operation in which permeated water is produced, the through-holes may become obstructed and the permeated water production efficiency reduced, when inorganic salts, organic materials, microparticles, oils and metals in the water to be treated precipitate and adhere onto the inner sides of the hydrophobic porous hollow fiber membranes and the interiors and outsides of the membranes. When this occurs, in some cases the operation is temporarily halted and a solution capable of dissolving substances that can cause clogging is used for a rinsing procedure with a high flow to wash off the surfaces and interiors of the hollow fiber membranes, to allow the hollow fiber membranes to be restored to their initial state. When the substances that can cause clogging are inorganic salts or metals, an acid or the like with high dissolving power may be used. In the case of common calcium carbonate scales, for example, the membranes may be rinsed with a solution of hydrochloric acid or citric acid. In the case of organic materials or microorganisms (slime), rinsing may be carried out using a sodium hypochlorite aqueous solution as an oxidizing agent. For microparticles, the rinsing solvent is flushed through at a high flow rate to eliminate the microparticles from the membrane surfaces.

When clogging substances that have precipitated and adhered in the pores inside the membranes are to be rinsed off, since the porous membranes are hydrophobic and do not allow penetration of the solution, rinsing may be by a method of hydrophilic wetting with an alcohol or a mixture of an alcohol and water, followed by flushing with a rinsing solvent. Rinsing may also be by applying pressure to the membranes to flush the pore interiors with a solvent. Membrane distillation using fresh water as the water to be treated (raw water) can bring clogging substances to the membrane surfaces, after which the membrane surfaces may be rinsed to remove the clogging substances.

In the internal pressure membrane distillation module of this embodiment, the filling ratio, as the percentage of the outer diameter total cross-sectional area of each hollow fiber membrane with respect to the inner diameter cross-sectional area of the cylindrical container is 10% to 80%, preferably 20% to 60%, more preferably 25 to 45% and even more preferably 30 to 40%. If the filling ratio is 20% or higher the permeated water production efficiency per module will be high, and if it is 60% or lower the gaps between the hollow fiber membranes in the hollow fiber membrane bundle will be sufficient, so that the flow of water vapor from the hollow fiber membranes to the side wall opening will not be impeded.

In the internal pressure membrane distillation module of this embodiment, the ratio Db/Dh between the reduced diameter Db of the bundle of the plurality of hollow fiber membranes and the inner diameter Dh of the cylindrical container (2) is no greater than 0.85 and preferably no greater than 0.80. If the Db/Dh ratio is no greater than 0.85 it will be possible to adequately ensure the gaps between the hollow fiber bundle and the inner wall of the cylindrical container, so that the flow of water vapor from the interior of the cylindrical container to the side wall opening will not be impeded.

In the internal pressure membrane distillation module of this embodiment, the membrane effective length of the bundle of the plurality of hollow fiber membranes is 60 mm to 2000 mm and preferably 80 to 1500 mm. The permeating production efficiency per module with 60 mm membranes is high, and if they are no greater than 2000 mm, production of the module will be facilitated and it will be possible to ensure a temperature difference between the heated water to be treated and the cooling medium (water) of the condenser, and to increase the permeated water production efficiency per module. If the module is too long, the temperature of the water to be treated at the outlet end of the module will be lower, reducing the temperature difference with the condenser and reducing the permeated water volume, thereby lowering the permeated water production efficiency of the module as a whole. This phenomenon occurs because latent heat is lost with evaporation, causing the temperature at the inlet and the temperature at the outlet of the module to be in the relationship: "inlet temperature>outlet temperature".

In the internal pressure membrane distillation module of this embodiment, the side wall opening is present at least at one location from the upper end of the cylindrical container which is 10% to 90% of the full length from the lower end to the upper end of the cylindrical container, and the total cross-sectional area of the side wall openings is preferably 0.2% to 2% of the total of the inner surface areas of each of the hollow fiber membranes. If the area ratio of the side wall openings is at least 0.2% the water vapor discharge resistance up to the condenser will be low, and if it is 2% or lower it will be possible to avoid reduction in the strength of the cylindrical container.

In the internal pressure membrane distillation module of this embodiment, preferably the side wall opening cross-section is circular, the diameter of the circle being 20% to 95% of the inner diameter Dh of the cylindrical container. If the diameter of the side wall openings is at least 20% the water vapor permeation resistance will be low, and if it is 95% or lower it will be possible to avoid reduction in the strength of the cylindrical container.

In the internal pressure membrane distillation module of this embodiment, the cross-section of the water flow opening of each head section fitted at the upper end and lower end of the cylindrical container is circular, the ratio Df/Db of the diameter Df of the circle and the reduced diameter Db of the bundle of the plurality of hollow fiber membranes being 0.15 to 0.75.

If the Df/Db ratio is 0.15 or greater the degree of pressure loss resulting from passage of the water to be treated will be appropriate, and if it is 0.75 or smaller it will be possible to avoid reduction in the strength of the head section.

The membrane bundle may also consist of a plurality of bundles. In such cases, the reduced diameter Db is calculated as the diameter where the total area of each of the membrane bundles is considered to be a single membrane bundle. By thus providing a plurality of different small membrane bundles instead of a single bundle, diffusion of steam released from the hollow fibers inside the membrane bundles is facilitated, thus improving the water permeability.

In the internal pressure membrane distillation module of this embodiment, the cross-sectional area of each of the head sections fitted at the upper end and lower end of the cylindrical container preferably decreases from the cylindrical container side toward the water flow opening. This can avoid flow turbulence of the passing water to be treated, and thus reduce pressure loss.

In the internal pressure membrane distillation module of this embodiment, the ratio Sm/Sh of the total Sm of the opening cross-sectional area on the upper end face or lower end face of the hollow fiber membrane and the cross-sectional area Sh of the water flow opening of the head section fitted at the upper end or lower end of the cylindrical container is preferably between 0.1 and 5.

If Sm/Sh is 0.1 or greater the degree of pressure loss resulting from passage of the water to be treated will be appropriate, and if it is 5 or smaller it will be possible to avoid reduction in the strength of the head section.

The internal pressure membrane distillation module of this embodiment, and the membrane distillation device including it as a main member, may be used as a composite system combined with other water treatment technologies. For example, concentrated water produced by treatment using an RO (Reverse Osmosis) method can be further purified using the membrane distillation device of this embodiment to increase the water yield. The membrane distillation device of this embodiment may also be used as recovering means for a DS (Draw Solution) used in an FO (Forward Osmosis) method.

[End-Supplied External Pressure Membrane Distillation Device]

An end-supplied external pressure membrane distillation module and membrane distillation device will now be described.

Figure 6:
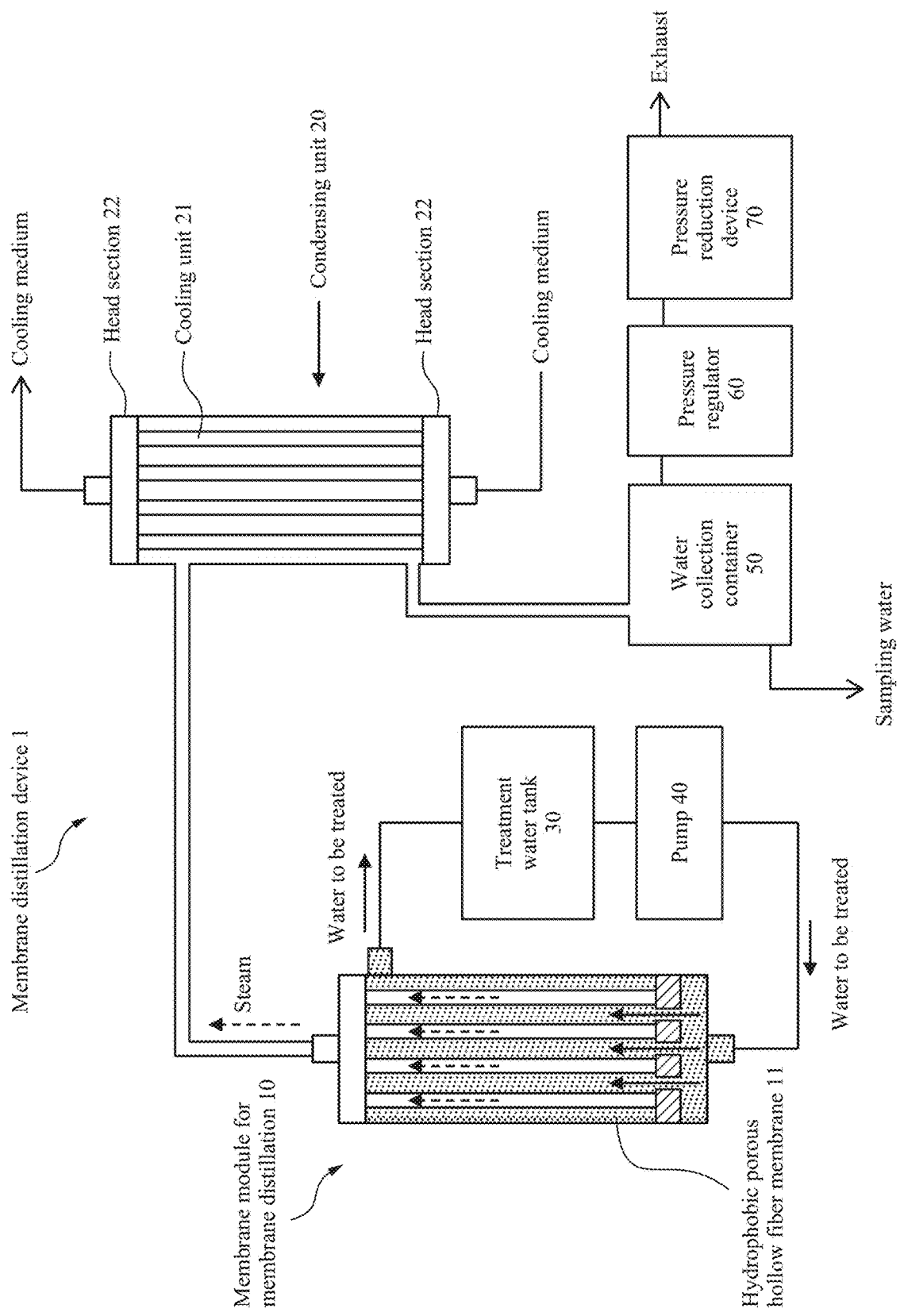
FIG. 6 is a schematic diagram illustrating an example of a membrane distillation device according to a preferred embodiment.

FIG. 6 is a schematic diagram showing an example of an end-supplied external pressure membrane distillation device for this embodiment. As shown in FIG. 6, the membrane distillation device 1 of this embodiment includes at least a membrane module for membrane distillation 10 housing a bundle of a plurality of hydrophobic porous hollow fiber membranes 11 inside a container, and a condensing unit 20 for cooling and condensation of steam extracted from inside the hollow fiber membranes. According to a typical mode, the membrane distillation device 1 may include a treatment water tank 30 and pump 40 for heating, pressurizing and circulation of water to be treated, a device (not shown) for supply of cooling medium of the condensing unit 20 (such as water), a pressure reduction device 70 for pressure reduction of the interior of the condensing unit 20, a pressure regulator 60, a water collection container 50 for storage of the permeated water that has been collected, and a piping system connecting all of them.

The end-supplied external pressure membrane module for membrane distillation or membrane distillation device of this embodiment can be suitably used for the purpose of removing ions, organic materials and inorganic materials present in water to be treated to a high degree of removal, for purification, or for the purpose of removing water from water to be treated, for concentration. Such purposes may include seawater desalination, water production for ships, ultrapure water production (at semiconductor plants), boiler water production (at thermal power plants), fuel cell system water treatment, industrial waste water treatment (at food factories, chemical plants, electronic industrial plants, pharmaceutical plants and cleaning plants), water production for dialysis, production of water for injection, accessory water treatment (for heavy oils, shale oil, shale gas and natural gas, for example) and recovery of valuable materials from seawater. Natural gas includes, in addition to conventional natural gas, also non-conventional natural gas types such as coal bed methane (also known as coal seam gas).

When an end-supplied external pressure membrane distillation module of this embodiment is used for prolonged operation in which permeated water is produced, the through-holes may become obstructed and the permeated water production efficiency reduced, when inorganic salts, organic materials, microparticles, oils and metals in the water to be treated precipitate and adhere onto the inner sides of the hydrophobic porous hollow fiber membranes and the interiors and outsides of the membranes. When this occurs, in some cases the operation is temporarily halted and a solution capable of dissolving substances that can cause clogging is used for a rinsing procedure with a high flow to wash off the surfaces (outer surfaces and inner surfaces) of the hollow fiber membranes and the membrane interiors, to allow the hollow fiber membranes to be restored to their initial state. When the substances that can cause clogging are inorganic salts or metals, an acid or the like with high dissolving power may be used. In the case of common calcium carbonate scales, for example, the membranes may be rinsed with a solution of hydrochloric acid or citric acid. In the case of organic materials or microorganisms (slime), rinsing may be carried out using a sodium hypochlorite aqueous solution as an oxidizing agent. For microparticles, the rinsing solvent is flushed through at a high flow rate to eliminate the microparticles from the membrane surfaces.

When clogging substances that have precipitated and adhered in the pores inside the membranes are to be rinsed off, since the porous membranes are hydrophobic and do not allow penetration of the solution, rinsing may be by a method of hydrophilic wetting with an alcohol or a mixture of an alcohol and water, followed by flushing with a rinsing solvent. Rinsing may also be by applying pressure to the membranes to flush the pore interiors with a solvent. Membrane distillation using fresh water as the water to be treated (raw water) can bring clogging substances to the membrane surfaces, after which the membrane surfaces may be rinsed to remove the clogging substances.

According to a typical mode, the end-supplied external pressure membrane distillation device 1 is constructed so that water to be treated is recirculated to the membrane module for membrane distillation 10 through the treatment water tank 30 and pump 40. The treatment water tank 30 houses water to be treated that has been extracted from the treatment water extractor of the membrane module for membrane distillation 10. The treatment water tank 30 may also be a storage tank such as a pit or part of the flow channel for the water to be treated. In the case of a storage tank, if the water level of the storage tank is controlled to a constant level, then carrying out membrane distillation treatment under consistent conditions will allow stable purified water efficiency to be obtained. When the treatment water tank 30 is part of the flow channel for the water to be treated, on the other hand, the membrane distillation conditions can be easily kept consistent, although a larger amount of water to be treated is necessary. Thus, the treatment water tank is preferably in the form of a storage tank comprising a controller that maintains a constant water level. The pump 40 is, for example, a piston pump, plunger pump, diaphragm pump, gear pump, rotary pump or vane pump, and it resupplies the water in the treatment water tank 30 to the membrane module 10.

Usually, a tube cooling unit 21 and a head section 22 connected to it are provided in the interior space of the condensing unit 20, with a cooling medium (such as water) flowing inside the cooling unit. If the exterior of the cooling unit is in contact with steam supplied into the condensing unit then the steam will be cooled and condensed by the cooling unit, and converted to water (permeated water), and if it is stored and collected in the water collection container 50, then the permeated water can be recovered from high-temperature water to be treated through the membrane distillation device.

The cooling medium is not particularly restricted so long as it can flow inside the cooling unit and cool the steam, and for example, it may be tap water, industrial water, river water, well water, lake water, seawater, industrial waste water (waste water from facilities such as food factories, chemical plants, electronic industrial plants, pharmaceutical plants or cleaning plants), or accessory water discharged during production of petroleum or natural gas. Natural gas includes, in addition to conventional natural gas, also non-conventional natural gas types such as coal bed methane (also known as coal seam gas).

The water used as the water to be treated may also be used as the cooling medium. The cooling medium is preferably at a temperature of no higher than 30° C. and more preferably no higher than 20° C., from the viewpoint of cooling and condensation efficiency. The cooling medium may also be heated by a heat source such as a heat exchanger or heater. According to a preferred mode, the cooling medium in the condensing unit 20 is circulated in the direction opposite from the direction of flow of the steam.

The pressure reduction device 70 may be a diaphragm vacuum pump, a dry pump, an oil rotary vacuum pump, an ejector or an aspirator. The method of controlling the pressure, including the pressure regulator 60, may be a method using a vacuum regulator or leak valve, or a method using an electronic vacuum controller and solenoid valve.

The pressure at the inner surface sides (i.e. hollow sections) of the hydrophobic porous hollow fiber membranes 11 of the membrane module for membrane distillation 10 and the pressure at the condensing unit 20 that is communicating with the hollow fiber membranes are each preferably 1 kPa or higher and more preferably 5 kPa or higher, from the viewpoint of helping to minimize energy consumption required for pressure reduction of the pressure reduction device, while from the viewpoint of obtaining a satisfactory amount of water production, they are each preferably no greater than the saturated vapor pressure of water at the temperature of the water to be treated in the treatment water introduction unit.

In the membrane distillation device, the shortest distance between the other ends of the hydrophobic porous hollow fiber membranes 11 (the other end E2 in FIG. 7 described below) and the condensing unit 20 is preferably 50 mm or greater and more preferably 100 mm or greater, from the viewpoint of allowing a higher degree of freedom in design of the membrane distillation device and obtaining a membrane distillation device that is compact and produces a high volume of water, while from the viewpoint of compactness of the membrane distillation device it is preferably no greater than 3000 mm and more preferably no greater than 1000 mm.

The water to be treated flowing on the outside of the hydrophobic porous hollow fiber membranes is not particularly restricted and is the water in need of purification or concentration, and it may be, for example, tap water, industrial water, river water, well water, lake water, seawater, industrial waste water (waste water from facilities such as food factories, chemical plants, electronic industrial plants, pharmaceutical plants or cleaning plants), or accessory water discharged during production of petroleum or natural gas. Natural gas includes, in addition to conventional natural gas, also non-conventional natural gas types such as coal bed methane (also known as coal seam gas).

The temperature of the water to be treated is preferably 50° C. or higher and more preferably 80° C. or higher. The temperature of the water to be treated may be a heated temperature obtained by a heat source such as a heat exchanger or heater, but it is preferred to use solar heat, or exhaust heat from an industrial process, to control the water temperature as this will eliminate or lower the cost for heat energy required for heating. Exhaust heat can be effectively utilized if the temperature of the water to be treated is 50° C. or higher before heating.

In the membrane distillation device, the temperature of the water to be treated at the treatment water introduction unit is preferably 50° C. or higher, more preferably 65° C. or higher and even more preferably 80° C. or higher, from the viewpoint of obtaining satisfactory water production efficiency. From the viewpoint of helping to minimize energy consumption required for water production it is preferably no higher than 95° C. and more preferably no higher than 90° C.

[End-Supplied External Pressure Membrane Module for Membrane Distillation]

Referring to FIGS. 6 to 9, the end-supplied external pressure membrane module for membrane distillation (hereunder also referred to as "membrane module") 10 comprises hydrophobic porous hollow fiber membranes 11 and a container 12 that houses the hydrophobic porous hollow fiber membranes 11. Hollow fiber membranes have high membrane area per unit volume and are therefore advantageous from the viewpoint of compactness of the membrane module. Hydrophobic hollow fibers are advantageous from the viewpoint of satisfactory extraction of steam.

In the membrane module 10, the water to be treated is preferably heated to high temperature and supplied to the outer surface sides of the hollow fiber membranes. The membrane walls of the hollow fiber membranes are constructed so that non-volatile solutes (such as salts) are unable to pass while steam can pass, and this essentially allows only the steam alone to permeate to the inner surface sides of the hollow fiber membranes. High-purity steam produced by the membrane module is liquefied at the condensing unit 20 and collected as high-purity water.

The hydrophobic porous hollow fiber membranes 11 are a membrane bundle comprising a plurality of hollow fiber membranes each with one end E1 and another end E2, bundled at their respective one ends and other ends. The gaps between the hollow fiber membranes at each one end and other end and the gaps between the hollow fiber membranes and the container are filled with an anchoring resin 13a, 13b. This forms the membrane bundle while anchoring the membrane bundle in the container. The cross-sectional shape of the membrane bundle is not particularly restricted, but it is preferably roughly circular in order to allow it to be housed in the container, and to ensure uniformity of the shapes of the gaps between the outer edge sections of the membrane bundle and the inner wall of the body portion of the container in the circumferential direction, and to ensure uniform supply of water to be treated to the membrane bundle.

The number of hollow fiber membranes housed in the container 12 will depend on the size of the cylindrical container, for example, but it is preferably 500 to 5000 and more preferably 600 to 4600 per membrane module. The membrane module will be more easy to produce if the number of hollow fibers per module is no more than 5000. A number of at least 500, on the other hand, will improve the permeated water production efficiency per module.

Figure 7:
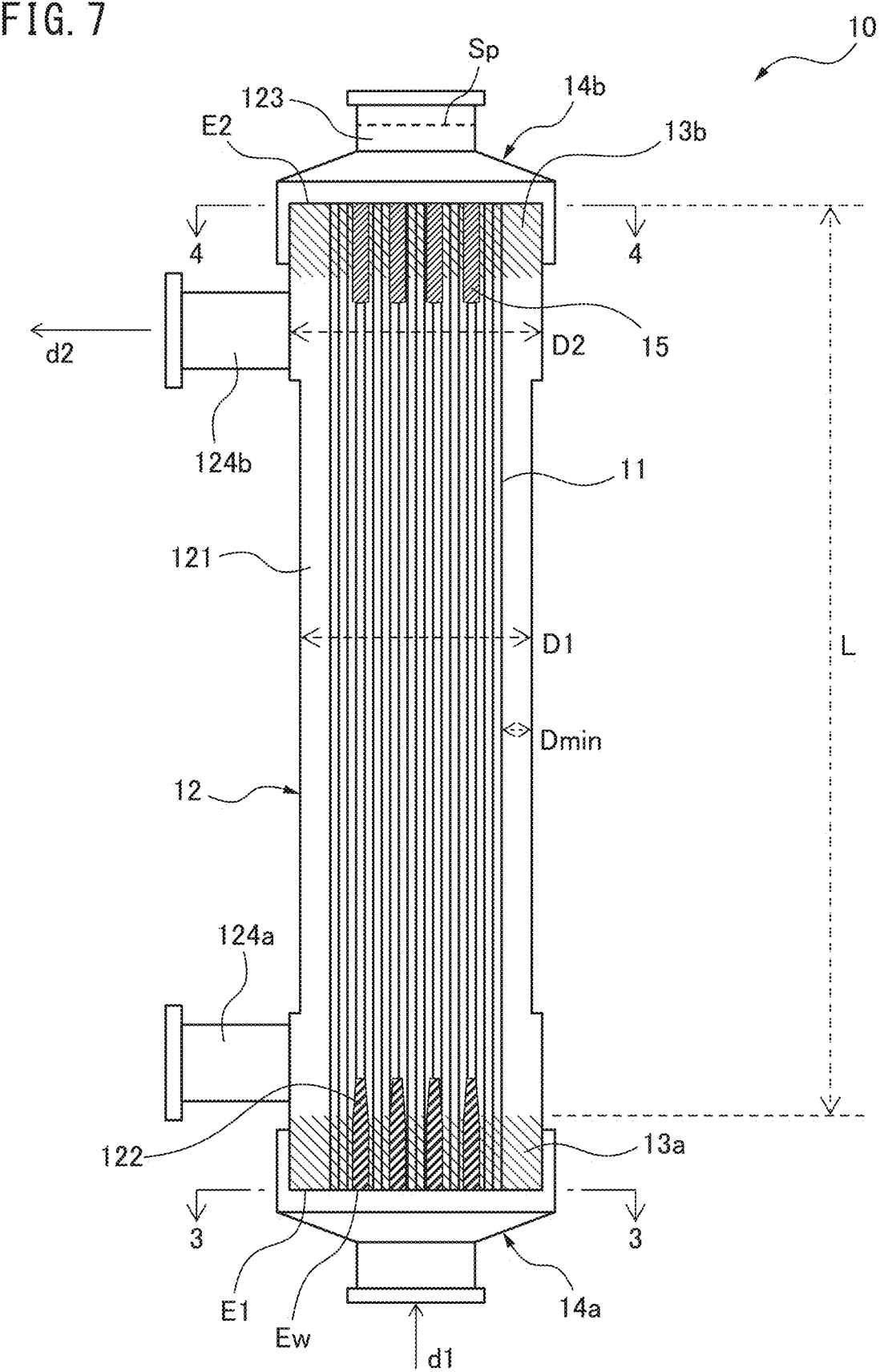
FIG. 7 is a diagram illustrating a membrane module for membrane distillation according to a preferred embodiment.

The container 12 has a circular tubular body portion 121. For the purpose of the present disclosure, the term "circular tubular" also includes shapes in which circular tubular shapes of different diameters are combined (such as the body portion 121 in FIG. 7, for example). A circular tubular shape is advantageous in that it increases the permeated water production volume per unit volume of the module (efficiency). According to an exemplary mode, the membrane module 10 has head sections 14a, 14b with water flow openings, fitted at both ends of the body portion 121 of the container 12. The container 12 has a treatment water introduction unit 122 with a treatment water introduction flow channel, a steam extractor 123 with a steam extraction flow channel, and treatment water extractors 124a, 124b each with a treatment water extraction flow channel. A single treatment water extraction flow channel or a plurality may be provided. FIG. 7 shows an example in which two treatment water extraction flow channels are provided (since the container has two treatment water extractors 124a, 124b).

At one end E1, the inner surface sides of the hollow fiber membranes are sealed with an anchoring resin 13a (that is, the anchoring resin is filled into the hollow sections), while the outer surface sides of the hollow fiber membranes are in fluid communication with the treatment water introduction flow channel of the treatment water introduction unit 122. At the other end E2, the inner surface sides of the hollow fiber membranes (that is, the surfaces forming the hollow sections) are in fluid communication with the steam extraction flow channel of the steam extractor 123, while the outer surfaces of the hollow fiber membranes (that is, the fiber surfaces of the hollow fibers) are in fluid communication with the treatment water extraction flow channels of the treatment water extractors 124a, 124b. Thus, after water to be treated has been supplied from outside the hollow fiber membranes and water has selectively flowed into the hollow sections through the porous hollow fiber membranes, the water moves through the hollow sections and is extracted from the other end E2 of the membrane module 10 through the steam extraction flow channel of the steam extractor 123.

The treatment water introduction unit 122 has one or a plurality, and typically a plurality, of treatment water introduction flow channels. According to an exemplary mode, the treatment water introduction flow channel is disposed near one end E1 of the hollow fiber membranes.

Since the membrane module of this embodiment comprises the treatment water introduction unit 122, it is possible to supply a sufficient amount of water to be treated from the outer surface sides of the hollow fiber membranes even when the spacing between the container 12 and the membrane bundle of the hydrophobic porous hollow fiber membranes 11 is small. The shortest distance $D_{min}$ between the outermost surfaces of the membrane bundles and the inner surface of the container (that is, the shortest distance between the inner surface of the container and the outer surfaces of the hollow fiber membranes nearest the inner surface of the container among the plurality of hollow fiber membranes composing the membrane bundle) is no greater than 10 mm, preferably no greater than 8 mm and even more preferably no greater than 7 mm, from the viewpoint of downsizing the membrane module. While this shortest distance may be 0 mm, it is preferably 1 mm or greater and even more preferably 3 mm or greater from the viewpoint of uniformly supplying water to be treated to the plurality of hollow fiber membranes forming the membrane bundle, to obtain satisfactory water production volume per hollow fiber membrane.

The filling ratio, based on the cross-sectional area of the hollow fiber membranes with respect to the container, is 10% or higher, preferably 50% or higher, more preferably 55% or higher and even more preferably 60% or higher from the viewpoint of downsizing the membrane module, while from the viewpoint of uniformly supplying water to be treated to the hollow fiber membranes to obtain satisfactory water production volume per hollow fiber membrane, it is no higher than 80%, preferably no higher than 75% and even more preferably no higher than 70%.

The filling ratio is the percentage of the total cross-sectional area of the hollow fiber membranes (including the hollow sections) with respect to the cross-sectional area of the container, in the diameter cross section at the location that defines the shortest distance $D_{min}$.

The hollow fiber membrane effective length L (that is, the length from the one end to the other end of a hollow fiber membrane minus the length of the location where the hollow section is sealed by the anchoring resin) is 60 mm or greater, preferably 100 mm or greater and even more preferably 200 mm or greater from the viewpoint of producing high-purity water, while from the viewpoint of preventing accumulation of steam in the hollow sections to ensure satisfactory steam extraction, it is no greater than 2000 mm, preferably no greater than 1500 mm and even more preferably no greater than 1200 mm.

The ratio Sp/Sm between the total cross-sectional area Sp at the section of the steam extraction flow channel of the steam extractor 123 communicating with the other ends E2 of the hollow fiber membranes and the total cross-sectional area Sm of the openings of the plurality of hollow fiber membranes at the other ends E2 is 0.25 or greater, preferably 0.3 or greater and even more preferably 0.5 or greater from the viewpoint of satisfactory steam extraction efficiency, while from the viewpoint of steam extraction volume per module it is preferably no greater than 5, preferably no greater than 3 and even more preferably no greater than 2. For the purpose of the present disclosure, the cross-sectional area of a flow channel is the cross-sectional area in the direction essentially perpendicular to the direction of flow of fluid through the flow channel.

The ratio L/Dm between the effective length L of the hollow fiber membrane and the hollow fiber membrane inner diameter Dm is 150 or greater, preferably 175 or greater and even more preferably 200 or greater from the viewpoint of producing high-purity water, while from the viewpoint of preventing accumulation of steam at the hollow sections to ensure satisfactory steam extraction, it is preferably no greater than 1500, preferably no greater than 1350 and even more preferably no greater than 1200.

The treatment water introduction flow channel of the treatment water introduction unit 122 may be tapered so that its cross-sectional area gradually decreases along the direction in which the water to be treated is circulated, as shown in FIG. 7, for example. For the treatment water introduction unit, an introduction rod of the same shape as the introduction channel may be placed during formation of the adhesive layer, and the introduction rod then removed after the adhesive layer has been formed, to form the treatment water introduction unit. The material of the introduction rod may be polyethylene, polypropylene or a fluorine resin, with optional processing depending on whether tapering is present.

Figure 8:
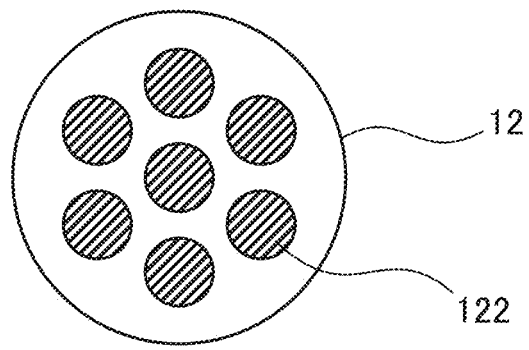
FIG. 8 is a diagram illustrating an example for the configuration of a treatment water introduction flow channel.

FIG. 8 shows a cross-section 3-3 as the diameter cross section running through the flow channel inlet Ew of the treatment water introduction flow channel of the treatment water introduction unit 122. At this cross-section, the ratio Sf/Sh between the total cross-sectional area Sf of the treatment water introduction flow channels of the treatment water introduction unit 122 and the cross-sectional area Sh of the container 12 is preferably 0.04 or greater, more preferably 0.07 or greater and even more preferably 0.1 or greater from the viewpoint of supply of the water to be treated to obtain a satisfactory water production volume, while from the viewpoint of satisfactorily preventing reduction in water production efficiency due to disturbance of the flow of the water to be treated, it is preferably no greater than 0.3, more preferably no greater than 0.25 and even more preferably no greater than 0.2.

According to a preferred mode, the treatment water introduction unit has a plurality of treatment water introduction flow channels, and at least one treatment water introduction flow channel is present having a minimum cross-sectional area of no greater than 800 mm$^2$. The minimum cross-sectional area is the cross-sectional area at the location of the smallest cross-sectional area within each treatment water introduction flow channel. According to a preferred mode, all of the plurality of treatment water introduction flow channels are contained inside the membrane bundle, as shown in FIG. 7.

According to a preferred mode, the treatment water introduction unit 122 has from 2 to 50 treatment water introduction flow channels having flow channel inlet cross-sections that are circular cross-sections with diameters of 15 mm or smaller. Flow channels with diameters of 15 mm or smaller are advantageous for ensuring the filling ratio of the hollow fiber membranes, and if 2 to 50 such flow channels are present it will be possible to cause uniform flow of the water to be treated inside the membrane bundles.

According to a preferred mode, the treatment water extractors 124*a*, 124*b* are nozzles connected to the side wall of the body portion 121, as shown in FIG. 7. From the viewpoint of satisfactorily extracting water to be treated, the inner diameter D2 of the body portion at the location including the joint of the nozzle with the body portion is preferably 1.05 times or greater and more preferably 1.10 times or greater, and preferably no greater than 1.5 times and more preferably no greater than 1.3 times the minimum inner diameter D1 of the body portion.

Figure 9:
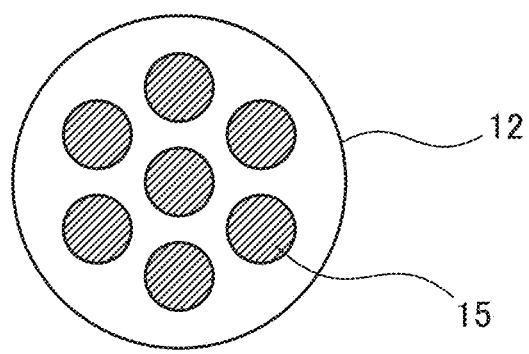
FIG. 9 is a diagram illustrating an example of a spacer configuration.

According to a preferred mode, the membrane module 1 has at the other end E2 a spacer 15 between the hollow fiber membranes and the anchoring resin 13*b*, and inside the membrane bundle. With a spacer it is possible to uniformly supply the water to be treated to each hollow fiber membrane. FIG. 9 shows cross-section 4-4 in FIG. 7. Several spacers 15 may be provided, as shown in FIG. 9, for example. The spacers used may be resin rods of the same material as the anchoring resin. For example, it preferably includes one or more selected from the group consisting of epoxy resins, vinyl ester resins, urethane resins, unsaturated polyester resins, olefin-based polymers, silicone resins and fluorine-containing resins, and more preferably it includes an epoxy resin or fluorine-containing resin, from the viewpoint of heat resistance.

Providing a current plate and/or a filler (not shown) inside the container is preferred from the viewpoint of uniformly supplying the water to be treated to each hollow fiber membrane.

The ratio Sc/Sf between the total cross-sectional area Sc of the treatment water extraction flow channel at the joint between the treatment water extractors 124a, 124b and the body portion 121, and the total cross-sectional area Sf at the flow channel inlet of the treatment water introduction flow channel, is preferably 0.1 or greater and more preferably 0.2 or greater, from the viewpoint of smoothly carrying out extraction of water to be treated, while from the viewpoint of satisfactory homogeneity of the treatment water flow, it is preferably no greater than 1.5 and more preferably no greater than 1.0. For this mode, the angle formed by the direction d1 of the treatment water introduction flow channel and the direction d2 of the treatment water extraction flow channel is preferably no greater than 90 degrees (that is, if d1 is the vertical direction, for example, then d2 is horizontal or higher than horizontal), from the viewpoint of obtaining a smooth flow of water to be treated.

The container 12 is made of a resin or metal, for example. From the viewpoint of cost reduction, when the membrane module for membrane distillation is to be disposable, and the viewpoint of pressure resistance, the container is preferably at least one selected from the group consisting of polyethylene, polypropylene, polysulfone, polyethersulfone, polyvinylidene fluoride, ABS resin and vinyl chloride resin.

From the viewpoint of allowing the hollow fiber membranes to be tightly anchored together and providing water resistance and heat resistance, the anchoring resin 13a, 13b preferably includes one or more selected from the group consisting of epoxy resins, vinyl ester resins, urethane resins, unsaturated polyester resins, olefin-based polymers, silicone resins and fluorine-containing resins, and more preferably it includes a silicone resin.

From the viewpoint of allowing stable operation for membrane distillation, the pressure resistance of the end-supplied external pressure membrane module for membrane distillation of this embodiment in an instantaneous destruction test is preferably 0.2 MPa or greater and more preferably 0.5 MPa or greater. While high pressure resistance is preferred, it is preferably no higher than 2.0 MPa and more preferably no higher than 1.5 MPa, from the viewpoint of facilitating production of the module.

The end-supplied external pressure membrane module for membrane distillation of this embodiment, and the membrane distillation device including it as a main member, may be used as a composite system combined with other water treatment technologies. For example, concentrated water produced by treatment using a RO (Reverse Osmosis) can be further purified using the membrane distillation device of this embodiment to increase the water yield. The membrane distillation device of this embodiment may also be used as recovering means for a DS (Draw Solution) used in an FO (Forward Osmosis) method.

[External Pressure Membrane Distillation Device]

Figure 10:
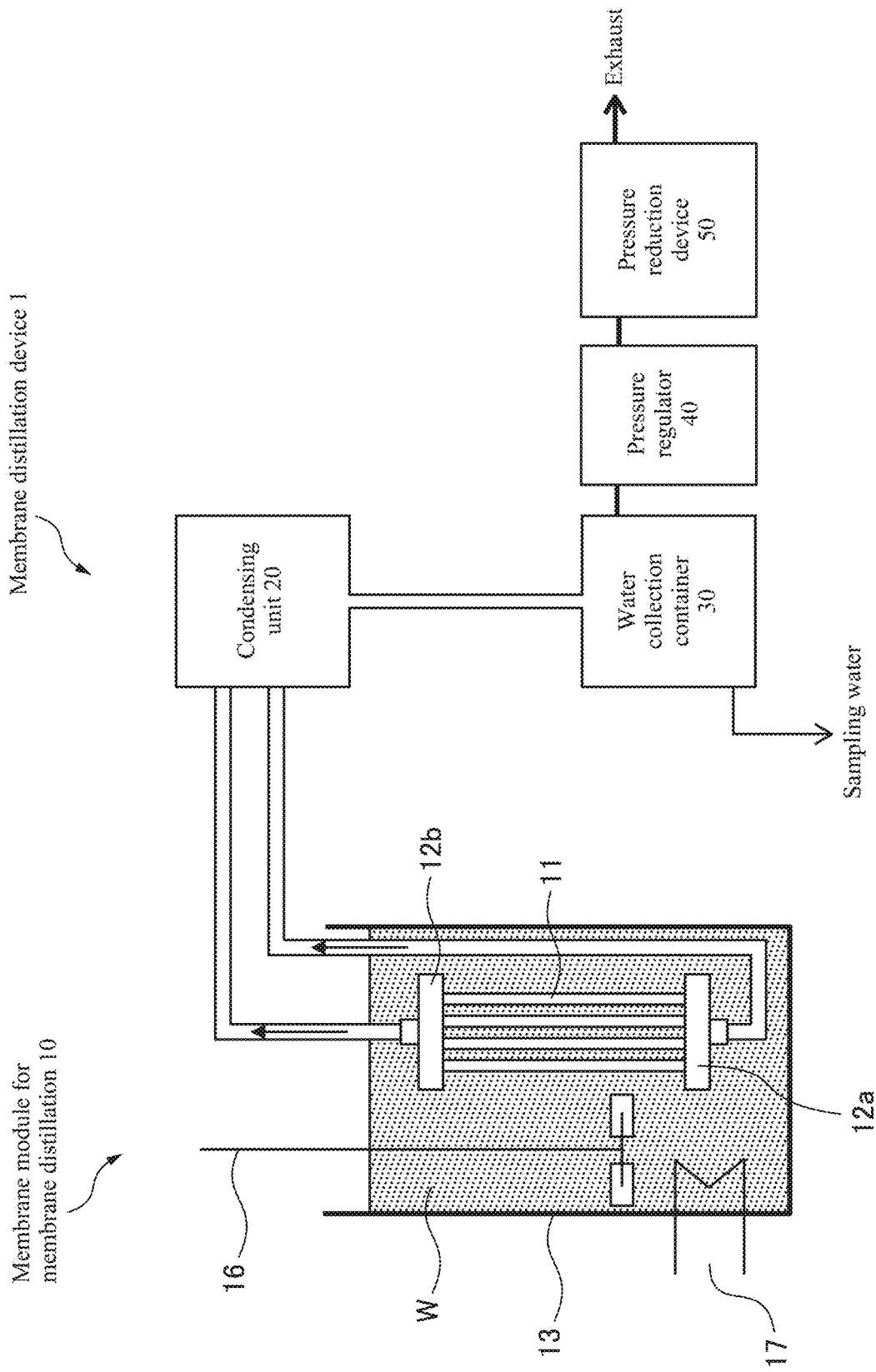
FIG. 10 is a diagram illustrating an example of a membrane distillation device according to a preferred embodiment.

FIG. 10 is a schematic diagram showing an example of an external pressure membrane distillation device for this embodiment. As shown in FIG. 10, the membrane distillation device 1 of this embodiment includes at least a distillation section having a membrane module for membrane distillation 10 comprising hydrophobic porous hollow fiber membranes 11, a pair of head sections 12a, 12b, and a container 13 that houses the hydrophobic porous hollow fiber membranes 11 and the pair of head sections 12a, 12b, as well as water to be treated housed in the container 13 so as to contact with the outer surface sides of the hollow fiber membranes, and a condensing unit 20 for cooling and condensation of steam extracted from the insides of the hollow fiber membranes. According to a typical mode, the membrane distillation device 1 may include a device (not shown) for supply of cooling medium of the condensing unit 20 (such as water), a pressure reduction device 50 for pressure reduction of the interior of the condensing unit 20, a pressure regulator 40, a water collection container 30 for storage of the permeated water that has been collected, and a piping system connecting all of them.

The external pressure membrane module for membrane distillation or membrane distillation device of this embodiment can be suitably used for the purpose of removing ions, organic materials and inorganic materials present in water to be treated to a high degree of removal, for purification, or for the purpose of removing water from water to be treated, for concentration. Such purposes may include seawater desalination, water production for ships, ultrapure water production (at semiconductor plants), boiler water production (at thermal power plants), fuel cell system water treatment, industrial waste water treatment (at food factories, chemical plants, electronic industrial plants, pharmaceutical plants and cleaning plants), water production for dialysis, production of water for injection, accessory water treatment (for heavy oils, shale oil, shale gas and natural gas, for example) and recovery of valuable materials from seawater. Natural gas includes, in addition to conventional natural gas, also non-conventional natural gas types such as coal bed methane (also known as coal seam gas).

When an external pressure membrane distillation module of this embodiment is used for prolonged operation in which permeated water is produced, the through-holes may become obstructed and the permeated water production efficiency reduced, when inorganic salts, organic materials, microparticles, oils and metals in the water to be treated precipitate and adhere onto the inner sides of the hydrophobic porous hollow fiber membranes and the interiors and outsides of the membranes. When this occurs, in some cases the operation is temporarily halted and a solution capable of dissolving substances that can cause clogging is used for a rinsing procedure with high flow to wash off the surfaces (outer surfaces and inner surfaces) of the hollow fiber membranes and the membrane interiors, to allow the hollow fiber membranes to be restored to their initial state. When the substances that can cause clogging are inorganic salts or metals, an acid or the like with high dissolving power may be used. In the case of common calcium carbonate scales, for example, the membranes may be rinsed with a solution of hydrochloric acid or citric acid. In the case of organic materials or microorganisms (slime), rinsing may be carried out using a sodium hypochlorite aqueous solution as an oxidizing agent. For microparticles, the rinsing solvent is flushed through at a high flow rate to eliminate the microparticles from the membrane surfaces.

When clogging substances that have precipitated and adhered in the pores inside the membranes are to be rinsed off, since the porous membranes are hydrophobic and do not allow penetration of the solution, rinsing may be by a method of hydrophilic wetting with an alcohol or a mixture of an alcohol and water, followed by flushing with a rinsing solvent. Rinsing may also be by applying pressure to the membranes to flush the pore interiors with a solvent. Membrane distillation using fresh water as the water to be treated (raw water) can bring clogging substances to the membrane surfaces, after which the membrane surfaces may be rinsed to remove the clogging substances.

Usually, a tube cooling unit and a head section connected to it are provided in the interior space of the condensing unit 20, with a cooling medium (such as water) flowing inside the cooling unit. If the exterior of the cooling unit is in contact with steam supplied into the condensing unit then the steam will be cooled and condensed by the cooling unit, and converted to water (permeated water), and if it is stored and collected in the water collection container 30, then the permeated water can be recovered from high-temperature water to be treated through the membrane distillation device.

The cooling medium is not particularly restricted so long as it can flow inside the cooling unit and cool the steam, and for example, it may be tap water, industrial water, river water, well water, lake water, seawater, industrial waste water (waste water from facilities such as food factories, chemical plants, electronic industrial plants, pharmaceutical plants or cleaning plants), or accessory water discharged during production of petroleum or natural gas. Natural gas includes, in addition to conventional natural gas, also non-conventional natural gas types such as coal bed methane (also known as coal seam gas). The water used as the water to be treated may also be used as the cooling medium. The cooling medium is preferably at a temperature of no higher than 30° C. and more preferably no higher than 20° C., from the viewpoint of cooling and condensation efficiency. The cooling medium may also be heated by a heat source such as a heat exchanger or heater. According to a preferred mode, the cooling medium in the condensing unit 20 is circulated in the direction opposite from the direction of flow of the steam.

The pressure reduction device 50 may be a diaphragm vacuum pump, a dry pump, an oil rotary vacuum pump, an ejector or an aspirator. The method of controlling the pressure, including the pressure regulator 40, may be a method using a vacuum regulator or leak valve, or a method using an electronic vacuum controller and solenoid valve.

The pressure at the inner surface sides (i.e. hollow sections) of the hydrophobic porous hollow fiber membranes 11 of the membrane module for membrane distillation 10 and the pressure at the condensing unit 20 that is communicating with the hollow fiber membranes are each preferably 1 kPa or higher and more preferably 5 kPa or higher, from the viewpoint of helping to minimize energy consumption required for pressure reduction of the pressure reduction device, while from the viewpoint of obtaining a satisfactory volume of water production, they are each preferably no greater than the saturated vapor pressure of water at the temperature of the water to be treated in the container 13.

The water to be treated flowing on the outside of the hydrophobic porous hollow fiber membranes is not particularly restricted and is the water in need of purification or concentration, and it may be, for example, tap water, industrial water, river water, well water, lake water, seawater, industrial waste water (waste water from facilities such as food factories, chemical plants, electronic industrial plants, pharmaceutical plants or cleaning plants), or accessory water discharged during production of petroleum or natural gas. Natural gas includes, in addition to conventional natural gas, also non-conventional natural gas types such as coal bed methane (also known as coal seam gas). According to a typical mode, the membrane module for membrane distillation 10 further has a heating section 17. From the viewpoint of obtaining satisfactory water production efficiency, the water to be treated is preferably heated to a higher temperature than the temperature of the condensing unit 20. The temperature of the water to be treated is preferably 50° C. or higher and more preferably 80° C. or higher. The temperature of the water to be treated can be increased by the heating section 17 using a heat source such as a heat exchanger or heater, for example. It is preferred to use solar heat, or exhaust heat from an industrial process, to control the water temperature as this will eliminate or lower the cost for heat energy required for heating. Exhaust heat can be effectively utilized if the temperature of the water to be treated is 50° C. or higher before heating.

The external pressure membrane distillation device 1 preferably also has a stirring mechanism 16 for stirring of the water to be treated, from the viewpoint of obtaining more satisfactory water production efficiency by uniformly supplying the water to be treated to the hydrophobic porous hollow fiber membranes.

The shortest distance between the one ends and other ends of the hollow fiber membranes of the external pressure membrane module for membrane distillation 10 (the one end E1 and other end E2 in FIG. 11 described below) and the condensing unit 20 is preferably 50 mm or greater and more preferably 100 mm or greater, from the viewpoint of allowing a higher degree of freedom in design of the membrane distillation device and obtaining a membrane distillation device that is compact and produces a high volume of water, while from the viewpoint of compactness of the membrane distillation device it is preferably no greater than 3000 mm and more preferably no greater than 1000 mm.

[External Pressure Membrane Module for Membrane Distillation]

Referring to FIGS. 10 to 13, the external pressure membrane module for membrane distillation (hereunder also referred to as membrane module) 10, 20, 30 comprises hydrophobic porous hollow fiber membranes 11, a pair of head sections 12a, 12b, and a container 13, 23, 33 that houses the hydrophobic porous hollow fiber membranes 11 and the pair of head sections 12a, 12b. The hydrophobic porous hollow fiber membranes 11 are a membrane bundle with one end and another end, comprising a plurality of hollow fiber membranes each with one end E1 and another end E2, bundled at their respective one end E1 and other end E2 by an anchoring resin 14a, 14b, while maintaining the openings of the hollow sections. Each of the pair of head sections 12a, 12b has a steam extraction flow channel, and each of the pair of head sections 12a, 12b is respectively attached to the one end E1 and other end E2 of the membrane bundle so that the steam extraction flow channel communicates with the hollow sections of the hollow fiber membranes.

The filling ratio of the external pressure membrane module for membrane distillation can be represented by the percentage of the total cross-sectional area of the hollow fiber membranes with respect to the effective cross-sectional area of the pair of head sections, and it is preferably 10% or higher, more preferably 50% or higher, even more preferably 55% or higher and yet more preferably 60% or higher, while from the viewpoint of uniformly supplying water to be treated to the hollow fiber membranes to obtain satisfactory water production volume per hollow fiber membrane, it is no higher than 80%, preferably no higher than 75% and even more preferably no higher than 70%.

When the effective area of each of the pair of head sections is different, the filling ratio is calculated based on the effective area of the smaller head section.

The external pressure membrane module for distillation of the invention may have the hollow fibers internally mounted in the container, but in some cases it may also have them directly immersed in the container that is open and full of the water to be treated.

Hollow fiber membranes have high membrane area per unit volume and are therefore advantageous from the viewpoint of compactness of the membrane module. Hydrophobic hollow fibers are advantageous from the viewpoint of satisfactory extraction of steam. The cross-sectional shape of the membrane bundle is not particularly restricted, but it is preferably approximately circular from the viewpoint of providing a uniform flow of water to be treated to the membrane bundle.

From the viewpoint of allowing the hollow fiber membranes to be tightly anchored together and providing water resistance and heat resistance, the anchoring resin 14*a*, 14*b* preferably includes one or more selected from the group consisting of epoxy resins, vinyl ester resins, urethane resins, unsaturated polyester resins, olefin-based polymers, silicone resins and fluorine-containing resins, and more preferably it includes a silicone resin.

In the membrane module 10, 20, 30, the water to be treated is preferably heated to high temperature and supplied to the outer surface sides of the hollow fiber membranes. The membrane walls of the hollow fiber membranes are constructed so that non-volatile solutes (such as salts) are unable to pass but steam can pass, and this essentially allows only the steam alone to permeate to the inner surface sides of the hollow fiber membranes. High-purity steam produced by the membrane module is liquefied at the condensing unit 20 and collected as high-purity water.

Figure 12:
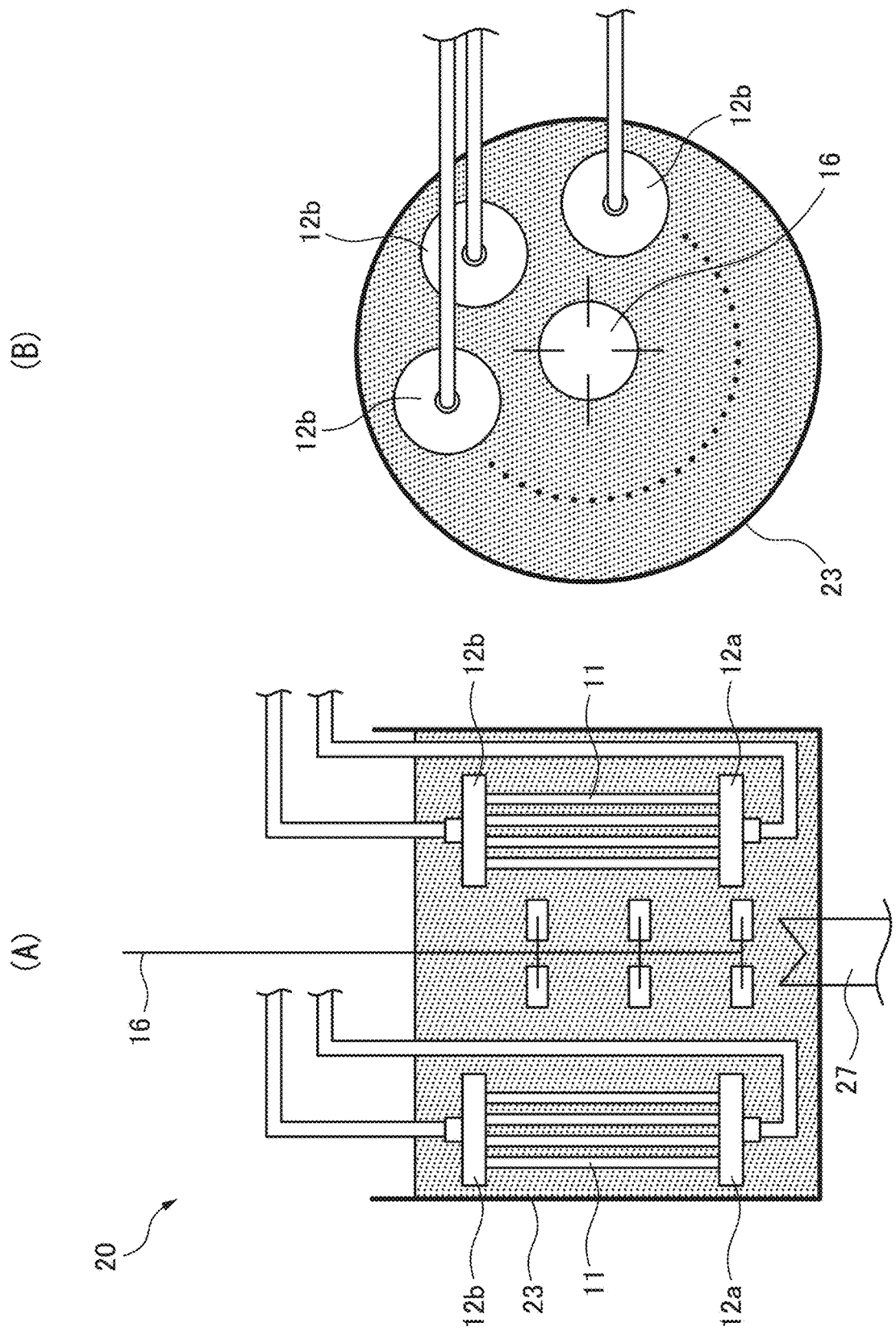
FIG. 12 is a diagram illustrating a membrane module for membrane distillation according to a preferred embodiment.
Figure 13:
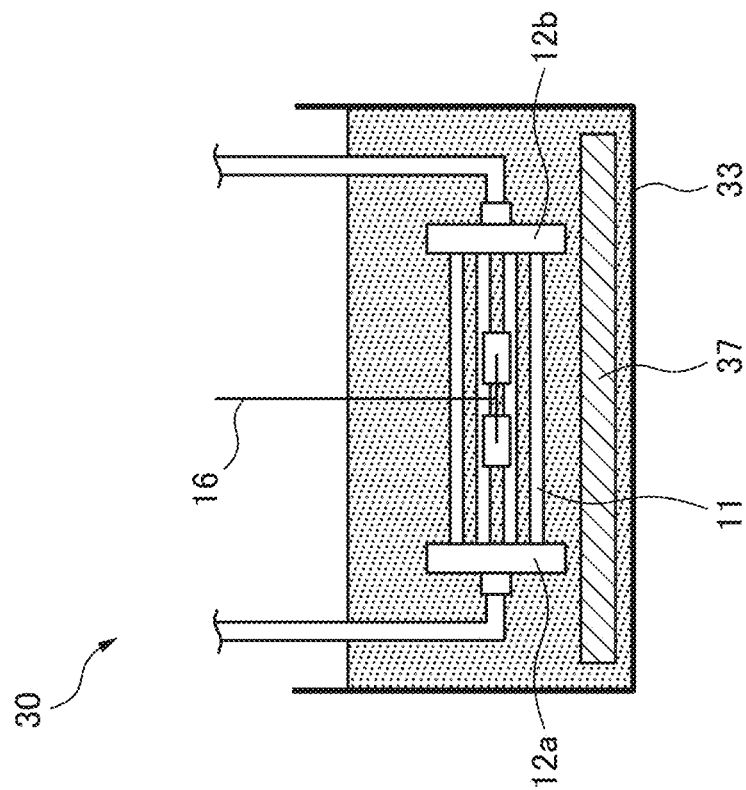
FIG. 13 is a diagram illustrating a membrane module for membrane distillation according to a preferred embodiment.
Figure 13:
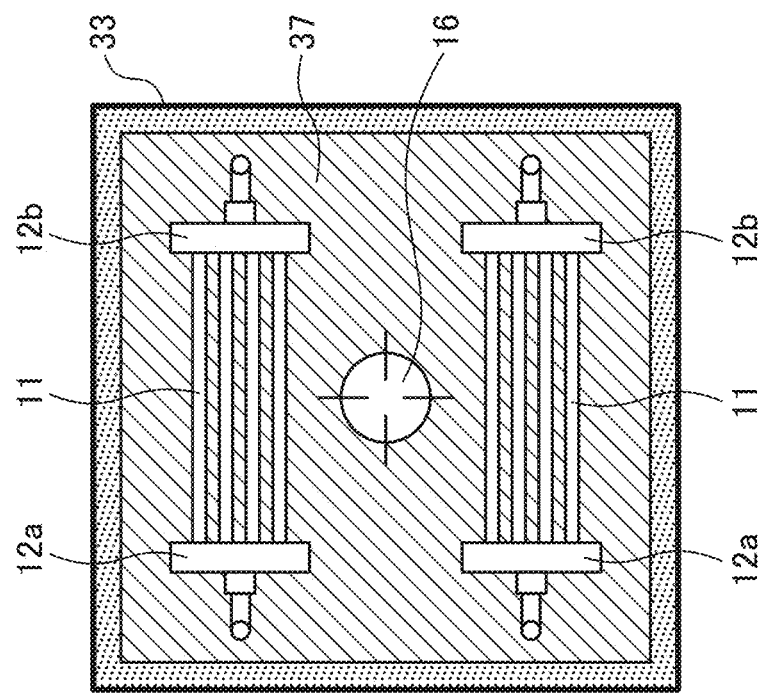

FIG. 12 and FIG. 13 are diagrams illustrating an example of the external pressure membrane module for membrane distillation of this embodiment, where FIG. 12(A) and FIG. 13(A) are side views and FIG. 12(B) and FIG. 13(B) are top views. Although FIG. 10 shows a mode in which the membrane module for membrane distillation 10 has one unit with hydrophobic porous hollow fiber membranes 11 and a pair of head sections 12*a*, 12*b* housed in a vertically placed container 13, the unit may also be housed in two or more containers 23, 33 as shown in FIGS. 12 and 13, which is preferred from the viewpoint of satisfactory water production efficiency. The unit may be vertically disposed in the water to be treated as shown in FIG. 10 and FIG. 12, or it may be horizontally disposed as shown in FIG. 13. Various configurations of hydrophobic porous hollow fiber membranes in the membrane module for membrane distillation are thus possible. For example, in the heating sections 17, 27 shown in FIG. 10 and FIG. 12, and the heating section 37 shown in FIG. 13, a mode may be adopted in which a heat source such as a heat exchanger or heater is used for heating, but it is more preferred to control heating using solar heat or the exhaust heat from an industrial process, since this can eliminate or reduce the heat energy costs required for heating. The configuration and construction of each of the elements of the membrane module for membrane distillation may be of different types as desired.

The membrane bundle of the hollow fiber membranes housed in the container 13, 23, 33 is preferably an aggregate of split bundles obtained by splitting into multiple units, from the viewpoint of uniformly supplying the water to be treated to the hollow fiber membranes.

After water to be treated has been supplied from outside the hollow fiber membranes and water vapor has selectively flowed into the hollow sections through the porous hollow fiber membranes, the water vapor moves through the hollow sections and is extracted from the one end E1 and other end E2 of the membrane module 10, 20, 30 through the head sections 12, 12*b*.

The hollow fiber membrane effective length L, i.e. the portion of the full length of the hollow fiber membrane at the location where the outer surfaces of the hollow fiber membranes are exposed (that is, not sealed by the anchoring resin) is preferably 60 mm or greater, more preferably 100 mm or greater and even more preferably 200 mm or greater from the viewpoint of producing high-purity water, while from the viewpoint of preventing accumulation of steam in the hollow sections to ensure satisfactory steam extraction, it is preferably no greater than 2000 mm, more preferably no greater than 1500 mm and even more preferably no greater than 1200 mm.

The ratio L/Dm between the hollow fiber membrane effective length L and the hollow fiber membrane inner diameter Dm is 100 or greater, preferably 150 or greater and even more preferably 200 or greater from the viewpoint of producing high-purity water, while from the viewpoint of preventing accumulation of steam at the hollow sections to ensure satisfactory steam extraction, it is preferably no greater than 1500, preferably no greater than 1350 and even more preferably no greater than 1200.

The ratio Sp/Sm between the cross-sectional area Sp per steam extraction flow channel and the total Sm of the diameter cross sections of the hollow sections of the hollow fiber membranes forming the membrane bundle is 0.25 or greater, preferably 0.3 or greater and more preferably 0.5 or greater from the viewpoint of preventing accumulation of steam at the hollow sections to ensure satisfactory steam extraction, while from the viewpoint of producing high-purity water, it is preferably no greater than 5, more preferably no greater than 3 and even more preferably no greater than 2.

Figure 14:
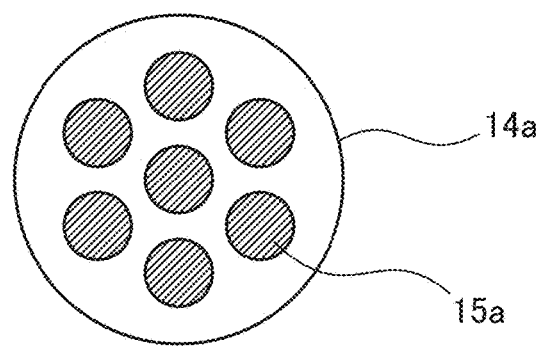
FIG. 14 is a diagram illustrating an example of a spacer configuration.

According to a preferred mode, the membrane module 10 has spacers 15*a*, 15*b* at the filling sections of the anchoring resin 14*a*, 14*b* (that is, the one end E1 and other end E2). The spacers 15*a*, 15*b* are typically provided between the hollow fiber membranes and the anchoring resin 14*a*, 14*b*, and inside the membrane bundle. With spacers it is possible to uniformly supply the water to be treated to each hollow fiber membrane. FIG. 14 shows cross-section 5-5 in FIG. 11. A plurality of the spacers 15*a*, 15*b* may be provided, as shown in FIG. 14, for example. The spacers used may be resin rods of the same material as the anchoring resin. For example, it preferably includes one or more selected from the group consisting of epoxy resins, vinyl ester resins, urethane resins, unsaturated polyester resins, olefin-based polymers, silicone resins and fluorine-containing resins, and more preferably it includes an epoxy resin or fluorine-containing resin, from the viewpoint of heat resistance.

The head sections 12*a*, 12*b* are each made of a resin or metal, for example. From the viewpoint of satisfactory cost of the membrane module, the head sections preferably include at least one selected from the group consisting of polyethylene, polypropylene, polysulfone, polyethersulfone, polyvinylidene fluoride, ABS resin and vinyl chloride resin.

The container 13, 23, 33 may be a storage tank such as a pit, for example, or it may be a resin or metal container. In the case of a storage tank, the treatment water may be simply stored in the storage tank so that the installation space can be made compact, and if the water level is controlled to a constant level then treatment may be carried out under constant conditions to allow stabilized production efficiency.

The external pressure membrane module for membrane distillation of this embodiment, and the membrane distillation device including it as a main member, may be used as a composite system combined with other water treatment technologies. For example, concentrated water produced by treatment using RO (Reverse Osmosis) can be further purified using the membrane distillation device of this embodiment to increase the water yield. The membrane distillation device of this embodiment may also be used as recovering means for a DS (Draw Solution) used in an FO (Forward Osmosis) method.

Three types of membrane modules of the invention (internal pressure, end-supplied external pressure and external pressure membrane distillation modules), and membrane distillation devices using them having been explained above, the following explanation regards the hydrophobic porous hollow fiber membranes to be used in the membrane modules.

The following three types of hydrophobic porous hollow fiber membranes will be described. The three types are identical in terms of exhibiting the effect of the invention (high flux of the membrane module and minimized salt permeation), but they may be used depending on the operating conditions.

Salt permeation according to the invention will now be explained.

As mentioned above, for the purpose of the invention, the phenomenon whereby non-dissolved solutes (such as NaCl crystals) precipitate and accumulate on the surface of the permeation side and on the interior of a porous membrane (thick membrane sections) is referred to as "salt permeation". When this phenomenon takes place, the flux gradually decreases or immediately decreases, producing an unstable state when it returns to the original state. One problem to be solved by the present invention is to minimize such salt permeation.

The problem of "wetting" that is to be solved by the present invention is the phenomenon whereby liquid to be treated passes from the sides of the membranes in contact with the liquid to be treated to the other sides as the hole surfaces inside the porous membranes become wetted with liquid, and the countermeasure provided is distinct from that for "salt permeation".

[1. Membrane with Large Pore Diameter (Average Pore Diameter: ≥0.20 µm), Large Void Percentage (≥60%) and Uniform Pore Size Distribution]
<Hydrophobic Resin>

The hydrophobic resin of this embodiment is a resin including a polymer with low affinity for water, examples thereof including polysulfone, polyethersulfone, polyvinylidene fluoride, polytetrafluoroethylene and polyolefins.

From the viewpoint of steam permeability, heat resistance and hydrophobic of the porous membranes, it is more preferred to use polyvinylidene fluoride as the hydrophobic resin.

<Porous Membranes>

The porous membranes according to the first embodiment of the membranes of the invention are to be used for membrane distillation, and have an average pore diameter of 0.20 µm or greater, a standard deviation of the pore size distribution of no greater than 0.05 µm, a void percentage of 60% or higher, and a surface open area ratio on at least one porous hollow fiber membrane surface of 20% or higher.

A structure of the porous membranes that is particularly excellent for the treatable water volume per unit time is specified as an average pore diameter of 0.20 µm or greater, a standard deviation of the pore size distribution of no greater than 0.05 µm, a void percentage of 60% or higher, and a surface open area ratio on at least one porous hollow fiber membrane surface of 20% or higher. The specific average pore diameter, void percentage, standard deviation of the pore size distribution and surface open area ratio were discovered as indices for selecting porous membranes with high treatable water volume.

The porous membranes according to a second embodiment of the invention are porous membranes including at least one resin selected from the group consisting of polysulfone, polyethersulfone, polyvinylidene fluoride, polytetrafluoroethylene, ethylene-tetrafluoroethylene copolymer, ethylene-ethylene tetrafluoride copolymer, polyethylene and polyolefins, wherein the average pore diameter is 0.20 µm or greater, the standard deviation of the pore size distribution is no greater than 0.05 µm, the void percentage is 60% or higher, the surface open area ratio on at least one porous hollow fiber membrane surface is 20% or higher, the air permeability coefficient is $1.6 \times 10^{-7}$ $m^3/m^2 \cdot sec \cdot Pa$ or greater and the tensile strength is 30 $kgf/cm^2$ or greater.

The indices for selecting porous membranes with particularly excellent treatable water volume for the porous membranes according to the second embodiment are, in addition to the average pore diameter, standard deviation of the pore size distribution, void percentage and surface open area ratio, also the resin material, air permeability coefficient and tensile strength.

The method for producing the porous membranes of the first and second embodiments, and their shapes, are not particularly restricted so long as they are membranes that include a hydrophobic resin as the major constituent component, and whose flux performance satisfies the conditions specified below.

The porous membranes of the first and second embodiments also have excellent wetting resistance, and from this viewpoint the water-repellent agent is preferably disposed on at least one surface of the porous membranes or within the pores of the porous membranes. More preferably, at least portions of the surfaces of the pores running through from one surface to the other surface of each porous membrane are coated with a water-repellent agent.

A water-repellent agent forms a hydrophobic coating film on the surface or interior of a base material, providing the base material with water-repellency or improving the water-repellency of the base material. The following methods are examples of methods of applying a water-repellent agent onto a base material such as a porous membrane.

(a) A method in which the base material surface is coated with a water-repellent agent with siloxane bonds, such as a silicon oil comprising dimethylsiloxane and an introduced functional group;

(b) A method in which a base material is coated with a polymer having a fluoroalkyl, alkylsilyl or fluorosilyl group, dissolved in or emulsified with a solvent;

(c) A method in which, during the method of (a) or (b), the coating film is crosslinked with a blocked isocyanate-based crosslinking agent to obtain a rigid coating film;

(d) A method in which a silane coupling agent is reacted with a base material and then bonded with a polymer having a fluoroalkyl, alkylsilyl or fluorosilyl group; and (e) A method in which an alkoxysilane is reacted with a base material and then bonded with a polymer having a fluoroalkyl, alkylsilyl or fluorosilyl group, similar to method (d).

The water-repellent agent on the surfaces or in the pores of the porous membranes can be confirmed by the relative element concentration determined by X-ray Photoelectron Spectroscopy (XPS), for example (described below).

From the viewpoint of wetting resistance and strength of the membranes, the components of the porous membranes include a hydrophobic resin at preferably 90 weight % or greater, more preferably 95 weight % or greater and even more preferably 99 weight % or greater.

The shapes of the porous membranes may be flat-membrane, tubular, hollow fiber or spiral shaped, for example. Hollow fiber shapes with increased membrane area per unit volume are preferred from the viewpoint of making the membrane module compact.

The present invention relates to porous membranes for membrane distillation that include a hydrophobic resin, and to a membrane module for membrane distillation and a membrane distillation device using the porous membranes.

The porous membranes may be produced by a conventional known method. Suitable methods to be used include a thermally induced phase separation method in which a molded resin is cooled to cause phase separation and form a porous layer, or a dry-wet method (non-solvent phase separation method) in which a molded resin is contacted with a poor solvent to cause phase separation and form a porous layer.

For this embodiment, "thermally induced phase separation method" refers to the following method.

A hydrophobic polymer, and a latent solvent that is a non-solvent for the hydrophobic polymer near room temperature but becomes a solvent at higher temperature, are heated and mixed at high temperature (at above their compatibility temperature) to form a melt. This is then cooled to below the solidification temperature of the hydrophobic polymer, utilizing the reduced dissolving power of the latent solvent for the hydrophobic polymer during the cooling process to cause phase separation between the polymer-rich phase and the polymer-diluted phase (solvent-rich phase). The latent solvent is then removed by extraction to obtain a porous membrane comprising a solid of the polymer-rich phase produced during phase separation.

Extraction removal of the latent solvent converts the obtained membrane to a porous membrane, thereby controlling the membrane surface open area ratio or air permeability coefficient of the obtained hydrophobic porous membrane.

Another type of thermally induced phase separation method that may be used is a method in which an inorganic filler is also added in addition to the hydrophobic polymer and latent solvent, and heated mixing is carried out for extraction removal of the inorganic filler together with the latent solvent during the extraction step after cooling solidification, to obtain a porous membrane.

When an inorganic filler is used, the inorganic filler functions as a support that holds the melt comprising the hydrophobic polymer and latent solvent, and also functions as nuclei for microphase separation.

Examples of latent solvents include, when the hydrophobic polymer is polyethylene, polypropylene or polyvinylidene fluoride, for example, phthalic acid esters such as dibutyl phthalate, dihexyl phthalate, dioctyl phthalate, di(2-ethylhexyl) phthalate and diisodecyl phthalate, as well as their mixed solvents.

Examples of latent solvents when the hydrophobic polymer is polysulfone or polyethersulfone, for example, include 2-(benzyloxy)ethanol, dimethyl sulfoxide, trimethyl trimellitate, N-methylbenzenesulfonamide and benzyl alcohol, as well as their mixed solvents.

A suitable method for obtaining a hydrophobic porous hollow fiber membrane using a thermally induced phase separation method is a method in which a hydrophobic polymer as the polymer for the membrane material, and a latent solvent (with an inorganic filler when necessary) are heated and mixed using an extruder to obtain a melt, and the melt is extruded from a hollow fiber molding spinneret (a nozzle comprising an annular hole for extrusion of the heated mixture onto an extrusion surface, and a circular hole for discharge of the hollow section-forming fluid inside the annular hole) into the form of a hollow fiber while injecting a hollow section-forming fluid into the circular hole, and is cooled to solidification, after which the latent solvent (and inorganic filler) are removed by extraction.

The hollow section-forming fluid is injected into the hollow section in a manner so that the hollow section of the hollow fiber-like extrusion does not collapse and close during the cooling solidification, and a gas or liquid is used that is essentially inert with respect to the extruded melt (does not produce any chemical change). The cooling solidification carried out after extrusion may involve a combination of both air-cooling and liquid cooling.

The essentially inert gas or liquid used may be nitrogen gas, air or a high-boiling-point liquid, for example.

Extraction of the latent solvent and extraction of the inorganic filler as necessary are carried out using a volatile liquid or aqueous solution that is essentially inert with respect to the cooled solid and that has excellent dissolving power for the latent solvent and inorganic filler. Examples of volatile liquids or aqueous solutions to be used for extraction of the latent solvent include alcohols and methylene chloride.

The volatile liquid or aqueous solution to be used for extraction of the inorganic filler may be an aqueous alkali solution such as an aqueous sodium hydroxide solution.

Hydrophobic silica is suitable for use as the inorganic filler.

Hydrophobic silica can be produced by chemical treatment of hydrophilic silica with a treatment agent such as silane or siloxane. Hydrophobic silica has low hygroscopicity and excellent dispersibility.

Hydrophobic silica having a mean primary particle size of 0.005 µm to 0.5 µm and an area-to-weight ratio of between 30 $m^2/g$ to 500 $m^2/g$ is preferred.

Hydrophobic silica has satisfactory dispersibility during heated mixture and is less likely to produce structural defects in the membrane, while it can also be easily extracted and removed with aqueous alkali solutions. Because hydrophobic silica has excellent dispersibility and is resistant to aggregation, it easily forms a three-dimensional network structure that is satisfactory in terms of the air permeability coefficient.

In a thermally induced phase separation method, a membrane-forming solution dissolved at high temperature is cooled to room temperature to induce phase separation and obtain a porous membrane, and the average pore diameter can be adjusted by adjusting the cooling rate when phase separation is induced.

When the cooling rate is fast, i.e. when the run distance from the spinneret to the cooling tank is short or the spinning speed is fast, the pore diameter is decreased, while conversely when the cooling rate is slow, i.e. when the run distance is long or the spinning speed is slow, the pore diameter is increased.

As the composition of the membrane-forming solution in a thermally induced phase separation method, preferably the hydrophobic polymer is at 15 parts by weight to 50 parts by weight, the latent solvent is at 10 parts by weight to 70 parts by weight and the inorganic filler when necessary is at 5 parts by weight to 40 parts by weight.

If the inorganic filler proportion is 5 parts by weight or greater it will be possible to form a three-dimensional network structure that is satisfactory from the standpoint of the air permeability coefficient, and if it is no greater than 40 parts by weight it will be possible to carry out stable spinning.

If the concentration of the hydrophobic polymer in the membrane-forming solution is 15 parts by weight or greater it will be possible to obtain a hydrophobic porous hollow fiber membrane with a high void percentage and with sufficient strength. If the concentration of the hydrophobic polymer in the membrane-forming solution is no greater than 50 parts by weight, it will be possible to obtain a hydrophobic porous hollow fiber membrane with a high void percentage and with excellent water permeability performance.

A hydrophobic porous hollow fiber membrane produced by a thermally induced phase separation method can also be stretched in the lengthwise direction of the hollow fibers.

The stretching procedure is carried out after cooling solidification, and either before or after extraction of the latent solvent (and/or inorganic filler). Elongation of the hollow fibers by stretching is preferably carried out within a suitable range that produces an effect of ensuring the open pore properties such as void percentage and average pore diameter, while not destroying the membrane structure.

For this embodiment, "non-solvent phase separation method" refers to the following method.

A membrane-forming solution containing a hydrophobic polymer and a solvent (with additives as necessary) is contacted with a poor solvent to cause phase separation of the hydrophobic polymer), and desolvation (solvent exchange) is carried out to obtain a porous membrane.

When the hydrophobic polymer is polysulfone, polyethersulfone or polyvinylidene fluoride, a hydrophobic porous membrane can be produced by a non-solvent phase separation method.

As the composition of the membrane-forming solution in a non-solvent phase separation method, preferably the hydrophobic polymer is at 10 parts by weight to 20 parts by weight, the solvent is at 60 parts by weight to 85 parts by weight and additives when necessary are at 5 parts by weight to 20 parts by weight.

A hydrophobic polymer concentration of 10 parts by weight to 20 parts by weight is preferred from the standpoint of balance between water permeability performance and strength of the obtained hydrophobic porous membrane, and stability of the spinning procedure. If the concentration of additives is 5 parts by weight or greater the effect exhibited by the additives will be sufficient, while spinning can be more stably carried out if the concentration is no greater than 20 parts by weight.

Examples of solvents include N-methyl-2-pyrrolidone and N,N-dimethylacetamide.

Examples of poor solvents include non-solvents such as water. The poor solvent used may be a mixed solvent comprising a non-solvent and the solvent for the membrane-forming solution.

If the solvent concentration is increased in a mixed solvent of a non-solvent and solvent, phase separation will be accelerated and the pore diameter will increase.

By varying the composition of the membrane-forming solution in a non-solvent phase separation method it is possible to change the porous structure or membrane properties of the hydrophobic porous membrane. For example, if a membrane-forming solution with a high hydrophobic polymer concentration is used, the density of the hydrophobic polymer of the obtained hydrophobic porous hollow fiber membrane can be increased and the membrane strength (tensile strength) can be increased. If a membrane-forming solution with a low hydrophobic polymer concentration is used, the density of the hydrophobic polymer of the hydrophobic porous membrane can be lowered and the pore diameter will tend to increase, allowing the void percentage or air permeability coefficient to be increased.

A longer run distance from the spinneret to the poor solvent-containing solidifying solution will accelerate phase separation and increase the pore diameter.

Hydrophilic additives may also be used for the purpose of adjusting the suitable range for the stock solution viscosity of the membrane-forming solution, and stabilizing the state of membrane formation while also modifying the phase separation speed. Using additives also allows the membrane structure or membrane properties of the hydrophobic porous membrane to be modified. Using a membrane-forming solution with a high hydrophilic additive concentration, for example, increases the pore diameter.

Examples of additives include polyvinylpyrrolidone, ethylene glycol, triethylene glycol and tetraethylene glycol.

The porous membranes of this embodiment exhibit high flux performance in membrane distillation. For this purpose, the average pore diameter of the porous membrane is 0.20 μm or greater and preferably 0.25 μm or greater. The upper limit is not particularly restricted but is essentially no greater than 0.5 μm. From the same viewpoint, the standard deviation of the pore size distribution of the porous membranes is no greater than 0.05 μm, and the void percentage is 60% or higher.

From the viewpoint of delaying progression of wetting, the membrane thickness of the porous membranes is preferably 60 μm or greater and more preferably 90 μm or greater. From the viewpoint of water permeability during membrane distillation, the membrane thickness is preferably no greater than 500 μm and more preferably no greater than 400 μm. The membrane thickness of a porous membrane can be measured based on a photomicrograph of the membrane cross-section, with reference to the method described in the Examples.

From the viewpoint of water permeability during membrane distillation, the surface open area ratio on at least one surface of the porous membrane, such as the surface of the porous membrane that is to contact with raw water (water to be treated), may be 20% or higher and is preferably 21% or higher. For the same reason, the air permeability coefficient of the porous membrane is preferably $1.6 \times 10^{-7}$ $m^3/(m^2 \cdot sec \cdot Pa)$ or greater and more preferably $5.0 \times 10^{-7}$ $m^3/(m^2 \cdot sec \cdot Pa)$ or greater.

The surface open area ratio of the membrane surface of a hydrophobic porous membrane that is to contact with water to be treated can be measured by analyzing an electron micrograph image with image analysis processing software, with reference to the methods described in the Examples. The air permeability coefficient of the hydrophobic porous membrane can be measured with reference to the method described in the Examples, by applying air at a constant pressure to the membrane surface on the other side from the membrane surface of the hydrophobic porous membrane that is to contact with the water to be treated, and measuring the permeation volume of air passing from the membrane surface in contact with the water to be treated, using a soap film flowmeter.

From the viewpoint of membrane flux performance and the viewpoint of mechanical strength and preventing water leakage during use under reduced pressure, the surface open area ratio of the membrane surface of the porous membrane that contacts with raw water (the "inner surface") is preferably no higher than 70% and more preferably no higher than 35%.

In order to achieve a treatable water volume necessary for exhibiting high flux performance, the tensile strength of the porous membrane is preferably 30 kgf/cm$^2$ or greater, more preferably 35 kgf/cm$^2$ or greater and less than 90 kgf/cm$^2$, and even more preferably 40 kgf/cm$^2$ or greater and less than 89 kgf/cm$^2$.

<Hollow Fiber Membranes>

The porous membranes to be used for membrane distillation are preferably porous hollow fiber membranes with through-holes, from the viewpoint of compactness and water treatment capacity of the membrane module.

When hollow fiber membranes are used as the porous membranes, their outer diameters are 300 μm to 5,000 μm and preferably 350 μm to 4,000 μm, and the inner diameters are 200 μm to 4,000 μm and preferably 250 μm to 3,000 μm.

The surface tension of the hollow fiber membranes when coated with the water-repellent agent is preferably 10 mN/m to 25 mN/m. Since the surface tension of a membrane cannot be directly measured, liquid samples with different surface tensions are prepared and their contact angles (θ) are measured. Plotting surface tension (γ) of each liquid and Cos θ yields a linear relationship, and the surface tension extrapolated to θ→0 (zero) is recorded as the surface tension of the membrane.

As regards the amount of water-repellent agent provided on the surface of each hollow fiber membrane from the viewpoint of hydrophobicity of the porous hollow fiber membrane, when a cross-section in the thickness direction of the hollow fiber membrane has been measured by X-ray Photoelectron Spectroscopy (XPS), the spectrum and assignments preferably satisfy the following (1) and/or (2):

(1) A C1s spectrum for CF$_3$-and for coupled CF$_2$—CF$_2$ is observed in the range of 295 to 291 eV, with a carbon element ratio for CF$_3$-and coupled CF$_2$—CF$_2$ of 0.5% or higher and lower than 15.0% among the total elements, and an O1s spectrum is observed in the range of 530 to 538 eV, with an oxygen element ratio of 1.0% or higher and lower than 15.0% among the total elements;

(2) A Si2p spectrum is observed in the range of 100 to 102 eV, with a silicon element ratio of 3.0% or higher and lower than 20.0% among the total elements, and an O1s spectrum is observed in the range of 530 to 538 eV, with an oxygen element ratio of 5.0% or higher and lower than 25.0% among the total elements.

The hollow fiber membranes of this embodiment can be used as a hollow fiber module having the plurality of hydrophobic porous hollow fiber membranes bundled and housed in a cylindrical container and comprising an anchoring resin (potting resin) filling the gaps between the hollow fibers and the gaps between the hollow fibers and the container, at the ends of the hollow fibers. A resin or metal, for example, may be suitably used as the material of the container.

In this module, at least one end of each hollow fiber membrane is open, and head sections having a water flow opening may be fitted at the upper and lower ends of the container. A connection port for connection with a recovery unit may be provided on the side wall of the container. The number of connection ports is not particularly restricted, and there may be one or a plurality.

[2. Membrane with Medium Pore Diameter (Average Pore Diameter: 0.15 to 0.20 μm) and High Contact Angle)(≥90°)]

<Hydrophobic Resin>

The hydrophobic resin of this embodiment is a resin including a polymer with low affinity for water, examples thereof including polysulfone, polyethersulfone, polyvinylidene fluoride, polytetrafluoroethylene, ethylene/ethylene tetrafluoride copolymers and polyolefins.

The water contact angle of a resin may be used as an index of its affinity with water. A larger contact angle is considered to be lower affinity with water. In order to exhibit the effect of the invention, the contact angle of the resin is preferably 70° or larger and more preferably 80° or larger. The contact angle can be measured by a droplet method in which the base material to be measured is coated with the resin and 2 μL of purified water is dropped onto the coated surface at a temperature of 23° C. and a relative humidity of 50%.

From the viewpoint of hydrophobicity, steam permeability and heat resistance of the porous membrane, the hydrophobic resin preferably includes a polyolefin, and more preferably at least one of polyethylene and polypropylene.

<Porous Membranes>

The porous membranes according to the first embodiment are used for membrane distillation, and the average pore diameter is 0.15 μm or greater and less than 0.20 μm, the standard deviation of the pore size distribution is no greater than 0.05 μm, the surface open area ratio on at least one surface is 20% or higher and the contact angle of at least one surface with purified water is 90° or larger.

The structure of a porous membrane having a high treatable water volume per unit time and minimal wetting is defined by an average pore diameter of 0.15 μm or greater and less than 0.20 μm, a standard deviation of the pore size distribution of no greater than 0.05 μm, a surface open area ratio of 20% or higher and a water contact angle of 90° or larger. The specific average pore diameter, standard deviation of the pore size distribution, surface open area ratio and water contact angle have been discovered as indices for selection of a porous membrane with excellent treatable water volume and wetting resistance.

The porous membranes according to a second embodiment include at least one resin selected from the group consisting of polysulfone, polyethersulfone, polyvinylidene fluoride, polytetrafluoroethylene and polyolefins, wherein the average pore diameter is 0.15 μm or greater and less than 0.20 μm, the standard deviation of the pore size distribution is no greater than 0.05 μm, the surface open area ratio on at least one porous hollow fiber membrane surface is 20%, the contact angle of the surface with purified water is 90° or larger, the air permeability coefficient is $1.0 \times 10^{-7}$ m$^3$/(m$^2$·sec·Pa) or greater and the tensile strength is 30 kgf/cm$^2$ or greater.

The indices for selecting porous membranes with excellent treatable water volume and wetting resistance for the porous membranes according to the second embodiment are, in addition to the average pore diameter, standard deviation of the pore size distribution, surface open area ratio and water contact angle, also the resin material, air permeability coefficient and tensile strength.

The method for producing the porous membranes of the first and second embodiments, and their shapes, are not particularly restricted so long as they are membranes that include a hydrophobic resin as the major constituent component, and whose wetting resistance satisfies the conditions specified below.

From the viewpoint of wetting resistance and strength of the membranes, the components of the porous membranes include a hydrophobic resin at preferably 90 weight % or greater, more preferably 95 weight % or greater and even more preferably 99 weight % or greater.

From the viewpoint of wetting resistance, the water-repellent agent is preferably disposed on at least one surface of the porous membranes or within the pores of the porous membranes. More preferably, at least portions of the surfaces of the pores running through from one surface to the other surface of each porous membrane is coated with a water-repellent agent.

A water-repellent agent forms a hydrophobic coating film on the surface or interior of a base material, providing the base material with water-repellency or improving the water-repellency of the base material. The method of applying the water-repellent agent to a base material such as a porous membrane is the same as for the membranes described under Item 1 above.

The water-repellent agent on the surfaces or in the pores of the porous membranes is confirmed by the relative element concentration determined by X-ray Photoelectron Spectroscopy (XPS), for example.

The shapes of the porous membranes may be flat-membrane, tubular, hollow fiber or spiral shaped, for example. Hollow fiber shapes with increased membrane area per unit volume are preferred from the viewpoint of making the membrane module compact.

The porous membranes may be produced by a conventional known method, similar to the one described for the membranes of Item 1 above. Suitable methods to be used include a thermally induced phase separation method in which a molded resin is cooled to cause phase separation and form a porous layer, or a dry-wet method (non-solvent phase separation method) in which a molded resin is contacted with a poor solvent to cause phase separation and form a porous layer.

Another type of thermally induced phase separation method that may be used, similar to the method described for the membranes of Item 1 above, is a method in which an inorganic filler is also added in addition to the hydrophobic polymer and latent solvent, and heated mixing is carried out for extraction removal of the inorganic filler together with the latent solvent during the extraction step after cooling solidification, to obtain a porous membrane.

The porous membranes of this embodiment have high wetting resistance. That is, when the solution to be treated is a 750 mg/L sodium dodecyl sulfate aqueous solution, the time required until wetting is 50 hours or longer and more preferably 100 hours or longer. The time required until wetting can be measured by the method described in the Examples below.

In order to impart the prescribed wetting resistance to the membranes, the maximum pore diameter of the porous membranes is preferably no greater than 0.25 μm. Since a larger pore diameter tends to facilitate infiltration of liquid into the pores and make wetting more likely, it is important for the maximum pore diameter to be a value of no greater than 0.25 μm for increased wetting resistance. The maximum pore diameter of the porous membranes can be measured by the bubble point method, or by scanning electron microscope (SEM) observation of the membrane surface or a membrane cross-section along the thickness direction of the membrane.

From the viewpoint of delaying progression of wetting, the membrane thickness of the porous membranes is preferably 60 μm or greater and more preferably 90 μm or greater. From the viewpoint of water permeability during membrane distillation, the membrane thickness is preferably no greater than 500 μm and more preferably no greater than 400 μm. The membrane thickness of a porous membrane can be measured based on a photomicrograph of the membrane cross-section, with reference to the method described in the Examples.

From the viewpoint of water permeability during membrane distillation, the surface open area ratio on at least one surface of the porous membrane, such as the surface of the porous membrane that is to contact with raw water (water to be treated), may be 20% or higher and is preferably 21% or higher. For the same reason, the air permeability coefficient of the porous membrane is preferably $1.0 \times 10^{-7}$ m$^3$/(m$^2$·sec·Pa) or greater and more preferably $5.0 \times 10^{-7}$ m$^3$/(m$^2$·sec·Pa) or greater.

The surface open area ratio of the membrane surface of a hydrophobic porous membrane that is to contact with water to be treated can be measured by analyzing an electron micrograph image with image analysis processing software, with reference to the methods described in the Examples. The air permeability coefficient of the hydrophobic porous membrane can be measured with reference to the method described in the Examples, by applying air at a constant pressure to the membrane surface on the other side from the membrane surface of the hydrophobic porous membrane that is to contact with the water to be treated, and measuring the permeation volume of air passing from the membrane surface in contact with the water to be treated, using a soap film flowmeter.

From the viewpoint of high flux performance for membrane distillation, the average pore diameter of the porous membranes is 0.15 μm or greater and less than 0.20 μm, and preferably 0.16 μm or greater and no greater than 0.19 μm. From the same viewpoint, the standard deviation of the pore size distribution of the porous membranes is no greater than 0.05 μm.

From the viewpoint of hydrophobicity and wetting resistance during membrane distillation, the contact angle of purified water on at least one surface of the porous membranes, such as the surface of the porous membrane that contacts with water to be treated, is 90° or larger and preferably 91° or larger. The contact angle of the membrane surface with purified water is measured by the droplet method, i.e. by dropping 2 μL of purified water onto the porous membrane at a temperature of 23° C. and a relative humidity of 50%, for example.

From the viewpoint of membrane mechanical strength and the viewpoint of preventing water leakage during use under reduced pressure, the surface open area ratio of the membrane surface of the porous membrane that contacts with raw water (the "inner surface") is preferably no higher than 70% and more preferably no higher than 35%.

From the viewpoint of both treatable water volume and wetting resistance, the tensile strength of the porous membranes is preferably 30 kgf/cm$^2$ or greater, more preferably 35 kgf/cm$^2$ or greater and less than 90 kgf/cm$^2$, and even more preferably 40 kgf/cm$^2$ or greater and less than 89 kgf/cm$^2$.

<Hollow Fiber Membranes>

The porous membranes to be used for membrane distillation are preferably porous hollow fiber membranes with through-holes, from the viewpoint of compactness and water treatment capacity of the membrane module.

When hollow fiber membranes are used as the porous membranes, their outer diameters are 300 µm to 5,000 µm and preferably 350 µm to 4,000 µm, and the inner diameters are 200 µm to 4,000 µm and preferably 250 µm to 3,000 µm.

From the viewpoint of hydrophobicity of the hollow fiber membranes, the water contact angle of the hollow fiber membranes is preferably between 90° and 150°. The water contact angle of the hollow fiber membranes is measured by the droplet method described above.

The surface tension of the hollow fiber membranes when coated with the water-repellent agent is preferably 10 mN/m to 25 mN/m. Since the surface tension of a membrane cannot be directly measured, liquid samples with different surface tensions are prepared and their contact angles (θ) are measured. Plotting surface tension (γ) of each liquid and Cos θ yields a linear relationship, and the surface tension extrapolated to θ→0 (zero) is recorded as the surface tension of the membrane.

As regards the amount of water-repellent agent provided on the surface of each hollow fiber membrane from the viewpoint of hydrophobicity of the porous hollow fiber membrane, when a cross-section in the thickness direction of the hollow fiber membrane has been measured by X-ray Photoelectron Spectroscopy (XPS), the spectrum and assignments preferably satisfy the following (1) and/or (2):

(1) A C1s spectrum for $CF_3$-and for coupled $CF_2$—$CF_2$ is observed in the range of 295 to 291 eV, with a carbon element ratio for $CF_3$-and coupled $CF_2$—$CF_2$ of 0.5% or higher and lower than 15.0% among the total elements, and an O1s spectrum is observed in the range of 530 to 538 eV, with an oxygen element ratio of 1.0% or higher and lower than 15.0% among the total elements;

(2) A Si2p spectrum is observed in the range of 100 to 102 eV, with a silicon element ratio of 3.0% or higher and lower than 20.0% among the total elements, and an O1s spectrum is observed in the range of 530 to 538 eV, with an oxygen element ratio of 5.0% or higher and lower than 25.0% among the total elements.

The membranes may also be used as a hollow fiber module having the plurality of hydrophobic porous hollow fiber membranes bundled and housed in a cylindrical container and comprising an anchoring resin (potting resin) filling the gaps between hollow fibers and the gaps between the hollow fibers and the container, at the ends of the hollow fibers. A resin or metal, for example, may be used as the material of the container.

In this module, one end of each hollow fiber membrane is open, and head sections having a water flow opening may be fitted at the upper and lower ends of the container. A connection port for connection with a recovery unit may be provided on the side wall of the container. The number of connection ports is not particularly restricted, and there may be one or a plurality.

[3. Membrane with Small Pore Diameter (Maximum Pore Diameter: ≤0.25 µm, Thick Film (≥60 µm)]
<Hydrophobic Resin>

The hydrophobic resin of this embodiment is a resin including a polymer with low affinity for water, examples thereof including polysulfone, polyethersulfone, polyvinylidene fluoride, polytetrafluoroethylene, ethylene/ethylene tetrafluoride copolymers and polyolefins. The water contact angle of a resin may be used as an index of its affinity with water. A larger contact angle is considered to be lower affinity with water. In order to exhibit the effect of the invention, the contact angle of the resin is preferably 70° or larger and more preferably 80° or larger. The contact angle can be measured by a droplet method in which the base material to be measured is coated with the resin and 2 µL of purified water is dropped onto the coated surface at a temperature of 23° C. and a relative humidity of 50%.

From the viewpoint of hydrophobicity, steam permeability and heat resistance of the porous membrane, the hydrophobic resin preferably includes a polyolefin, and more preferably at least one of polyethylene and polypropylene.
<Porous Membranes>

The porous membranes of the first embodiment are used for membrane distillation, and the maximum pore diameter is no greater than 0.25 µm, the standard deviation of the pore size distribution is no greater than 0.05 µm, the membrane thickness is 60 µm or greater, and the surface open area ratio on at least one surface is 20% or higher.

The structure of a porous membrane having a high treatable water volume per unit time and minimal wetting is defined by a maximum pore diameter of no greater than 0.25 µm, a standard deviation of the pore size distribution of no greater than 0.05 µm, a membrane thickness of 60 µm or greater and a surface open area ratio of 20% or higher. While it is not our desire to be constrained by theory, it is thought that since wetting occurs in one porous membrane at a section with relatively large pore diameters, controlling the maximum pore diameter of the porous membranes to no greater than 0.25 µm can increase the wetting resistance. Also, the standard deviation of the pore size distribution and surface open area ratio of a porous membrane with a specific membrane thickness is thought to contribute to the flux performance in membrane distillation. Therefore, a specific maximum pore diameter, standard deviation of the pore size distribution, membrane thickness and surface open area ratio were discovered to be indices for selection of porous membranes with excellent treatable water volume and wetting resistance.

The porous membranes according to a second embodiment include at least one resin selected from the group consisting of polysulfone, polyethersulfone, polyvinylidene fluoride, polytetrafluoroethylene, polyethylene and polypropylene, wherein the maximum pore diameter is no greater than 0.25 µm, the standard deviation of the pore size distribution is no greater than 0.05 µm, the membrane thickness is 60 µm or greater, the surface open area ratio on at least one surface is 20% or higher, the air permeability coefficient is $1.0 \times 10^{-7}$ m³/(m²·sec·Pa) or greater and the tensile strength is 30 kgf/cm² or greater.

The indices for selecting porous membranes with excellent treatable water volume and wetting resistance for the porous membranes according to the second embodiment are, in addition to the maximum pore diameter, standard deviation of the pore size distribution, membrane thickness and surface open area ratio, also the resin material, air permeability coefficient and tensile strength.

The method for producing the porous membranes of the first and second embodiments and their shapes, are not particularly restricted so long as they are membranes that include a hydrophobic resin as the major constituent component, and whose wetting resistance satisfies the conditions specified below.

From the viewpoint of wetting resistance and strength of the membranes, the components of the porous membranes include a hydrophobic resin at preferably 90 weight % or greater, more preferably 95 weight % or greater and even more preferably 99 weight % or greater.

From the viewpoint of wetting resistance and inhibiting salt permeation, the water-repellent agent is preferably disposed on at least one surface of the porous membranes or within the pores of the porous membranes. More preferably, at least portions of the surfaces of the pores running through from one surface to the other surface of each porous membrane is coated with a water-repellent agent.

A water-repellent agent forms a hydrophobic coating film on the surface or interior of a base material, providing the base material with water-repellency or improving the water-repellency of the base material. The method of applying the water-repellent agent to a base material such as a porous membrane may be the same as for the membranes described under Item 1 above.

The water-repellent agent present on the surface and in the pores of the porous membranes can be confirmed based on the relative element concentration determined by X-ray Photoelectron Spectroscopy (XPS), for example, similar to the method described for the membranes of Item 1 above.

The shapes of the porous membranes may be flat-membrane, tubular, hollow fiber or spiral shaped, for example. Hollow fiber shapes with increased membrane area per unit volume are preferred from the viewpoint of making the membrane module compact.

The porous membranes may be produced by a conventional known method, similar to the one described for the membranes of Item 1 above. Suitable methods to be used include a thermally induced phase separation method in which a molded resin is cooled to cause phase separation and form a porous layer, or a dry-wet method (non-solvent phase separation method) in which a molded resin is contacted with a poor solvent to cause phase separation and form a porous layer.

The porous membranes of this embodiment have high wetting resistance. That is, when the solution to be treated is a 750 mg/L sodium dodecyl sulfate aqueous solution, the time required until wetting is 50 hours or longer and more preferably 100 hours or longer. The time required until wetting can be measured by the method described in the Examples below.

In order to impart the wetting resistance described above to the membranes, the maximum pore diameter of the porous membranes is preferably no greater than 0.25 μm and more preferably greater than 0.18 μm and no greater than 0.24 μm. Since a larger pore diameter tends to facilitate infiltration of liquid into the pores and make wetting more likely, it is important for the maximum pore diameter to be a value of no greater than 0.25 μm for increased wetting resistance. The maximum pore diameter of a porous membrane can be measured with reference to the method described in the Examples.

From the viewpoint of delaying progression of wetting, the membrane thickness of the porous membranes is 60 μm or greater and preferably 90 μm or greater. From the viewpoint of water permeability during membrane distillation, the membrane thickness is preferably no greater than 500 μm and more preferably no greater than 400 μm. The membrane thickness of a porous membrane can be measured based on a photomicrograph of the membrane cross-section, with reference to the method described in the Examples.

From the viewpoint of water permeability during membrane distillation, the surface open area ratio on at least one surface of the porous membrane, such as the surface of the porous membrane that is to contact with raw water (water to be treated), may be 20% or higher and is preferably 21% or higher. For the same reason, the air permeability coefficient of the porous membrane is preferably $1.0 \times 10^{-7}$ m$^3$/(m$^2$·sec·Pa) or greater and more preferably $5.0 \times 10^{-7}$ m$^3$/(m$^2$·sec·Pa) or greater.

The surface open area ratio of the membrane surface of a hydrophobic porous membrane that is to contact with water to be treated can be measured by analyzing an electron micrograph image with image analysis processing software, with reference to the methods described in the Examples. The air permeability coefficient of the hydrophobic porous membrane can be measured with reference to the method described in the Examples, by applying air at a constant pressure to the membrane surface on the other side from the membrane surface of the hydrophobic porous membrane that is to contact with the water to be treated, and measuring the permeation volume of air passing from the membrane surface in contact with the water to be treated, using a soap film flowmeter.

From the viewpoint of high flux performance for membrane distillation, the average pore diameter of the porous membranes is 0.15 μm or greater and less than 0.20 μm, and preferably 0.16 μm or greater and no greater than 0.19 μm. From the same viewpoint, the standard deviation of the pore size distribution of the porous membranes is no greater than 0.05 μm.

From the viewpoint of hydrophobicity and wetting resistance during membrane distillation, the contact angle of purified water on at least one surface of the porous membranes, such as the surface of the porous membrane that contacts with water to be treated, is 90° or larger and preferably 91° or larger. The contact angle of the membrane surface with purified water is measured by the droplet method, i.e. by dropping 2 μL of purified water onto the porous membrane at a temperature of 23° C. and a relative humidity of 50%, for example.

From the viewpoint of membrane mechanical strength and the viewpoint of preventing water leakage during use under reduced pressure, the surface open area ratio of the membrane surface of the porous membrane that contacts with raw water (water to be treated) (hereunder referred to as the "inner surface") is preferably no higher than 70% and more preferably no higher than 35%.

From the viewpoint of both treatable water volume and wetting resistance, the tensile strength of the porous membranes is preferably 30 kgf/cm$^2$ or greater, more preferably 35 kgf/cm$^2$ or greater and less than 90 kgf/cm$^2$, and even more preferably 40 kgf/cm$^2$ or greater and less than 89 kgf/cm$^2$.

<Hollow Fiber Membranes>

The porous membranes to be used for membrane distillation are preferably porous hollow fiber membranes with through-holes, from the viewpoint of compactness and water treatment capacity of the membrane module.

When hollow fiber membranes are used as the porous membranes, their outer diameters are 300 μm to 5,000 μm and preferably 350 μm to 4,000 μm, and the inner diameters are 200 μm to 4,000 μm and preferably 250 μm to 3,000 μm.

From the viewpoint of hydrophobicity of the hollow fiber membranes, the water contact angle of the hollow fiber membranes is preferably between 90° and 150°. The water contact angle of the hollow fiber membranes is measured by the droplet method described above.

The surface tension of the hollow fiber membranes when coated with the water-repellent agent is preferably 10 mN/m to 25 mN/m. Since the surface tension of a membrane cannot be directly measured, liquid samples with different surface tensions are prepared and their contact angles (θ) are measured. Plotting surface tension (γ) of each liquid and Cos θ yields a linear relationship, and the surface tension extrapolated to θ→0 (zero) is recorded as the surface tension of the membrane.

As regards the amount of water-repellent agent provided on the surface of each hollow fiber membrane from the viewpoint of hydrophobicity of the porous hollow fiber membrane, when a cross-section in the thickness direction of the hollow fiber membrane has been measured by X-ray Photoelectron Spectroscopy (XPS), the spectrum and assignments preferably satisfy the following (1) and/or (2):

(1) A C1s spectrum for $CF_3$-and for coupled $CF_2$—$CF_2$ is observed in the range of 295 to 291 eV, with a carbon element ratio for $CF_3$-and coupled $CF_2$—$CF_2$ of 0.5% or higher and lower than 15.0% among the total elements, and an O1s spectrum is observed in the range of 530 to 538 eV, with an oxygen element ratio of 1.0% or higher and lower than 15.0% among the total elements;

(2) A Si2p spectrum is observed in the range of 100 to 102 eV, with a silicon element ratio of 3.0% or higher and lower than 20.0% among the total elements, and an O1s spectrum is observed in the range of 530 to 538 eV, with an oxygen element ratio of 5.0% or higher and lower than 25.0% among the total elements.

The membranes may also be used as a hollow fiber module having the plurality of hydrophobic porous hollow fiber membranes bundled and housed in a cylindrical container and comprising an anchoring resin (potting resin) filling the gaps between hollow fibers and the gaps between the hollow fibers and the container, at the ends of the hollow fibers. A resin or metal, for example, may be used as the material of the container.

In this module, one end of each hollow fiber membrane is open, and head sections having a water flow opening may be fitted at the upper and lower ends of the container. A connection port for connection with a recovery unit may be provided on the side wall of the container. The number of connection ports is not particularly restricted, and there may be one or a plurality.

According to the invention, as mentioned above, the porous membranes are coated with a water-repellent agent and exhibit an effect of minimizing salt permeation, which will now be explained in greater detail.

[Water-Repellent Agent Coating Film]

Preferably, one surface of each porous membrane for membrane distillation of this embodiment (for example, the "inside of the hollow fiber membrane") and/or the other surface (for example, the "outside of the hollow fiber membrane"), as well as at least portions of the through-hole surfaces, are coated with a water-repellent agent. When a porous membrane having through-holes is incorporated into a membrane distillation module or membrane distillation device, and the surface of the porous membrane that is expected to contact with raw water is defined as the inner surface and the surface of the porous membrane that is expected to contact with permeated water or the surface through which only water vapor permeates is defined as the outer surface, preferably the inner surface and outer surface of the porous membrane, and at least a portion of the through-hole surfaces of the porous membrane are coated with a water-repellent agent.

From the viewpoint of membrane distillation, the porous membranes with through-holes are preferably hydrophobic. While it is not our desire to be constrained by theory, it is thought that a membrane that has through-holes and is porous and hydrophobic allows the salt permeation during membrane distillation to be minimized.

From the viewpoint of the hydrophobicity of the porous membranes, the water contact angle of the porous membranes is preferably between 95° and 150° and more preferably between 100° and 150°, when measured by a droplet method. A droplet method may be carried out by dropping 2 μL of purified water onto a porous membrane such as a hollow fiber membrane at a temperature of 23° C. and a relative humidity of 50%, for example.

The hydrophobicity of a porous membrane can be adjusted, for example, by (i) selection or scouring of the porous membrane material, or (ii) hydrophobic coating of at least portions of the inner side of the porous membrane and preferably the surfaces of the through-holes of the porous membrane.

Membranes that have through-holes and are porous and hydrophobic include hydrophobic polymers as their major constituent components. A hydrophobic polymer is a polymer with low affinity for water, and examples include one or more resins selected from the group consisting of polysulfone, polyethersulfone, polyethylene, polypropylene, polyvinylidene fluoride, polytetrafluoroethylene and ethylene/ethylene tetrafluoride copolymers. Polyvinylidene fluoride and ethylene-ethylene tetrafluoride copolymers are preferred from the viewpoint of hydrophobicity, film formability, mechanical properties and thermal durability, and more preferably, the impurities such as plasticizer are removed by scouring either after polymerization of the polymers or after formation of the membrane from them.

Throughout the present specification, "hydrophobic polymer as a major constituent component" refers to containing a hydrophobic polymer at 90 weight % or greater among the components forming the hydrophobic porous membrane, this content being preferably 95 weight % or greater and more preferably 99 weight % or greater, from the viewpoint of membrane strength.

The porous membrane of this embodiment preferably has the inner surface and outer surface, and at least portions of the through-hole surfaces, coated with a water-repellent agent.

(Inner Surface, Outer Surface and Through-Hole Surfaces)

Throughout the present specification, the inner surface of a porous membrane is the surface of the porous membrane that is expected to contact with raw water when it has been incorporated into a membrane distillation module or membrane distillation device, and it includes a region to a depth of about 30 μm from the outer surface in the thickness direction of the porous membrane.

Throughout the present specification, the outer surface of a porous membrane is the surface of the porous membrane that is expected to contact with permeated water, or the surface where only water vapor permeates, when it has been incorporated into a membrane distillation module or membrane distillation device, and it includes a region to a depth of about 30 μm from the outer surface in the thickness direction of the porous membrane.

Throughout the present specification, the through-hole surfaces of the porous membrane correspond to the surfaces at the voids inside the porous membrane, excluding the inner surface and outer surface as defined above.

According to the invention, references to the surfaces of the porous hollow fibers indicate the entirety including the inner surfaces, outer surfaces and through-hole surfaces of the porous hollow fiber membrane.

(Water-Repellent Agent)

A water-repellent agent forms a hydrophobic coating film on the surface or interior of a base material, providing the base material with water-repellency or improving the water-repellency of the base material. The following methods are examples of methods of applying a water-repellent agent onto a base material such as a porous membrane.

(a) A method of coating the base material surface with a water-repellent agent with a siloxane bond, for example, a straight silicon oil such as a dimethylsilicone oil or methylphenylsilicone oil, a reactive modified silicone oil having an organic functional group such as an amino group introduced, or a non-functional silicone oil that has been fluoroalkyl-modified;

(b) A method in which a base material is coated with a solution or emulsion of a polymer such as a fluoroalkyl, alkylsilyl or fluorosilyl polymer as the main component in a carbon-based solvent or fluorine-based solvent;

(c) A method in which, during the method of (a) or (b), the coating film is crosslinked with a blocked isocyanate-based crosslinking agent to obtain a rigid coating film;

(d) A method in which a silane coupling agent is reacted with a base material and then bonded with a polymer having a fluoroalkyl, alkylsilyl or fluorosilyl group; and (e) A method in which an alkoxysilane is reacted with a base material and then bonded with a polymer having a fluoroalkyl, alkylsilyl or fluorosilyl group, similar to method (d).

(Quantitation of Water-Repellent Agent)

The amount of water-repellent agent present on the membrane surface is determined based on the relative element concentration determined by X-ray Photoelectron Spectroscopy (XPS), as described above. The membrane surface to be coated with the water-repellent agent may be the inner surface or outer surface of the porous membrane, or the through-hole surfaces of the porous membrane.

The membrane surface that has been coated with a fluorine-based water-repellent agent has a C1s spectrum for $CF_3$-and coupled $CF_2$—$CF_2$ states observed in the range of 295 to 291 eV in XPS, and the carbon element ratio of $CF_3$-and coupled $CF_2$—$CF_2$ states among the total elements is preferably 0.5% or greater and less than 15.0%, and more preferably 1.0% or greater and less than 10%. The membrane surface that has been coated with a fluorine-based water-repellent agent also has an O1s spectrum observed in the range of 530 to 538 eV in XPS, and the oxygen element ratio among the total elements is preferably 1.0% or greater and less than 15.0% and more preferably 2.0% to 10%.

The membrane surface that has been coated with a silicon-based water-repellent agent has a Si2p spectrum observed in the range of 100 to 102 eV in XPS, and the silicon element ratio among the total elements is preferably 3.0% or greater and less than 20.0% and more preferably 5.0% or greater and less than 15%. The membrane surface that has been coated with a silicon-based water-repellent agent also has an O1s spectrum observed in the range of 530 to 538 eV in XPS, and the oxygen element ratio among the total elements is preferably 5.0% or greater and less than 25.0% and more preferably 10.0% or greater and less than 20.0%.

(Opening Ratio, Pore Size Distribution and Porosity)

A porous membrane having the inner surface, the outer surface and at least a portion of the through-hole surfaces coated with a water-repellent agent preferably has a pore size distribution such that the opening ratio on the inner surface is in the range is 20% to 50% and the ratio of the maximum pore diameter with respect to the average pore diameter is in the range of 1.2 to 2.5, and more preferably the average pore diameter is in the range of 0.01 μm to 1 μm and the porosity is 50% to 85%.

A ratio of the maximum pore diameter with respect to the average pore diameter in the range of 1.2 to 2.5 means that the sizes of the pore diameters are uniform. If the pore size distribution is increased, steam will be concentrated and pass through the pores with large diameters, thus accelerating salt permeation and wetting. From this viewpoint, the ratio of the maximum pore diameter with respect to the average pore diameter of the porous membrane is preferably in the range of 1.2 to 2.5, and more preferably the average pore diameter is 0.01 μm to 1 μm and the porosity is 50% to 85%.

In addition, if the opening ratio on the inner surface is 50% or lower, it will tend to be easier to minimize wetting and salt permeation, in addition to improving the mechanical strength and water permeability retention of the membrane. The upper limit for the opening ratio on the inner surface is more preferably 35% or lower. From the viewpoint of water permeability during membrane distillation, the opening ratio on the inner surface is preferably 20% or higher and more preferably 25% or higher.

The opening ratio, pore size distribution and porosity of a porous membrane can be measured by analyzing an electron micrograph image with image analysis processing software, with reference to the methods described in the Examples.

A porous membrane having the pore size distribution, opening ratio on the inner surface and porosity described above can be provided by the following methods, for example, as was explained above:

(a) By obtaining a porous membrane having a sharp pore size distribution;

(b) By a method using a large pore diameter cutting method, such as a method of controlling the amount of plasticizer extraction or the extraction behavior when membranes formed from a resin material are rendered porous, or a method of filling in large pore diameter sections by pressing silicon powder into the porous membranes.

(Membrane Thickness)

For this embodiment, from the viewpoint of the water permeability during membrane distillation and the membrane mechanical strength, the membrane thickness of the hydrophobic and porous membranes is preferably 10 μm to 500 μm and more preferably 15 μm to 300 μm. If the membrane thickness is no greater than 500 μm it will be possible to minimize reduction in water permeability performance. A membrane thickness of 10 μm or greater can prevent deformation of the membranes or obstruction of the flow channels during use under reduced pressure.

(Balance Between Water Permeability Performance and Salt Permeation)

From the viewpoint of obtaining balance between increased water permeability performance and reduced salt permeation of the membrane distillation module, when the membrane distillation module of this embodiment is subjected to 1 hour of a procedure in which 3.5 weight % brine at 65° C. as raw water is contacted with one surface of each of the porous membranes at a linear speed of 100 cm/sec and the other surface of the porous membranes is subjected to pressure reduction at −90 kPa (G), preferably the amount of permeated water permeating the porous membranes is 20 $kg \cdot L^{-1} \cdot hr^{-1}$ to 80 $kg \cdot L^{-1} \cdot hr^{-1}$, and the weight of salt solute precipitating on the inner surface or outer surface of the porous membrane is 0.002 $mg \cdot cm^{-2} \cdot hr^{-1}$ to 0.4 $mg \cdot cm^{-2} \cdot hr^{-1}$.

[Method for Producing Porous Membranes for Membrane Distillation]

Suitable methods for producing the porous membranes include thermally induced phase separation methods in which a resin membrane is cooled to cause phase separation and form a porous layer, and dry-wet methods (non-solvent phase separation methods) in which a resin membrane is contacted with a poor solvent to cause phase separation and form a porous layer.

From the viewpoint of balance between increasing water permeability performance and minimizing salt permeation, it is preferred to apply a hydrophobic coating, or to press silicon powder, onto a porous membrane obtained by a thermally induced phase separation method or non-solvent phase separation method.

[Hollow Fiber Membrane]

The shapes of the hydrophobic and porous membranes may be, for example, flat-membrane, tubular, hollow-fiber or spiral shapes, but hollow fiber membranes that allow the membrane area per unit volume to be increased are preferred from the viewpoint of compactness of the membrane distillation module.

The outer diameters and inner diameters of the hydrophobic porous hollow fiber membranes are preferably in the range of 0.3 mm to 3.0 mm.

From the viewpoint of the hydrophobicity of the hollow fiber membranes, the water contact angle of the hollow fiber membranes is preferably between 95° and 150° and more preferably between 100° and 150°. If the contact angle is smaller than 100° the hydrophobicity will be insufficient and salt permeation will be inadequately reduced, while an angle of larger than 150° is essentially impractical since is not possible to achieve without altering the shapes of the pores themselves in the membranes. The water contact angle of the hollow fiber membranes is measured by the droplet method described above.

The surface tension of the hollow fiber membranes coated with the water-repellent agent is preferably 10 mN/m to 25 mN/m.

The void percentage of the hydrophobic porous hollow fiber membranes coated with the water-repellent agent is preferably in the range of 50% to 85%. If it is less than 50% the water permeability performance will be reduced, and if it is greater than 85% the strength of the membranes will be lower, thus potentially constituting a cause of fracture during prolonged use.

(Average Pore Diameter)

The average pore diameter of the hydrophobic porous hollow fiber membranes coated with the water-repellent agent is preferably in the range of 0.01 μm to 1 μm from the viewpoint of minimizing salt permeation. If the average pore diameter is 0.01 μm or smaller the water permeability performance will be reduced, and if it is 1 μm or larger it will not be possible to inhibit salt permeation even with increased membrane water-repellency.

The opening ratio on the inner surface of the hydrophobic porous hollow fiber membranes is preferably in the range of 20% to 50%. If the opening ratio on the inner surface of the hydrophobic porous hollow fiber membranes is 50% or lower, it will tend to be easier to minimize wetting and salt permeation, in addition to increasing the water permeability retention. Moreover, from the viewpoint of maintaining a minimal level of membrane distillation performance, the opening ratio on the inner surface is preferably 20% or higher.

(Amount of Water-Repellent Agent on Hollow Fiber Membrane Surface)

From the viewpoint of the hydrophobicity of the porous hollow fiber membranes, when one surface or the other surface of the hollow fiber membranes or at least a portion of the through-hole surfaces of the hollow fiber membranes have been measured by X-ray Photoelectron Spectroscopy (XPS), the spectrum and assignments preferably satisfy the following (1) and/or (2):

(1) A C1s spectrum for $CF_3$-and for coupled $CF_2$—$CF_2$ is observed in the range of 295 to 291 eV, with a carbon element ratio for $CF_3$-and coupled $CF_2$—$CF_2$ of 0.5% or higher and lower than 15.0% among the total elements, and an O1s spectrum is observed in the range of 530 to 538 eV, with an oxygen element ratio of 1.0% or higher and lower than 15.0% among the total elements;

(2) A Si2p spectrum is observed in the range of 100 to 102 eV, with a silicon element ratio of 3.0% or higher and lower than 20.0% among the total elements, and an O1s spectrum is observed in the range of 530 to 538 eV, with an oxygen element ratio of 5.0% or higher and lower than 25.0% among the total elements.

[Membrane Distillation Module]

When a porous membrane having through-holes is incorporated into a membrane distillation module, and the module is an internal pressure type, then if the surface of the porous membrane that is expected to contact with raw water is defined as the inner surface and the surface of the porous membrane that is expected to contact with permeated water or the surface through which only water vapor permeates is defined as the outer surface, preferably the inner surface and outer surface of the porous membrane, and at least a portion of the through-hole surfaces of the porous membrane, are coated with a water-repellent agent.

The above description regards three types of porous membranes of this embodiment, and the porous membranes coated with a water-repellent agent.

The following explanation regards a membrane distillation device utilizing the aforementioned membrane distillation module.

<Additional Examples of Membrane Distillation Devices>

A membrane distillation device of this embodiment was described above in relation to an internal pressure membrane distillation device, an end-supplied external pressure membrane distillation device and an external pressure membrane distillation device, but an example of another construction of a membrane distillation device encompassed by the present invention will now be described with reference to the accompanying drawings as necessary.

FIG. 15(a) to (d) are schematic views illustrating the principle of a membrane distillation system that can be applied for this embodiment.

Figure 15:
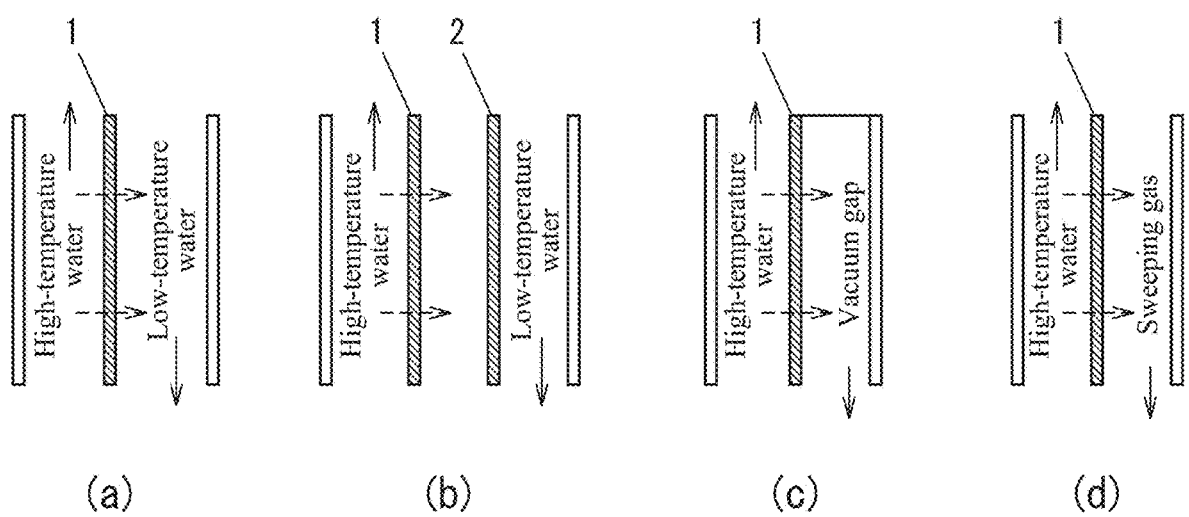
FIG. 15 is a schematic view of different membrane distillation methods, (a) showing a DCMD (Direct Contact Membrane Distillation) method, (b) showing an AGMD (Air Gap Membrane Distillation) method, (c) showing a VMD (Vacuum Membrane Distillation) method and (d) showing an SGMD (Sweeping Gas Membrane Distillation) method.

The membrane distillation of FIG. 15(a) is based on the Direct Contact Membrane Distillation (DCMD) method. In the DCMD method:

steam (such as water vapor) generated by heating raw water (i.e. water to be treated, for the purpose of this embodiment, same hereunder for explanation of the membrane distillation device) at high temperature in the evaporator at left in the drawing, passes through a hydrophobic porous membrane 1 and migrates to the recovery unit at the right, contacting with low-temperature water (cooling water) at the recovery unit and becoming liquefied, and then being incorporated into the low-temperature water and recovered.

The membrane distillation of FIG. 15(b) is based on the Air Gap Membrane Distillation (AGMD) method. In the AGMD method, the structure has a cooling unit 2 provided in addition to the hydrophobic porous membrane 1, with a gas phase unit provided between them. In the membrane distillation device of this system:

water vapor that has been generated by heating raw water to high temperature in the evaporator at left in the drawing, passes through the hydrophobic porous membrane 1 and migrates to the gas phase unit at the center, and in the recovery unit at right, the water vapor is condensed on the surface of a condenser (cooling unit) 2 that has been cooled by low-temperature water and liquefied to purified water which is recovered. The cooling unit 2 is preferably made of a material with high thermal conductivity, through which water vapor does not pass. An example for the cooling unit 2 is a metal cooling plate, with an aluminum plate or stainless steel plate being preferred.

The membrane distillation of FIG. 15(c) is based on the Vacuum Membrane Distillation (VMD) method. In the VMD method:

water vapor that has been generated by heating raw water at high temperature in the evaporator at right in the drawing, passes through the hydrophobic porous membrane 1 and migrates to the recovery unit at right, and the recovery unit is subjected to a vacuum or pressure reduction, so that the migrated water vapor is extracted out of the device without being liquefied, and is recovered as purified water.

The membrane distillation device of FIG. 15(d) is based on the Sweeping Gas Membrane Distillation (SGMD) method. The SGMD method is a system in which sweeping gas is caused to flow, instead of application of a vacuum or production reduction to the recovery unit in the VMD method shown in FIG. 15(c), and water vapor that has migrated to the recovery unit is extracted out of the device without being liquefied, and is recovered as purified water. The sweeping gas is preferably a gas that is inert with respect to water and has a lower boiling point than water, and specifically, dry air or nitrogen, for example, is preferably used.

The distillation and recovering means used in the membrane distillation device preferably employs the DCMD method, AGMD method, VMD method or SGMD method, depending on the required water quality and the required water production volume for the purified water.

Specific specifications for the distillation section that is preferably used in the membrane distillation of this embodiment are described below, as an example of using the VMD method for the distillation and recovering means.

The distillation section of the membrane distillation device of this embodiment is preferably a membrane distillation device comprising at least:

a treatment water evaporator comprising a liquid phase unit 1 in which the water to be treated is present, and a hydrophobic porous membrane that contacts with the liquid phase unit 1, a recovery unit comprising a liquid phase unit 2 through which cooling water circulates and a cooling unit adjacent to the liquid phase unit 2, and a gas phase unit 3 that connects the treatment water evaporator and the recovery unit.

More preferably, the treatment water evaporator further has a gas phase unit 1 on the opposite side of the hydrophobic porous membrane from the liquid phase unit 1, the recovery unit further has a gas phase unit 2 on the side of the cooling unit opposite from the liquid phase unit 2, and the gas phase unit 1 and the gas phase unit 2 are connected by the gas phase unit 3. The latter case may be restated as a membrane distillation device comprising:

a treatment water evaporator wherein a liquid phase unit 1 where water to be treated is present, and a gas phase unit 1, are adjacent via a hydrophobic porous membrane, a recovery unit wherein a liquid phase unit 2 through which cooling water circulates, and a gas phase unit 2, are adjacent via a cooling unit, and a gas phase unit 3 that connects the gas phase unit 1 and the gas phase unit 2.

[Specific Mode for Membrane Distillation Device]

The raw water evaporator for a water purifying apparatus of this embodiment is preferably a membrane distillation device comprising at least:

a raw water evaporator comprising a liquid phase unit 1 through which raw water circulates, and a hydrophobic porous membrane that contacts with the liquid phase unit 1, a recovery unit comprising a liquid phase unit 2 through which cooling water circulates and a cooling unit adjacent to the liquid phase unit 2, and a gas phase unit 3 that connects the raw water evaporator and the recovery unit.

An example of using a flat membrane and an example of using a hollow fiber membrane as the hydrophobic porous membrane will now be described in detail as a preferred mode of this embodiment.

FIG. 16(a) is a conceptual drawing illustrating an integral membrane distillation device using a flat hydrophobic porous membrane.

The membrane distillation device of FIG. 16(a) comprises:

a raw water evaporator comprising a liquid phase unit 1 through which raw water circulates, and a hydrophobic porous membrane that contacts with the liquid phase unit 1, a recovery unit comprising a liquid phase unit 2 through which cooling water circulates, and a cooling unit adjacent to the liquid phase unit 2, a gas phase unit 3 (air-gap) that connects the raw water evaporator and the recovery unit, and a permeated water container connected to a pressure reduction device via a pressure regulator. The permeated water container is connected to the gas phase unit 3.

In the membrane distillation device of FIG. 16(a), preferably when raw water heated to high temperature passes through the liquid phase unit 1, a portion thereof is converted to water vapor and passes through the hydrophobic porous membrane, migrating to the gas phase unit 3. The non-volatile solutes (for example, salts) cannot pass through the membrane walls of the hollow fiber membranes, and are therefore separated.

The pressure of the gas phase unit 3 is adjusted by a pressure reduction device to a range of preferably at least 1 kPa and no higher than the saturated vapor pressure of water at the raw water temperature. A more preferred pressure for the gas phase unit 3 will be explained below. The water vapor that has migrated to the gas phase unit 3 is therefore concentrated on the cooling unit of the recovery unit and converted to liquid purified water, and it is recovered in the permeated water container.

FIG. 16(b) is a conceptual drawing illustrating an integral membrane distillation device using hydrophobic porous membrane hollow fibers.

The membrane distillation device of FIG. 16(b) comprises:

a raw water evaporator in which a liquid phase unit 1 in which raw water is present is adjacent to a gas phase unit 1 via a hydrophobic porous membrane, a recovery unit in which a liquid phase unit 2 through which cooling water circulates is adjacent to a gas phase unit 2 via a cooling unit, a gas phase unit 3 that connects the gas phase unit 1 and gas phase unit 2, and a permeated water container connected to a pressure reduction device via a pressure regulator. The permeated water container is connected to the gas phase unit 2. The cooling unit in this device is a condenser tube.

Figure 16:
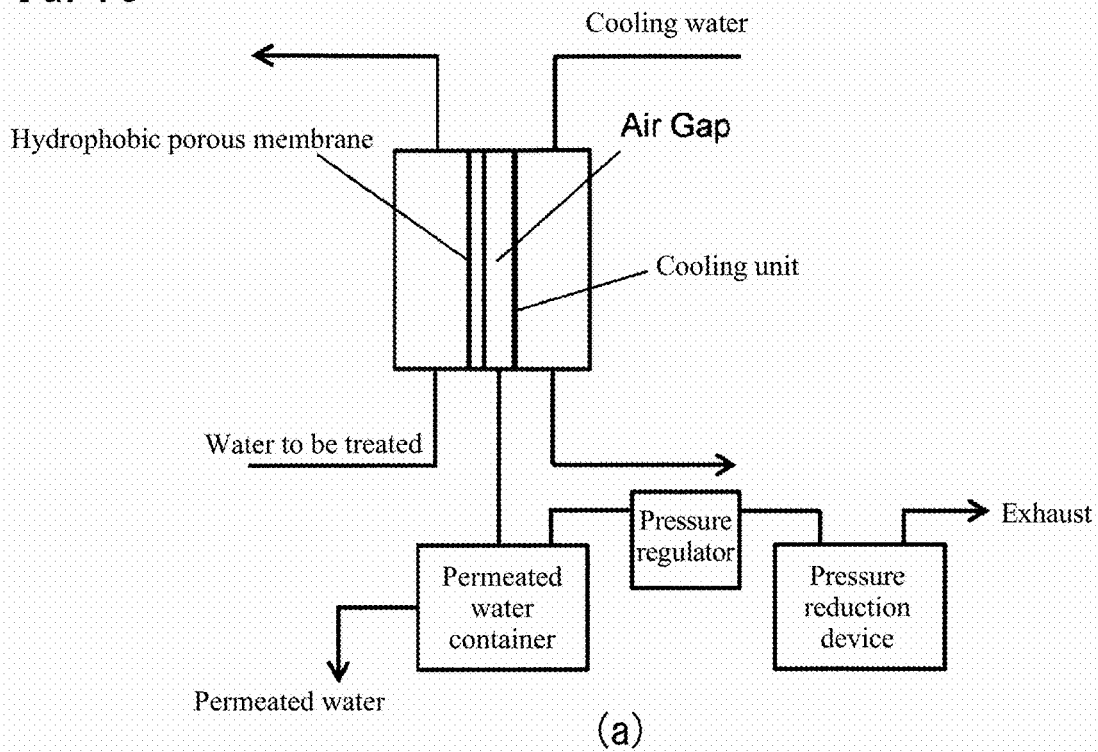
FIG. 16 is a schematic view of a membrane distillation device according to an embodiment of the invention, (a) showing a conceptual drawing of an integral membrane distillation device using flat hydrophobic porous membranes, and (b) showing a conceptual drawing of an integral membrane distillation device using hydrophobic porous hollow fiber membranes.
Figure 16:
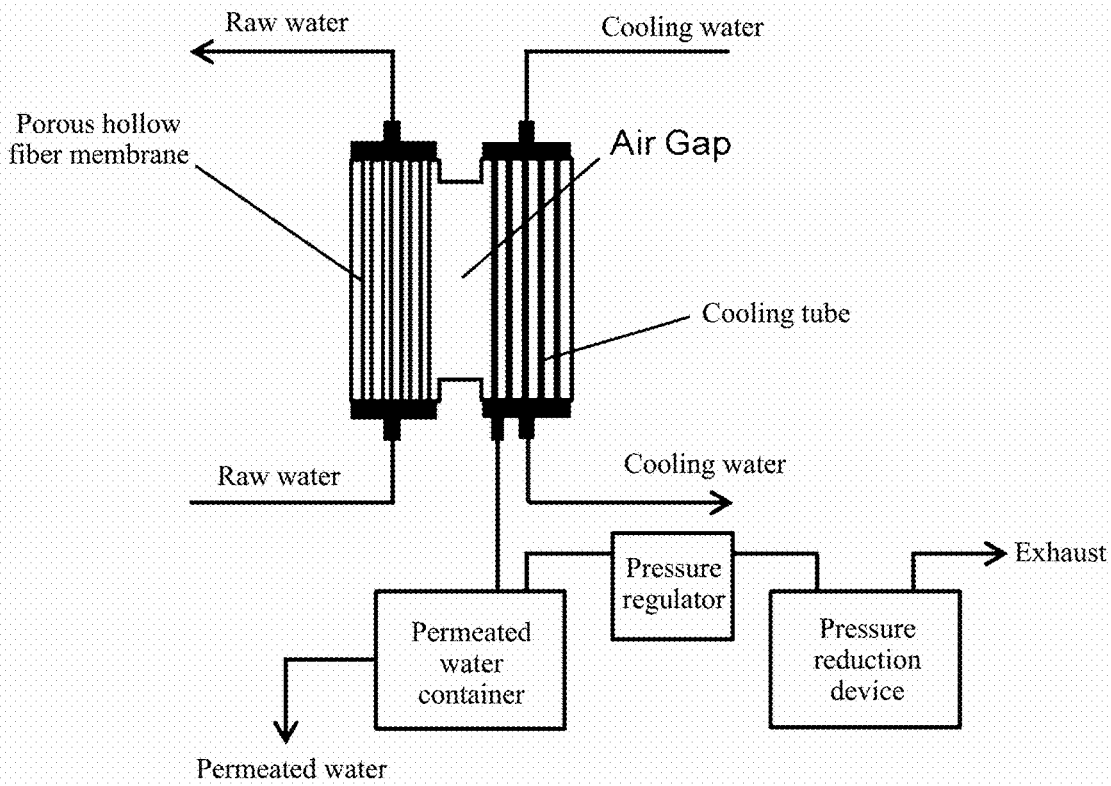

In the membrane distillation device of FIG. 16(*b*), raw water circulates through the interior spaces of the hydrophobic porous membrane hollow fibers, and therefore the hollow interior pores of the hollow fibers constitute the liquid phase unit 1 of the device; and the outsides of the hollow fibers constitute the gas phase unit 1.

Since cooling water circulates through the condenser tube, the interior of the condenser tube constitutes the liquid phase unit 2 of the device; and the outside of the condenser tube constitutes the gas phase unit 2. The condenser tube is preferably made of a material such that the cooling water does not leak outside of the tube, and for example, it may be a non-porous metal or a resin.

The gas phase unit 3 is situated between the gas phase unit 1 and the gas phase unit 2, connecting them together.

A portion of the raw water that has circulated through the hollow interiors of the hydrophobic porous hollow fiber membranes is converted to water vapor, passing through the membrane walls of the hollow fiber membranes and migrating to the gas phase unit 1. The non-volatile solutes (for example, salts) cannot pass through the membrane walls of the hollow fiber membranes, and are therefore separated.

The water vapor that has migrated to the gas phase unit 1 then migrates to the gas phase unit 2 through the gas phase unit 3.

Since the pressure of gas phase units 1 to 3 in the device of FIG. 16(*b*) is adjusted by a pressure reduction device to a range of preferably 1 kPa or higher and no higher than the saturated vapor pressure of water at the raw water temperature, water vapor that has migrated to the gas phase unit 2 is concentrated at the cooling unit of the recovery unit and is converted to liquid purified water, and is recovered in the permeated water container. (A more preferred pressure for the gas phase units 1 to 3 will be explained below.)

The recovery unit used in the membrane distillation device of this embodiment is, for example, a condenser tube package formed with a plurality of condenser tubes housed in a cylindrical container, with the gaps between the condenser tubes and the gaps between the condenser tubes and container at the ends of the condenser tubes being filled with an anchoring resin (potting resin), anchoring the condenser tubes in the container. A resin or metal, for example, may be used as the material of the container.

The ends of the condenser tubes may be open, and head sections having a water flow opening may be fitted at the upper and lower ends of the container. A connection port for connection with an evaporator may be provided on the side wall of the container. The number of connection ports is not particularly restricted, and there may be one or a plurality.

In the device of FIG. 16(*b*), the hollow condenser tubes are used as the cooling unit. However, a flat plate cooling unit may be used instead of the condenser tubes.

The gas phase unit 3 is a gas phase unit that functions to connect the gas phase unit 1 and gas phase unit 2. The volume of the gas phase unit 3 is preferably large, from the viewpoint of permeation of water vapor. The number of gas phase units 3 is not particularly restricted, and there may be one or a plurality. The shapes may be cylindrical or polygonal columnar. The body member of each gas phase unit 3 is not particularly restricted, and a resin or metal, for example, may be used. However, a material with high thermal insulation properties may be used so that water vapor does not condense at the gas phase unit 3, and if necessary it may be subjected to thermal processing.

The gas phase unit 3 is preferably provided so that the shortest distance between the hydrophobic porous membranes at the evaporator and cooling unit at the recovery unit is 10 mm or greater. The shortest distance between the hydrophobic porous membranes and the cooling unit is the shortest linear distance between the hydrophobic porous membranes and cooling unit at their closest points.

Limiting the pressure of the gas phase unit to within a prescribed range for this embodiment can relax the restriction on the placement distance between the evaporator and recovery unit in the membrane distillation device, allowing the size of the gas phase unit 3 to be reduced to the small size specified above. By relaxing the distance restriction it is possible to increase the degree of design freedom for the membrane distillation module using the hydrophobic porous membranes, and to reduce space and increase compactness of the purified water-supply device.

With a shortest distance of 10 mm or greater it will be possible to facilitate design of the evaporator and recovery unit. The shortest distance may also be 30 mm or greater.

If the shortest distance is 10 mm or greater and preferably no greater than 3 m for this embodiment, then the degree of design freedom for the evaporator and recovery unit will be increased, and if membrane distillation is also carried out while controlling the gas phase units 1 to 3 to within the publicly known ranges specified above, then the membrane distillation device used will have high flux while still being compact, and without requiring a high vacuum or sweep gas.

In either type of these devices, the water to be treated (raw water) may be provided to the liquid phase unit 1 after being heated by a heat source such as a heat exchanger or heater, for example, and being stored in a raw water tank as high-temperature raw water. It is more preferred to control the temperature of the raw water utilizing solar heat or making use of exhaust heat from an industrial process, as this will eliminate or lower costs for heat energy required for heating.

The temperature of the raw water supplied to the liquid phase unit 1 is preferably 50° C. or higher and more preferably 80° C. or higher, from the viewpoint of water permeability performance.

For this embodiment, the cooling water is not particularly restricted so long as it is a liquid that flows through the liquid phase unit 2 and cools the water vapor. For example, it may be tap water, industrial water, river water, well water, lake water, seawater, industrial waste water (waste water from facilities such as food factories, chemical plants, electronic industrial plants, pharmaceutical plants or cleaning plants), or accessory water discharged during production of petroleum or natural gas. Petroleum or natural gas includes conventional resources, as well as non-conventional resources such as shale oil or shale gas, coal bed methane (also known as coal seam gas), tight sand gas and methane hydrate.

For this embodiment, the raw water itself may be used as the cooling water.

From the viewpoint of recovery efficiency, the cooling water preferably has a water temperature of no higher than 30° C.

The water temperature of the cooling water may also be controlled by making use of a heat source such as a heat exchanger or heater.

As mentioned above, the pressure in the gas phase unit 3 in the device of FIG. 16(*a*) or the gas phase units 1 to 3 in the device of FIG. 16(*b*) is preferably controlled to 1 kPa or higher and no higher than the saturated vapor pressure of water at the raw water temperature. Setting the gas phase units 1 to 3 to a pressure of no higher than the saturated vapor pressure of water at the temperature of the water to be treated means that the pressure of the gas phase units 1 to 3 is controlled to a pressure of no higher than the saturated vapor pressure of water (theoretical value) at the water temperature of the raw water supplied to the liquid phase unit 1.

By setting the pressure of the gas phase unit 3 in the device of FIG. 16(*a*) and the gas phase units 1 to 3 in the device of FIG. 16(*b*) to 1 kPa or higher, it will be possible to minimize excessive energy consumption required for pressure reduction of the pressure reduction device. By limiting the pressure to no higher than the saturated vapor pressure of water at the raw water temperature it is possible to achieve high water permeability performance. From the viewpoint of energy consumption, the pressure is preferably 1 kPa or higher, more preferably 5 kPa or higher and even more preferably 10 kPa or higher. From the viewpoint of water permeability performance, the pressure is preferably no higher than the saturated vapor pressure of water at the raw water temperature, more preferably no higher than 5 kPa lower than the saturated vapor pressure of water at the raw water temperature, and even more preferably no higher than 10 kPa lower than the saturated vapor pressure of water at the raw water temperature.

The pressure reduction device used to adjust the pressure of the gas phase unit 3 in the device of FIG. 16(*a*), and the gas phase units 1 to 3 in the device of FIG. 16(*b*) to the pressure ranges specified above, may be, for example:

a diaphragm vacuum pump, dry pump or oil rotary vacuum pump, ejector, aspirator or the like; and the pressure control method used may be, for example:

a method using a vacuum regulator, a method using a leak valve, a method using an electronic vacuum controller and solenoid valve, or the like.

The pressure is preferably adjusted while monitoring with a pressure gauge. The pressure monitored may also be the total pressure of the gas phase units 1 to 3, the permeated water container, the pressure regulator and the tubing connecting them.

A membrane distillation device as one embodiment of the invention has been described above, but the membrane distillation device may also comprise, optionally, a flow channel for water to be treated, a flow channel for cooling water, a flow channel for permeated water, an exhaust vent or exhaust pipe, a permeated water container, a pressure regulator and a pressure reduction device.

<Membrane Distillation Membrane Module and Device, Using "1. Membrane with Large Pore Diameter (Average Pore Diameter: ≥0.20 µm), Large Void Percentage (≥60%) and Uniform Pore Size Distribution">

Modules and devices for membrane distillation will now be described in comparison, when the membranes used are "1. Membrane with large pore diameter (average pore diameter: ≥0.20 µm), large void percentage (≥60%) and uniform pore size distribution".

The membrane module for membrane distillation according to this embodiment, using the membrane described above, comprises porous membranes with through-holes, and a heater that heats raw water or an evaporator that causes evaporation of raw water. The membrane module is mounted in the membrane distillation device for membrane distillation, and if desired, the membrane distillation device comprises, in addition to the porous membranes and the heater or evaporator, also a condensing unit that condenses steam that has permeated the porous membranes, a tube that transports raw water or permeated water, a gas phase unit that transports steam, and a container that houses the porous membranes.

A preferred membrane module for membrane distillation according to this embodiment is a membrane module for membrane distillation comprising, from the viewpoint of increased flux, preferably:

a bundle consisting of a plurality of porous membranes of this embodiment bundled together, head sections covering the ends of the bundle, and having openings, and at the ends, an anchoring resin that fills the gaps between the outsides of the plurality of porous membranes and fills at least some of the gaps between the outside of the bundle and the inside of the head sections, the inside and outside of the bundle being in communication only via the through-holes.

Specifically, the membrane module for membrane distillation is more preferably an internal pressure membrane module, an end-supplied external pressure membrane module or an external pressure membrane module.

An internal pressure membrane module is a membrane distillation module further comprising, from the viewpoint of high flux and handleability as mentioned above, a cylindrical container having a tubular body, an open end, and an opening provided on the side wall of the tubular body, the bundle being housed in the cylindrical container, the gaps between the outside of the bundle and the insides of the head sections being filled with the anchoring resin so that the open ends of the cylindrical container are covered with the head sections and both ends of the bundle are open.

When the membrane module has been mounted in the membrane distillation device for use, raw water (water to be treated) is incorporated into the hollow fiber membranes through the open sections at both ends of the hollow fiber membrane bundle, and circulates in the interior space, being converted to water vapor and being transported out of the hollow fiber membrane, and therefore the hollow pore interiors correspond to the liquid phase unit 1 of the membrane distillation device, and the exteriors of the hollow fiber membranes constitute the gas phase unit 1.

An end-supplied external pressure module is a membrane distillation module further comprising, from the viewpoint of high flux and handleability as mentioned above, a cylindrical container having a tubular body, an open end, and an opening provided on the side wall of the tubular body, the bundle being housed in the cylindrical container, the gaps between the outside of the bundle and the insides of the head sections being filled with the anchoring resin so that the open ends of the cylindrical container are covered with the head sections, the upper end of the bundle is open, and the lower end of the bundle is closed.

Compared to other modules, an end-supplied external pressure membrane module can increase the filling volume of the porous membranes with respect to the module while maintaining water production efficiency and energy efficiency.

An immersion-type module (included among external pressure modules) is a membrane distillation module in which, from the viewpoint of energy savings, the gaps between the outside of the hollow fiber membrane bundle and the insides of the head sections are filled with the anchoring resin, leaving one end of the bundle open while closing the other end of the bundle.

In the method of treating raw water using an immersion-type module, treatment may be carried out by immersion of the module in a container holding the raw water, or a container able to store raw water may be provided in the module beforehand.

When a porous hollow fiber membrane having through-holes is incorporated into a membrane module as explained above, and the surfaces of the hollow fiber membranes that are expected to contact with water to be treated are defined as the inner surfaces while the surfaces of the hollow fiber membranes that are expected to contact with permeated water or the surfaces through which only steam permeates are defined as the outer surfaces, then preferably the inner surfaces and outer surfaces of the hollow fiber membranes, and at least a portion of the through-hole surfaces of the hollow fibers, are coated with a water-repellent agent.

When a membrane distillation module of this embodiment is used for prolonged operation in which permeated water is produced, the through-holes may become obstructed and the permeated water production efficiency reduced, when inorganic salts, organic materials, microparticles, oils and metals in the water to be treated precipitate and adhere onto the inner sides of the hydrophobic porous hollow fiber membranes and the interiors and outsides of the membranes. When this occurs, in some cases the operation is temporarily halted and a solution capable of dissolving substances that can cause clogging is used for a rinsing procedure with high flow to wash off the surfaces (outer surfaces and inner surfaces) of the hollow fiber membranes and the membrane interiors, to allow the hollow fiber membranes to be restored to their initial state. When the substances that can cause clogging are inorganic salts or metals, an acid or the like with high dissolving power may be used. In the case of common calcium carbonate scales, for example, the membranes may be rinsed with a solution of hydrochloric acid or citric acid. When the substances causing clogging are organic materials or microorganisms (slime), rinsing may be carried out using a sodium hypochlorite aqueous solution as an oxidizing agent. When the substances causing clogging are microparticles, the microparticles can be eliminated from the membrane surfaces by flushing a rinsing solvent at a high flow rate, such as preferably a flow rate of 0.1 m/sec or greater and more preferably a flow rate of 10 cm/sec to 20 m/sec.

When clogging substances that have precipitated and adhered in the pores inside the membranes are to be rinsed off, since the porous membranes are hydrophobic and do not allow penetration of the solution, rinsing may be by a method of hydrophilic wetting with an alcohol or a mixture of an alcohol and water, followed by flushing with a rinsing solvent. Rinsing may also be by applying pressure to the membranes to flush the pore interiors with a solvent. Membrane distillation using fresh water as the water to be treated (raw water) can bring clogging substances to the membrane surfaces, after which the membrane surfaces may be rinsed to remove the clogging substances.

The values of the physical properties mentioned above, unless otherwise specified, are those measured by the methods described in the Examples which follow.

The water to be treated is the water in need of purification or concentration for some purpose as explained above, and it may be, for example, tap water, industrial water, river water, well water, lake water, seawater, industrial waste water (waste water from facilities such as food factories, chemical plants, electronic industrial plants, pharmaceutical plants or cleaning plants), or accessory water discharged during production of petroleum or natural gas. Petroleum or natural gas includes conventional resources obtained from known oil fields or gas fields, as well as non-conventional resources such as shale oil or shale gas, coal bed methane (also known as coal seam gas), tight sand gas and methane hydrate.

From the viewpoint of water permeability performance, the water temperature (temperature of the water to be treated) is preferably 50° C. or higher and more preferably 80° C. or higher. The treatment water temperature (temperature of the water to be treated) may be controlled by a heat source such as a heat exchanger or heater, but it is preferred to use solar heat, or exhaust heat from an industrial process, to control the water temperature as this will eliminate or lower the cost for heat energy required for heating.

Since the first liquid phase unit and first gas phase unit are partitioned, the hydrophobic porous membranes have membrane surfaces that contact with the first liquid phase unit and membrane surfaces in contact with the first gas phase unit. Since the water to be treated flows through the first liquid phase unit, the membrane surfaces of the hydrophobic porous membranes in contact with the first liquid phase unit are the inner surfaces that contact with the water to be treated, while the membrane surfaces of the hydrophobic porous membranes in contact with the first gas phase unit are the outer surfaces on the opposite sides from the inner surfaces.

(Evaporator)

In the case of flat membrane forms, the evaporator may be formed with a plurality of hydrophobic porous membranes layered, or a plurality of or a single hydrophobic porous membrane in a spiral or pleated form, or in the case of hollow fiber membranes, with a plurality of hydrophobic porous membranes bundled and housed in a cylindrical resin or metal container, with the gaps between the porous membranes or the gaps between the porous membranes and the container being filled with an anchoring resin (potting resin) at the ends of the hydrophobic porous membranes, to anchor the porous membranes to the container. The ends of the porous membranes may be open, and head sections having a water flow opening may be fitted at the upper and lower ends of the container. A connection port for connection with a condensing unit is provided on the side wall of the container. The number of connection ports is not particularly restricted, and there may be one or a plurality.

The first liquid phase unit through which water to be treated flows consists of the gaps of the wound body when the hydrophobic porous membranes are in the form of a wound body, or it consists of the hollow interiors when the hydrophobic porous membranes are hydrophobic porous hollow fiber membranes.

The outsides of the hydrophobic porous membranes constitute the first gas phase unit in the container forming the evaporator.

The water to be treated that has circulated through the hydrophobic porous membranes passes through the membrane walls as water vapor and migrates to the first gas phase unit. The non-volatile solutes such as salts that could not migrate to the membrane wall are separated by the membranes during this time.

When the hydrophobic porous membranes are hydrophobic porous hollow fiber membranes, water to be treated flows through the hollow interiors, and therefore the inner surfaces of the hydrophobic porous hollow fiber membranes are the surfaces in contact with the water to be treated, while the outer surfaces of the hydrophobic porous hollow fiber membranes are the membrane surfaces on the opposite sides from the surfaces in contact with the water to be treated.

(Condensing Unit)

The condensing unit houses cooling units in a cylindrical resin or metal container, for example, with an anchoring resin (potting resin) filling the gaps between the cooling units at the ends of the cooling unit and the gaps between the cooling units and the container, and anchoring the cooling units to the container. The ends of the cooling units are open, and head sections having a water flow opening are fitted at the upper and lower ends of the container. A connection port for connection with an evaporator is provided on the side wall of the container. The number of connection ports is not particularly restricted, and there may be one or a plurality. The shapes of the cooling units are preferably hollow or flat, and more preferably hollow tubular.

The cooling units are provided inside the condensing unit, the interior regions of the cooling units constituting second liquid phase units where the cooling water flows. The exterior regions of the cooling units constitute second gas phase units inside the container forming the condensing unit. The water to be treated that has circulated through the first liquid phase unit passes through the membrane walls of the hydrophobic porous membranes as water vapor and migrates to the first gas phase unit. The water vapor is cooled by the cooling units at the second gas phase unit, being converted to distilled water. The condensing unit with the cooling units is connected to the permeated water container by tubing, the distilled water being discharged from the condensing units and being collected in the permeated water container.

The cooling water is not particularly restricted so long as it is liquid that can flow inside the second liquid phase unit, consisting of the interior spaces of the condenser tubes, and cool the water vapor, and for example, it may be tap water, industrial water, river water, well water, lake water, seawater, industrial waste water (waste water from facilities such as food factories, chemical plants, electronic industrial plants, pharmaceutical plants or cleaning plants), or accessory water discharged during production of petroleum or natural gas. Petroleum or natural gas includes conventional resources obtained from known oil fields or gas fields, as well as non-conventional resources such as shale oil or shale gas, coal bed methane (also known as coal seam gas), tight sand gas and methane hydrate.

The water used as the water to be treated for this embodiment may also be the cooling water.

From the viewpoint of condensation efficiency, the cooling water has a water temperature of preferably no higher than 30° C. and more preferably no higher than 20° C. The water temperature of the cooling water may also be controlled by making use of a heat source such as a heat exchanger or heater.

(Third Gas Phase Unit)

The membrane distillation device comprises an evaporator and a condensing unit, as independent containers, with a third gas phase unit connecting the evaporator and condensing unit. It may also be an integral membrane distillation device having the evaporator and condensing unit present in the same container. In the case of an integral membrane distillation device, it is difficult to strictly specify the regions of the first, second and third gas phase units, but an integrated gas phase unit may be considered to be one comprising the first, second and third gas phase units.

The third gas phase unit is connected by a connection port connecting the first gas phase unit and the second gas phase unit. The volume of the third gas phase unit is preferably large, from the viewpoint of permeation of water vapor. The number of connection ports is not particularly restricted, and there may be one or a plurality. The shape of the connecting member may be cylindrical or polygonal columnar. The material of the connecting member is not particularly restricted and may be a resin or metal, but a material with high thermal insulation properties, and also treated for further thermal insulation if necessary, is used so that water vapor does not condense at the connecting member. For an integral membrane distillation device, a larger volume is preferred for the gas phase unit as a whole which may be considered to be the first, second and third gas phase units.

The third gas phase unit is preferably provided so that the shortest distance between the hydrophobic porous membranes of the evaporator and the cooling units of the condensing unit is 10 mm or greater. If the pressure of the gas phase unit is within this prescribed range, the restriction on the placement distance of the evaporator and condensing unit in the membrane distillation device will be relaxed, thus facilitating design of the membrane module using the hydrophobic porous membrane and allowing a membrane distillation device to be obtained which has greater space reduction and greater compactness of the purified water-supply system.

The shortest distance between the hydrophobic porous membranes and the cooling unit is the shortest linear distance between the hydrophobic porous membranes and cooling unit at their respective outer peripheral sections.

A shortest distance of 10 mm or greater will facilitate design of the evaporator and condensing unit, and the shortest distance may even be 30 mm or greater.

Furthermore, if the shortest distance is 10 mm or greater, then design of the evaporator and condensing unit can be facilitated, but if membrane distillation is carried out while controlling the pressure of the first, second and third gas phase units to be in the range of 1 kPa or higher and no higher than the saturated vapor pressure of water at the temperature of the water to be treated, then high vacuum or sweep gas will not be necessary, and a membrane distillation device that is compact yet exhibits high flux can be formed using the hydrophobic porous membranes.

When hollow fiber membranes are used as the hydrophobic porous membranes it is not necessary to reduce the distance between the evaporator and condensing unit, and if the pressure of the gas phase unit is within the specified range it will be possible to provide a membrane distillation device with a downsized, compact purified water-supply system.

The first, second and third gas phase units form connected spaces, and the pressure of the first, second and third gas phase units is controlled to within the range of 1 kPa or higher and no higher than the saturated vapor pressure of water at the temperature of the water to be treated.

Controlling the pressure of the first, second and third gas phase units to no higher than the saturated vapor pressure of water at the temperature of the water to be treated means that the first, second and third gas phase units are controlled to a pressure of no higher than the saturated vapor pressure of water (theoretical value) at the water temperature of the water to be treated (treatment water temperature).

If the pressure of the first, second and third gas phase units is 1 kPa or higher, it will be possible to minimize energy consumption required for pressure reduction of the pressure reduction device, and it will be possible to obtain high water permeability performance by lowering the pressure to no higher than the saturated vapor pressure of water at the treatment water temperature.

From the viewpoint of energy consumption, the pressure of the first, second and third gas phase units is preferably 1 kPa or higher, more preferably 5 kPa or higher and even more preferably 10 kPa or higher.

From the viewpoint of water permeability performance, the pressure of the first, second and third gas phase units is preferably no higher than the saturated vapor pressure of water at the temperature of the water to be treated, more preferably it is a pressure of 5 kPa below the saturated vapor pressure of water at the temperature of the water to be treated, and even more preferably it is a pressure of 10 kPa below the saturated vapor pressure of water at the temperature of the water to be treated.

The pressure reduction device that reduces the pressure of the first, second and third gas phase units, used to reduce the pressure of the first, second and third gas phase units to no higher than the saturated vapor pressure of water at the temperature of the water to be treated, may be a diaphragm vacuum pump, a dry pump, an oil rotary vacuum pump, an ejector or an aspirator.

The method of controlling the pressure, may be a method using a vacuum regulator or leak valve, or a method using an electronic vacuum controller and solenoid valve.

(Membrane distillation device comprising hydrophobic porous hollow fiber membranes)

Figure 2:
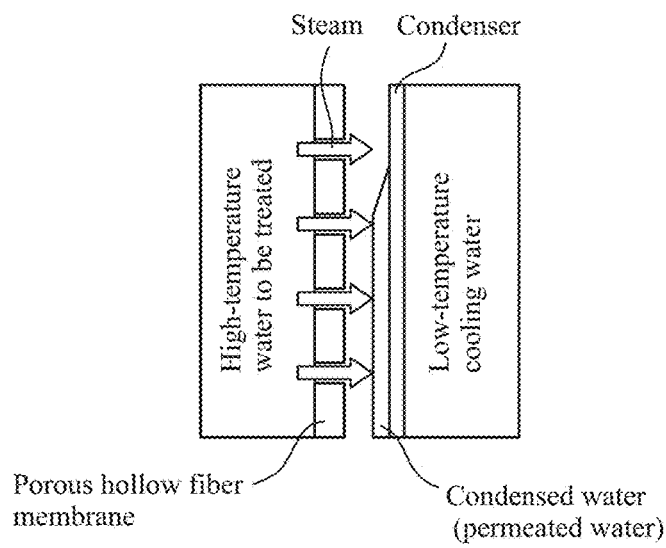
FIG. 2 is an illustration of the principle of a membrane distillation method.
Figure 19:
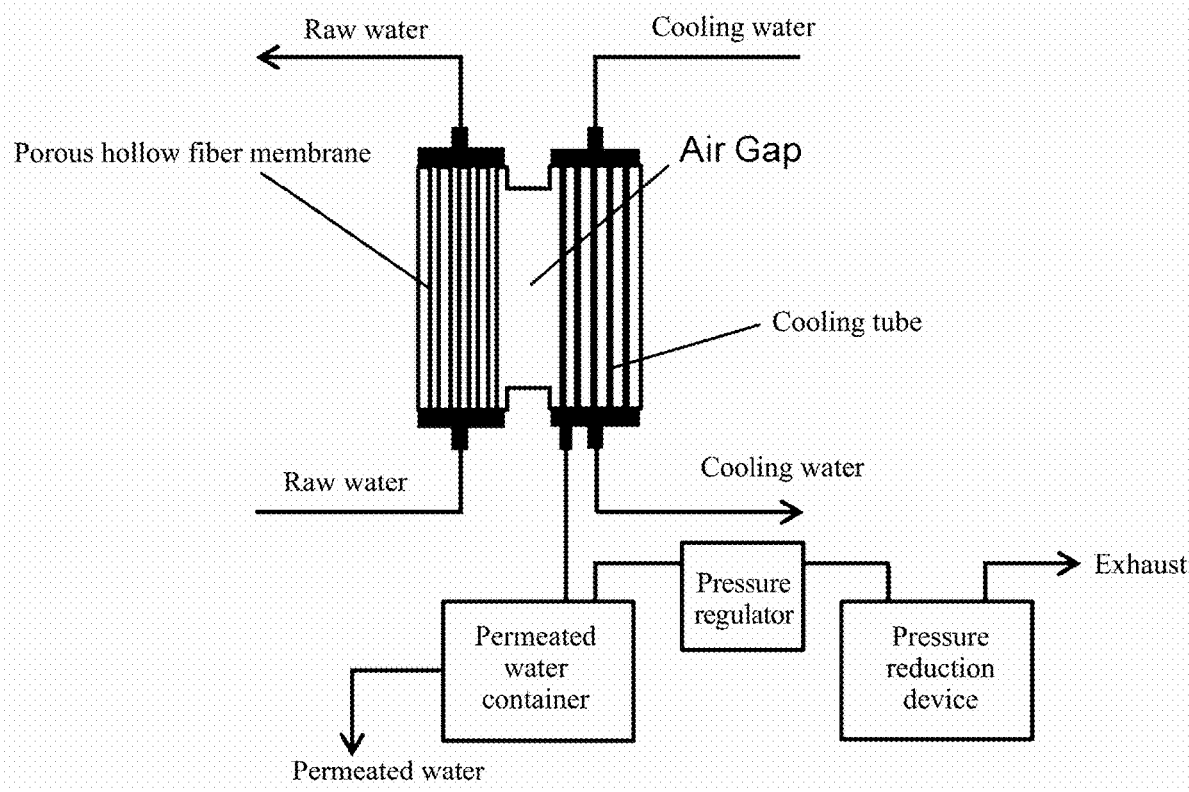
FIG. 19 is a schematic diagram of a membrane distillation device comprising hydrophobic porous hollow fiber membranes.

An example of a membrane distillation device comprising hydrophobic porous hollow fiber membranes as hydrophobic porous membranes to be provided in the evaporator is shown in FIGS. 2, 16(*b*) and 19. A membrane distillation device comprising hydrophobic porous hollow fiber membranes will now be described with reference to FIGS. 2, 16(*b*) and 19. FIG. 19 differs from FIG. 16(*b*) in that the hollow fiber membranes have been treated with a water-repellent agent.

The evaporator of the membrane distillation device has the hydrophobic porous hollow fiber membranes bundled and housed in a cylindrical resin or metal container, and at the ends of the hollow fibers, the gaps between the hollow fibers and the gaps between the hollow fibers and container are filled with an anchoring resin (potting resin), thus anchoring the hollow fibers in the container. The ends of the hollow fiber membranes may be open, and head sections having a water flow opening may be fitted at the upper and lower ends of the container. A connection port for connection with a condensing unit is provided on the side wall of the container. The number of connection ports is not particularly restricted, and there may be one or a plurality.

The hollow interiors of the hydrophobic porous hollow fiber membranes constitute the first liquid phase unit through which water to be treated such as raw water flows. The outer sides of the hydrophobic porous hollow fiber membranes constitute the first gas phase unit in the container forming the evaporator.

The raw water that has circulated through the hollow interiors of the hydrophobic porous hollow fiber membranes passes through the membrane walls of the hydrophobic porous hollow fiber membranes as water vapor and migrates to the first gas phase unit. The non-volatile solutes such as salts that could not migrate to the membrane wall are separated by the hydrophobic porous hollow fiber membranes during this time.

The raw water flows through the hollow interiors of the hydrophobic porous hollow fiber membranes, and therefore the inner surfaces of the hydrophobic porous hollow fiber membranes are the surfaces in contact with the raw water, while the outer surfaces of the hydrophobic porous hollow fiber membranes are the membrane surfaces on the opposite sides from the surfaces in contact with the raw water.

As shown in FIG. 16(*b*) and FIG. 19, the condensing unit houses tubular cooling units (condenser tubes) in a cylindrical resin or metal container, with an anchoring resin (potting resin) filling the gaps between the condenser tubes at the ends of the condenser tubes and the gaps between the condenser tubes and the container, and anchoring the condenser tubes to the container. The ends of the condenser tubes are open, and head sections having a water flow opening are fitted at the upper and lower ends of the container. A connection port for connection with an evaporator is provided on the side wall of the container. The number of connection ports is not particularly restricted, and there may be one or a plurality. The shapes of the condenser tubes are preferably hollow tubes.

As shown in FIG. 16(*b*) and FIG. 19, the condenser tubes are provided inside the condensing unit, the interior regions of the condenser tubes constituting second liquid phase units where the cooling water flows. The exterior regions of the condenser tubes constitute second gas phase units inside the container forming the condensing unit. The raw water that has circulated through the first liquid phase unit of the evaporator passes through the membrane walls of the hydrophobic porous hollow fiber membranes as water vapor and migrates to the first gas phase unit. The water vapor is cooled by the cooling condenser tubes at the second gas phase unit, being converted to distilled water (permeated water). The condensing unit with the condenser tubes is connected to the permeated water container by tubing, the permeated water being discharged from the condensing units and being collected in the permeated water container.

The cooling water is liquid that can flow inside the second liquid phase unit, consisting of the interior spaces of the condenser tubes, and cool the water vapor, and for example, it may be tap water, industrial water, river water, well water, lake water, seawater, industrial waste water (waste water from facilities such as food factories, chemical plants, electronic industrial plants, pharmaceutical plants or cleaning plants), or accessory water discharged during production of petroleum or natural gas. Petroleum or natural gas includes conventional resources obtained from known oil fields or gas fields, as well as non-conventional resources such as shale oil or shale gas, coal bed methane (also known as coal seam gas), tight sand gas and methane hydrate.

Raw water may also be used as the cooling water. From the viewpoint of condensation efficiency, the cooling water temperature is preferably no higher than 30° C. and more preferably no higher than 20° C. The water temperature of the cooling water may also be controlled by making use of a heat source such as a heat exchanger or heater.

The third gas phase unit (air gap) connects the evaporator and condensing unit, as shown in FIGS. 16 and 19. It may also be an integral membrane distillation device having the evaporator and condensing unit present in the same container.

In the case of an integral membrane distillation device, the integrated gas phase unit may be considered to be one comprising the first and second gas phase units and the air gap.

The membrane distillation device comprising the hydrophobic porous hollow fiber membranes is preferably an internal pressure interior cycloid type (not shown) or an external pressure immersion-type (not shown), from the viewpoint of achieving high flux under slightly reduced pressure of about −90 kPa (G).

The flux obtained by membrane distillation according to this embodiment may be appropriately set based on the temperature of the water to be treated, and when the temperature of the water to be treated is 65° C., the flux is preferably 20 kg·L$^{-1}$·hr$^{-1}$ to 80 kg·L$^{-1}$·hr$^{-1}$ and more preferably 30 kg·L$^{-1}$·hr$^{-1}$ to 70 kg·L$^{-1}$·hr$^{-1}$.

[Use of Membrane Distillation, and Water Production]

The membrane distillation module or membrane distillation device of this embodiment can be suitably used for the purpose of removing ions, organic materials and inorganic materials present in water to be treated to a high degree of removal, for purification, or for the purpose of removing water from water to be treated, for concentration. Such purposes may include seawater desalination, water production for ships, ultrapure water production (at semiconductor plants), boiler water production (at thermal power plants), fuel cell system water treatment, industrial waste water treatment (at food factories, chemical plants, electronic industrial plants, pharmaceutical plants and cleaning plants), water production for dialysis, production of water for injection, accessory water treatment (for heavy oils, shale oil, shale gas and natural gas, for example) and recovery of valuable materials from seawater. Natural gas includes, in addition to conventional natural gas obtained from conventional gas fields, also non-conventional natural gas types such as coal bed methane (also known as coal seam gas).

Another mode of the invention is a water production method including a step of using the membrane distillation module described above or a membrane distillation device comprising it to obtain permeated water from raw water, and a water production apparatus comprising the membrane distillation module described above and a demister disposed downstream from the membrane distillation module. The demister is a device that removes mist, and is also known as a defogger. The demister may be a monolayer or multilayer filter (for example, a wire net or mesh).

Salt permeation is notably minimized by employing a demister in the membrane distillation device of the invention, for reasons not completely understood. One reason is presumed to be that mist of the solvent to be treated (for example, brine), or the solute (for example salt) in a non-dissolved state is trapped on the surface of the demister, and therefore the demister is placed between the membrane bundle surface and the cooler, in order to maximize the effect of the demister.

[Method for Operating Membrane Distillation Module, and Rinsing of Porous Membranes]

Yet another mode of the invention is a method for continuous operation of a membrane distillation module containing the porous membranes described above, or a method of rinsing the porous membranes during continuous operation of the membrane distillation module.

The method of continuous operation of the membrane distillation module is characterized by continuous use of a membrane distillation module including the porous membranes, during operation that is carried out to obtain permeated water using the membrane distillation module, while rinsing substances that clog the porous membranes during a fixed operation period (hereunder referred to as "clogging substances") with a liquid that is capable of dissolving the clogging substances, or rinsing the clogging substances by contacting the porous membranes with a solvent at a high flow rate.

The rinsing method is basically no different from the rinsing method described above even if the porous membranes are coated with the water-repellent agent.

In the operating procedure for obtaining permeated water using the membrane distillation module, inorganic salts, organic materials, microparticles, oils and metals in the water to be treated precipitate and adhere to the inner surfaces of the porous membranes, the interiors (thick membrane sections) of the membranes and the outer surfaces of the membranes, often lowering the water permeability of the porous membranes. According to the invention, the porous membranes are rinsed with a liquid that dissolves clogging substances, or rinsing is performed by flushing a solvent through the membrane surfaces or membrane interiors at a high flow rate to remove the clogging substances, thereby allowing permeated water to be continuously obtained while maintaining water permeability.

The method of rinsing the substances that have precipitated or adhered to the inner surface sides or outer surface sides of the membranes may be a method of flushing a solvent along the membrane substances. When the clogging substances are inorganic salts or metals, an acid or the like with high dissolving power for inorganic salts or metals may be used. For example, calcium carbonate, which is commonly known as a scaly substance, can be rinsed using a solution of hydrochloric acid or citric acid. Organic materials and microorganisms (slime) can be rinsed using an aqueous solution of sodium hypochlorite as an oxidizing agent, for example. For insoluble microparticles, the microparticles can be eliminated form the membrane surfaces by flushing a rinsing solvent at a high flow rate.

For the purpose of the present specification, the fixed module operation time required for clogging substances to clog the porous membranes is a period in the range of at least 8 hours, and preferably it is a period in the range of 8 hours to 1 year.

From the viewpoint of removing clogging substances such as insoluble microparticles, the flow rate at which the solvent is flushed through the membrane surfaces or membrane interiors is a flow rate of at least 0.1 m/sec, preferably 10 cm/sec to 20 m/sec and more preferably 20 cm/sec to 10 m/sec. When rinsing is with a solvent with dissolving power, the contact time with the clogging substances is more important and the rinsing conditions are not limited by the flow rate. The contact time in this case will vary depending on the clogging substances and their amounts. Calcium carbonate can be rinsed off in a relatively short time of between about 1 minute and an hour, while organic materials and microorganisms (slime) generally require a rinsing time of about 30 minutes to 8 hours.

The method for rinsing clogging substances that have precipitated and adhered in the pores inside the porous membranes (thick membrane sections) may be, for example, hydrophilic wetting of the membranes with an alcohol or a mixture of an alcohol and water, followed by flushing of the membranes with a rinsing solvent such as a hydrophilic solution, since the porous membranes are hydrophobic and do not allow direct penetration of the hydrophilic solution through the membranes. By flushing the solvent by application of a pressure of 0.1 to 0.7 MPa to the membranes it is possible to break through the pores and thus rinse out the pore interiors. In addition, membrane distillation using fresh water as the raw water can bring clogging substances to the outer surfaces of the membranes, after which the outer surfaces may be rinsed to remove the clogging substances.

The porous membranes that have been coated with a water-repellent agent according to the invention have higher rinsing recoverability or can be rinsed under weaker rinsing conditions, compared to untreated porous membranes. While the reason is not completely understood, it is conjectured that the water-repellent agent weakens interaction between the porous membrane surfaces and the clogging substances.

[Combination with Other Techniques]

The membrane distillation module or membrane distillation device of this embodiment can be used as a composite system in combination with other water treatment techniques. For example, concentrated water produced during treatment by a RO (Reverse Osmosis) method using the principle of RO can be further purified using the membrane distillation device of this embodiment to increase the total water yield. The membrane distillation device of this embodiment may also be used as recovering means for a DS (Draw Solution) used in an FO (Forward Osmosis) method utilizing the principle of FO.

The present invention has been explained above in detail.

The invention includes 3 types of membrane hollow fibers used in the module for membrane distillation, 3 types of membrane distillation module structures, and the technique of coating the hollow fibers with a water-repellent agent.

In order to achieve high flux as one problem to be solved, among hollow fiber types, high flux can be obtained in the following order:
1. Membrane with a large pore diameter (average pore diameter: ≥0.20 μm), a large void percentage (≥60%) and a uniform pore size distribution,
2. Membrane with a medium pore diameter (average pore diameter: 0.15 to 0.20 μm) and a high contact angle)(≥90°, and
3. Membrane with a small pore diameter (maximum pore diameter: ≥0.25 μm and a thick film (≥60 μm).

Among the module structures, high flux can be obtained in the order: internal pressure membrane distillation device, external pressure membrane distillation device.

In regard to wetting resistance:
the hollow fiber types of 2. and 3. give results superior to 1. Of the module types, superior results are obtained with an external pressure type than with an internal pressure type.

Similar results are obtained for minimizing salt permeation as for wetting resistance.

Coating of the hollow fibers for water-repellency according to the invention provides results allowing both wetting resistance and reduced salt permeation to be obtained simultaneously, while also maintaining high flux (although only an increase in flux is seen in some cases).

EXAMPLES

[Internal Pressure Membrane Module]

The present invention will now be explained in more specific detail through the following examples and comparative examples, with the understanding that the invention is in no way limited by the examples.

The methods for measuring the physical properties will be explained first.

1. Electric Conductivity of Permeated Water (μS/Cm)

The electric conductivity of the permeated water obtained by membrane distillation was measured using a Model "7773-A102" electrical conductivity indicator by Top Water Systems Co.

2. Permeated Water Volume (Water Production Volume) (Kg/Hr)

Membrane distillation was carried out, and the weight of permeated water housed in the collected permeated water container was measured using an electronic scale.

3. Flux ($Kg/m^2/Hr$)

Membrane distillation was carried out, and the flux was calculated by the following formula.

Flux=Weight of water obtained with operation for 1 hour÷hollow fiber membrane area÷1 hour The hollow fiber membrane area is the total area of the inner surfaces of the hollow fibers.

4. Permeated Water Production Efficiency (%)

Membrane distillation was carried out, and the permeated water production efficiency was calculated by the following formula.

Permeated water production efficiency (%)=Permeated water volume/feed flow rate×100

Example 1

After placing 4,200 polyvinylidene fluoride hollow fiber membranes each with an outer diameter of 1.22 mm, an inner diameter of 0.66 mm and a membrane thickness of 280 μm in a polysulfone cylindrical container with an inner diameter of 128 mm, the gaps between the hollow fiber membranes and the cylindrical container were anchored with an epoxy resin to fabricate a membrane module for membrane distillation having a membrane effective length of 86 mm. A condenser was also fabricated, having 360 stainless steel tubes each with an inner diameter of 1 mm, an outer diameter of 1.2 mm and an effective length of 220 mm housed in the same container as the cylindrical container. The membrane distillation module and the condenser were connected together at a single side wall opening, as shown in FIG. 1. The shortest distance between the outer surfaces of the hollow fiber membranes in the membrane distillation module and the outer surfaces of the stainless steel tubes in the condenser was 50 mm. The outlet of the condenser was connected to the permeated water container by tubing, and a pressure reduction device was connected via a pressure regulator to maintain a pressure of 10 kPa (−90 kPa (G)) in the system.

The saturated water vapor pressure of water at 65° C. is 25 kPa (−75 kPa (G)).

Next, 10 L of tap water adjusted to a temperature of 65° C., as water to be treated (raw water), was circulated through the insides (hollow interiors) of the hollow fiber membranes at a flow rate of 600 to 840 kg/hr. Cooling water at 20° C. was circulated through the insides (hollow interiors) of the stainless steel tubes of the condenser at a flow rate of 420 kg/hr. The reduced volume of the water to be treated (raw water) by membrane distillation was routinely supplemented by adding tap water. In this experiment, the reduction in volume of the water to be treated was kept to within 100 mL.

The structural properties of the membrane distillation module and the membrane distillation operating conditions and results are shown in Table 1 below.

The flux was 14.6 kg/m²/hr, the permeated water production efficiency was 2.6%, and the electric conductivity of the obtained permeated water varied within a range of 0.1 to 0.2 μS/cm.

Example 2

Membrane distillation was carried out in the same manner as Example 1, except that 4,400 hollow fiber membranes were used. The structural properties of the membrane distillation module and the membrane distillation operating conditions and results are shown in Table 1 below. The flux was 14.6 kg/m$^2$/hr, the permeated water production efficiency was 2.7%, and the electric conductivity of the obtained permeated water varied within a range of 0.1 to 0.2 µS/cm.

Example 3

Membrane distillation was carried out in the same manner as Example 1, except that 4,600 hollow fiber membranes were used. The structural properties of the membrane distillation module and the membrane distillation operating conditions and results are shown in Table 1 below. The flux was 13.4 kg/m$^2$/hr, the permeated water production efficiency was 2.6%, and the electric conductivity of the obtained permeated water varied within a range of 0.1 to 0.2 µS/cm.

Example 4

Membrane distillation was carried out in the same manner as Example 1, except that 600 hollow fiber membranes were used and placed in a polysulfone cylindrical container with an inner diameter of 55 mm, and the membrane effective length was 170 mm. The structural properties of the membrane distillation module and the membrane distillation operating conditions and results are shown in Table 1 below. The flux was 40.6 kg/m$^2$/hr, the permeated water production efficiency was 1.1%, and the electric conductivity of the obtained permeated water varied within a range of 0.1 to 0.2 µS/cm.

Example 5

Membrane distillation was carried out in the same manner as Example 4, except that 700 hollow fiber membranes were used. The structural properties of the membrane distillation module and the membrane distillation operating conditions and results are shown in Table 1 below. The flux was 39.7 kg/m$^2$/hr, the permeated water production efficiency was 1.3%, and the electric conductivity of the obtained permeated water varied within a range of 0.1 to 0.2 µS/cm.

Example 6

Membrane distillation was carried out in the same manner as Example 4, except that 805 hollow fiber membranes were used. The structural properties of the membrane distillation module and the membrane distillation operating conditions and results are shown in Table 1 below. The flux was 33.8 kg/m$^2$/hr, the permeated water production efficiency was 1.2%, and the electric conductivity of the obtained permeated water varied within a range of 0.1 to 0.2 µS/cm.

Example 7

Membrane distillation was carried out in the same manner as Example 4, except that 900 hollow fiber membranes were used. The structural properties of the membrane distillation module and the membrane distillation operating conditions and results are shown in Table 1 below. The flux was 29.2 kg/m$^2$/hr, the permeated water production efficiency was 1.2%, and the electric conductivity of the obtained permeated water varied within a range of 0.1 to 0.2 µS/cm.

Example 8

Membrane distillation was carried out in the same manner as Example 5, except that the water to be treated (raw water) used was simulated coal bed methane waste water having the composition shown in Table 2 below. The structural properties of the membrane distillation module and the membrane distillation operating conditions and results are shown in Table 1 below. The flux was 33.6 kg/m$^2$/hr, the permeated water production efficiency was 1.1%, and the electric conductivity of the obtained permeated water varied within a range of 0.1 to 0.2 µS/cm.

Comparative Example 1

Membrane distillation was carried out in the same manner as Example 4, except that 1,200 hollow fiber membranes were used. The structural properties of the membrane distillation module and the membrane distillation operating conditions and results are shown in Table 1 below. The flux was 18.1 kg/m$^2$/hr, the permeated water production efficiency was 1.0%, and the electric conductivity of the obtained permeated water varied within a range of 0.1 to 0.2 µS/cm.

TABLE 1

|  |  | Example 1 | Example 2 | Example 3 | Example 4 | Example 5 | Example 6 | Example 7 | Example 8 | Comp. Example 1 |
|---|---|---|---|---|---|---|---|---|---|---|
| Hollow fiber membrane outer diameter | mm | 1.22 | 1.22 | 1.22 | 1.22 | 1.22 | 1.22 | 1.22 | 1.22 | 1.22 |
| Hollow fiber membrane inner diameter | mm | 0.66 | 0.66 | 0.66 | 0.66 | 0.66 | 0.66 | 0.66 | 0.66 | 0.66 |
| Hollow fiber membrane number | num | 4200 | 4400 | 4600 | 600 | 700 | 805 | 900 | 700 | 1200 |
| Hollow fiber membrane effective length | mm | 86 | 86 | 86 | 170 | 170 | 170 | 170 | 170 | 170 |
| Hollow fiber membrane interior surface area | m$^2$ | 0.75 | 0.78 | 0.82 | 0.21 | 0.25 | 0.28 | 0.32 | 0.25 | 0.42 |
| Hollow fiber membrane bundle diameter Db | mm | 98.3 | 101.5 | 104.0 | 40.0 | 41.5 | 45.0 | 47.0 | 41.5 | 50.0 |
| Hollow fiber membrane opening total cross-sectional area Sm | m$^2$ | 1.4E−03 | 1.5E−03 | 1.6E−03 | 2.1E−04 | 2.4E−04 | 2.8E−04 | 3.1E−04 | 2.4E−04 | 4.1E−04 |
| Hollow fiber membrane outer diameter total cross-sectional area | m$^2$ | 4.9E−03 | 5.1E−03 | 5.4E−03 | 7.0E−04 | 8.2E−04 | 9.4E−04 | 1.1E−03 | 8.2E−04 | 1.4E−03 |
| Head section water flow opening cross-section diameter Df | mm | 66 | 66 | 66 | 29 | 29 | 29 | 29 | 29 | 29 |
| Head section water flow opening cross-sectional area Sh | m$^2$ | 5.7E−04 | 5.7E−04 | 5.7E−04 | 2.5E−04 | 2.5E−04 | 2.5E−04 | 2.5E−04 | 2.5E−04 | 2.5E−04 |

TABLE 1-continued

|  |  | Example 1 | Example 2 | Example 3 | Example 4 | Example 5 | Example 6 | Example 7 | Example 8 | Comp. Example 1 |
|---|---|---|---|---|---|---|---|---|---|---|
| Container inner diameter Dh | mm | 128 | 128 | 128 | 55 | 55 | 55 | 55 | 55 | 55 |
| Side wall opening diameter | mm | 27 | 27 | 27 | 27 | 27 | 27 | 27 | 27 | 27 |
| Side wall opening number |  | 3 | 3 | 3 | 3 | 3 | 3 | 3 | 3 | 3 |
| Side wall opening total cross-sectional area | $m^2$ | 1.7E−03 | 1.7E−03 | 1.7E−03 | 1.7E−03 | 1.7E−03 | 1.7E−03 | 1.7E−03 | 1.7E−03 | 1.7E−03 |
| Hollow fiber membrane filling ratio | % | 38.2 | 40.0 | 41.8 | 29.5 | 34.4 | 39.6 | 44.3 | 34.4 | 59.0 |
| Db/Dh |  | 0.77 | 0.79 | 0.81 | 0.73 | 0.75 | 0.82 | 0.85 | 0.75 | 0.91 |
| Df/Db |  | 0.67 | 0.65 | 0.63 | 0.73 | 0.70 | 0.64 | 0.62 | 0.70 | 0.58 |
| Sm/Sh |  | 2.5 | 2.6 | 2.8 | 0.8 | 1.0 | 1.1 | 1.2 | 1.0 | 1.6 |
| Feed flow rate | kg/h | 420 | 420 | 420 | 780 | 780 | 780 | 780 | 780 | 780 |
| Permeated water volume | kg/h | 10.9 | 11.5 | 11.0 | 8.6 | 9.9 | 9.6 | 9.3 | 8.4 | 7.7 |
| Flux | $kg/m^2/h$ | 14.6 | 14.6 | 13.4 | 40.6 | 39.7 | 33.8 | 29.2 | 33.6 | 18.1 |
| Permeated water production efficiency | % | 2.6 | 2.7 | 2.6 | 1.1 | 1.3 | 1.2 | 1.2 | 1.1 | 1.0 |

TABLE 2

| Solute | Concentration |
|---|---|
| Calcium chloride dihydrate | 0.3 g/L |
| Potassium carbonate | 0.1 g/L |
| Magnesium chloride hexahydrate | 0.6 g/L |
| Potassium silicate | 1.0 g/L |
| Strontium chloride hexahydrate | 0.1 g/L |
| Sodium chloride | 62.0 g/L |
| Sodium hydrogencarbonate | 24.0 g/L |

Based on the results shown in Table 1, if the Db/Dh ratio is no greater than 0.85, then the gaps between the hollow fiber bundle and the cylindrical container inner walls can be adequately ensured, and the permeated water volume per module and the permeated water production efficiency can be increased so as to avoid impeding flow of water vapor from the interior of the cylindrical container to the side wall opening.

Figure 5:
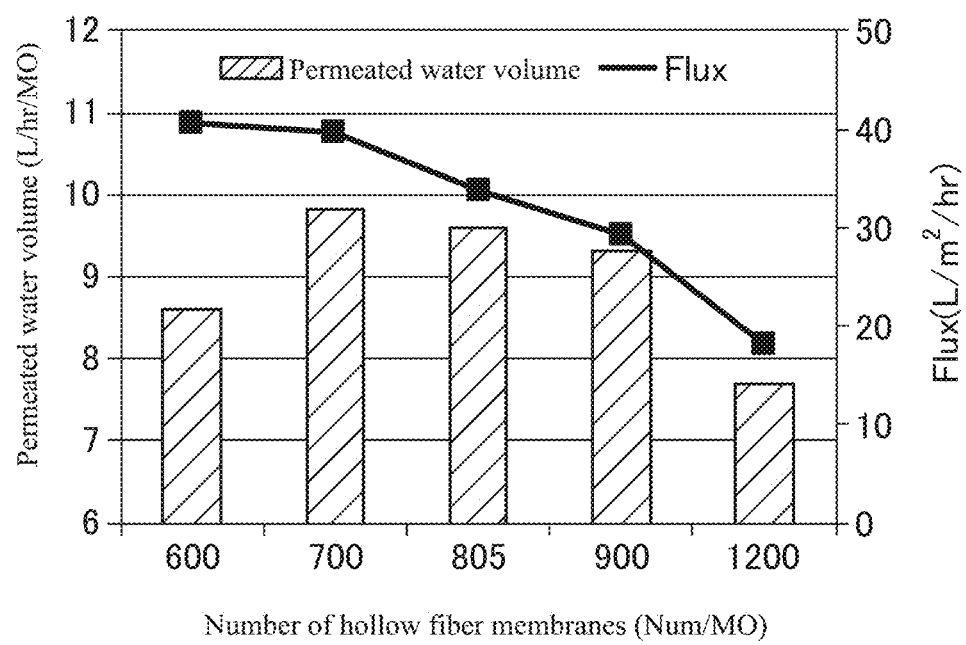
FIG. 5 is a graph showing the relationship between the number of hollow fiber membranes and the permeated water volume and flux, for the internal pressure membrane distillation modules of Examples 4 to 7 and Comparative Example 1.

The relationship between the number of hollow fiber membranes and the permeated water volume and flux, for the internal pressure membrane distillation modules of Examples 4 to 7 and Comparative Example 1, is shown as a graph in FIG. 5.

[End-Supplied External Pressure Membrane Module]

Examples concretely illustrating the construction and effect of the invention will now be described, with the understanding that this embodiment is in no way limited by the Examples.

(1) Carrying Out Membrane Distillation

Membrane distillation was carried out using a membrane module for membrane distillation and membrane distillation device having the construction shown in FIGS. 6 to 9. For the membrane module 10, the number of hydrophobic porous hollow fiber membranes listed in Table 1 were housed in a polysulfone cylindrical container with an inner diameter D1 of 55 mm and an inner diameter D2 of 60 mm. With the configuration shown in FIG. 7, a treatment water introduction unit 122, having seven tapered treatment water introduction flow channels each with a diameter of 10 mm and a length of 70 mm arranged at an even spacing of 10 mm, was provided with the flow channel inlet on the same plane as one end E1. The treatment water introduction flow channels were all disposed so as to be included inside the membrane bundle. The angle formed between d1 and d2 was 90 degrees.

The condensing unit 20 comprised, as the cooling unit 21, a condensing module having 360 stainless steel tubes each with an inner diameter of 1 mm, an outer diameter of 1.2 mm and an effective length of 220 mm housed in a container of the same shape as used for the membrane module. The membrane module 10 and condensing unit 20 were connected as shown in FIG. 6. The shortest distance between the other end E2 of the hollow fiber membranes of the membrane module 10 and the condensing unit 20 was set to 150 mm.

The outlet of the condensing unit 20 was connected to the water collection container 50 by tubing and the gas phase unit of the water collection container was connected to the pressure reduction device 70 via the pressure regulator 60, whereby the pressure in the system was adjusted.

Tap water in an amount of 10 L, adjusted to a temperature of 65° C., was supplied as water to be treated to the treatment water introduction unit 122 of the membrane module 10, at a flow rate of 600 to 840 kg/h. Cooling water at 20° C. was circulated through the hollow interiors of the stainless steel tubes of the condensing unit 20 at a flow rate of 420 kg/hr. The pressure in the system (specifically the pressure in the hollow sections of the hollow fiber membranes of the membrane module, and condensing unit) was adjusted to 10 kPa, and membrane distillation was carried out.

(2) Measurement (Electric Conductivity of Purified Water)

The electric conductivity of the purified water obtained by membrane distillation was measured using a Model "7773-A102" electrical conductivity indicator by Top Water Systems Co.

(Water Production Volume)

Membrane distillation was carried out, and the weight of distilled water (i.e. the permeated water) housed in the water collection container was measured using an electronic scale.

(Flux Measurement)

Membrane distillation was carried out, and the flux was calculated by the following formula.

$$Flux = \text{Weight of water obtained with operation for 1 hour} \div \text{membrane area} \div 1 \text{ hour}$$

(Water Production Efficiency)

Membrane distillation was carried out, and the water production efficiency was calculated by the following formula.

$$\text{Water production efficiency} = \text{water production volume} \div \text{feed flow rate} \times 100$$

(Pressure Resistance in Instantaneous Destruction Test)

The pressure resistance of the membrane module was measured by a method in which an empty module containing no hollow fiber membranes was capped at all of the ports other than the water-pressurization port, the module interior was filled with water and then slowly pressurized with water at 0.02 MPa/sec, and the point at which the module ruptured was measured.

(Outer Diameter, Inner Diameter, Membrane Thickness)

The outer diameters and inner diameters of the hydrophobic porous hollow fiber membranes were measured by thinly slicing them with a razor in the direction perpendicular to the lengthwise direction of the hollow fiber membranes, and using a microscope to determine the outer diameters and inner diameters of the cross-sections. The membrane thickness (mm) was determined as the membrane thickness (μm) calculated from the following formula (1) based on arithmetic mean.

[Mathematical Formula 1]

$$\text{Membrane thickness [mm]} = (\text{Outer diameter [mm]} + \text{inner diameter [mm]})/2 \quad (1)$$

(Void Percentage)

A hydrophobic porous hollow fiber membrane was cut to a fixed length using a razor, an electronic scale was used to measure the weight of the hollow fibers, and the void percentage was calculated from the following formula (2).

[Mathematical Formula 2]

$$\text{Void percentage[\%]} = 100 - \{(\text{Hollow fiber weight[g]} \times 100)/(\text{polymer density[g/cm}^3\text{]} \times ((\text{outer diameter [cm]}/2)^2 - (\text{inner diameter[cm]}/2)^2) \times 3.14 \times \text{length [cm]})\} \quad (2)$$

(Average Pore Diameter)

Measurement was performed by the method of measuring average pore diameter described in ASTM: F316-86 (also known as the "half-dry method").

A hydrophobic porous hollow fiber membrane of approximately 10 cm length was measured, under standard measuring conditions of 25° C. with a pressurization rate of 0.01 atm/sec, using ethanol as the liquid.

The average pore diameter can be determined by the following formula:

$$\text{Average pore diameter[μm]} = 2860 \times (\text{surface tension of solution used[dyne/cm]})/(\text{half-dry air pressure[Pa]}),$$

but since the surface tension of ethanol at 25° C. is 21.97 dyne/cm, the average pore diameter was determined by the following formula:

$$\text{Average pore diameter[μm]} = 62834/(\text{half-dry air pressure[Pa]}).$$

(Maximum Pore Diameter)

The maximum pore diameter of the hollow fiber porous membranes was measured using the bubble point method. One end of a porous hollow fiber membrane with a length of 8 cm was closed off, and a nitrogen gas supply line was connected to the other end via a pressure gauge. After supplying nitrogen gas in this state to exchange the line interior with nitrogen, the porous hollow fiber membrane was immersed in ethanol. The porous hollow fiber membrane was immersed while applying slight pressure with nitrogen so that the ethanol did not flow back through the line. With the porous hollow fiber membrane immersed, the nitrogen gas pressure was slowly increased and the pressure P at which nitrogen gas bubbles began to stably emerge from the porous hollow fiber membrane was recorded. The maximum pore diameter of the porous hollow fiber membrane was calculated from this using the following formula (I), where d is the maximum pore diameter and γ is the surface tension.

$$d = C_1 \gamma / P \quad (I)$$

In formula (I), C1 is a constant. With ethanol as the immersion liquid, the maximum pore diameter d (μm) was calculated by substituting P (kg/cm$^2$) in the above formula, with $C_1\gamma = 0.632$ (kg/cm).

(Surface Opening Ratio)

An electron micrograph was taken of the membrane surface of the hydrophobic porous hollow fiber membrane using a scanning electron microscope (S-4700 by Hitachi, Ltd.) at a magnification of 5000 to 50,000×, with an acceleration voltage of 1.0 kV and secondary electron detection conditions. The surface opening ratio on the inner surface and outer surface of the hydrophobic porous hollow fiber membrane was determined by processing the electron micrograph image with image analysis processing software. The processing is conducted using ImageJ (free software), for example, as the image analysis software. The taken image was accentuated and filtered to show the hole portions as black regions and the non-hole portions as white regions. The holes were then counted, with polymer chains of the lower layer being counted as non-hole portions when the polymer chains were visible in the hole interiors. The surface opening ratio was calculated by the following formula.

$$\text{Surface opening ratio[\%]} = 100 \times (\text{sum of hole areas})/(\text{measured region area})$$

The (measured region area) is the (sum of the areas of each of the holes)+(sum of the areas of each of the non-hole portions). Holes on the boundary of the measured region are not excluded.

Example 1

Using a membrane module for membrane distillation with a hollow fiber membrane effective length of 290 mm, having 1,200 hollow fiber membranes each made of polyvinylidene fluoride and having an outer diameter of 1.22 mm, an inner diameter of 0.66 mm and a membrane thickness of 280 μm placed in a polysulfone cylindrical container, and with the gaps between the hollow fiber membranes and the cylindrical container anchored with an epoxy resin, membrane distillation was carried out by the method according to (1) above, with a feed flow rate of 840 kg/h.

The water production volume for this Example was 11.6 kg/h, and the water production efficiency was 1.4%. The electric conductivity of the purified water varied within a range of 0.1 to 0.2 μS/cm.

Example 2

Using a membrane module for membrane distillation with a hollow fiber membrane effective length of 290 mm, having 525 hollow fiber membranes each made of polyvinylidene fluoride and having an outer diameter of 2.00 mm, an inner diameter of 1.40 mm and a membrane thickness of 300 μm placed in a polysulfone cylindrical container, and with the gaps between the hollow fiber membranes and the cylindrical container anchored with an epoxy resin, membrane distillation was carried out by the method according to (1) above, with a feed flow rate of 840 kg/h.

The water production volume for this Example was 9.2 kg/h, and the water production efficiency was 1.1%. The electric conductivity of the purified water varied within a range of 0.1 to 0.2 μS/cm.

Example 3

Membrane distillation was carried out in the same manner as Example 2, except that 450 of the hollow fiber membranes shown in Table 1 were used.

The water production volume for this Example was 7.5 kg/h, and the water production efficiency was 0.9%. The electric conductivity of the purified water varied within a range of 0.1 to 0.2 μS/cm.

Example 4

Membrane distillation was carried out in the same manner as Example 3, except that simulated coal bed methane waste water having the composition shown in Table 2 was used as the water to be treated. The water production volume for this Example was 6.4 kg/h, and the water production efficiency was 0.8%. The electric conductivity of the purified water varied within a range of 0.1 to 0.2 μS/cm.

Comparative Example 1

Membrane distillation was carried out in the same manner as Example 1, except that 700 of the hollow fiber membranes shown in Table 1 were used.

The water production volume for this Example was 5.3 kg/h, and the water production efficiency was 0.6%. The electric conductivity of the purified water varied within a range of 0.1 to 0.2 μS/cm.

Comparative Example 2

Membrane distillation was carried out in the same manner as Example 1, except that 700 of the hollow fiber membranes shown in Table 1 were used, and the hollow fiber membrane effective length was 120 mm.

The water production volume for this Example was 3.3 kg/h, and the water production efficiency was 0.5%. The electric conductivity of the purified water varied within a range of 0.1 to 0.2 μS/cm.

Comparative Example 3

Membrane distillation was carried out in the same manner as Example 1, except that 300 of the hollow fiber membranes shown in Table 1 were used, and the hollow fiber membrane effective length was 120 mm.

The water production volume for this Example was 1.7 kg/h, and the water production efficiency was 0.3%. The electric conductivity of the purified water varied within a range of 0.1 to 0.2 μS/cm.

The physical properties of the membranes obtained in Examples 1 to 4 and Comparative Examples 1 to 3 and the results of the membrane distillation are shown in Table 1.

TABLE 3

|  | Example 1 | Example 2 | Example 3 | Example 4 | Comp. Example 1 | Comp. Example 2 | Comp. Example 3 |
|---|---|---|---|---|---|---|---|
| Hollow fiber membrane outer diameter (mm) | 1.22 | 2.00 | 2.00 | 2.00 | 1.22 | 1.22 | 1.22 |
| Hollow fiber membrane inner diameter Dm (mm) | 0.66 | 1.40 | 1.40 | 1.40 | 0.66 | 0.66 | 0.66 |
| Hollow fiber membrane number (num) | 1200 | 525 | 450 | 450 | 700 | 700 | 300 |
| Hollow fiber membrane average pore diameter (μm) | 0.27 | 0.24 | 0.24 | 0.24 | 0.27 | 0.27 | 0.27 |
| Hollow fiber membrane maximum pore diameter (μm) | 0.33 |  |  |  | 0.33 | 0.33 | 0.33 |
| Hollow fiber membrane maximum pore diameter/average pore diameter | 1.2 |  |  |  | 1.2 | 1.2 | 1.2 |
| Hollow fiber membrane surface opening ratio (%) | 28 |  |  |  | 28 | 28 | 28 |
| Hollow fiber membrane porosity (%) | 72 |  |  |  | 72 | 72 | 72 |
| Hollow fiber membrane effective length L (mm) | 290 | 290 | 290 | 290 | 290 | 120 | 120 |
| Hollow fiber membrane inner diameter total cross-sectional area Sm (m$^2$) | 4.1E−04 | 8.1E−04 | 6.9E−04 | 6.9E−04 | 2.4E−04 | 2.4E−04 | 1.0E−04 |
| Membrane filling ratio (%) | 59 | 69 | 60 | 60 | 34 | 34 | 15 |
| Shortest distance Dmin between membrane bundle and container inner surface (mm) | 1 | 1 | 2 | 2 | 5 | 5 | 12 |
| Steam extraction port cross-sectional area Sp (m$^2$) | 6.2E−04 | 6.2E−04 | 6.2E−04 | 6.2E−04 | 6.2E−04 | 6.2E−04 | 6.2E−04 |
| Total cross-sectional area Sf of treatment water inlet (m$^2$) | 5.5E−04 | 5.5E−04 | 5.5E−04 | 5.5E−04 | 5.5E−04 | 5.5E−04 | 5.5E−04 |
| Cylinder container end cross-sectional area Sh (m$^2$) | 3.3E−03 | 3.3E−03 | 3.3E−03 | 3.3E−03 | 3.3E−03 | 3.3E−03 | 3.3E−03 |
| Cross-sectional area Sc of treated water extraction port (m$^2$) | 1.1E−04 | 1.1E−04 | 1.1E−04 | 1.1E−04 | 1.1E−04 | 1.1E−04 | 1.1E−04 |
| L/Dm | 439 | 207 | 207 | 207 | 439 | 182 | 182 |
| Sp/Sm | 1.5 | 0.8 | 0.9 | 0.9 | 2.6 | 2.6 | 6.2 |
| Sf/Sh | 0.17 | 0.17 | 0.17 | 0.17 | 0.17 | 0.17 | 0.17 |
| Sc/Sf | 0.20 | 0.20 | 0.20 | 0.20 | 0.20 | 0.20 | 0.20 |
| Minimum cross-sectional area of treatment water introduction flow channel (m$^2$) | 80 | 80 | 80 | 80 | 80 | 80 | 80 |

TABLE 3-continued

|  | Example 1 | Example 2 | Example 3 | Example 4 | Comp. Example 1 | Comp. Example 2 | Comp. Example 3 |
|---|---|---|---|---|---|---|---|
| Feed flow rate (kg/h) | 840 | 840 | 840 | 840 | 840 | 600 | 600 |
| Water production volume (kg/h) | 11.6 | 9.2 | 7.5 | 6.4 | 5.3 | 3.3 | 1.7 |
| FLUX (kg/m$^2$/h) | 16.1 | 13.8 | 13.0 | 11.0 | 12.6 | 18.8 | 22.6 |
| Water production efficiency (%) | 1.4 | 1.1 | 0.9 | 0.8 | 0.6 | 0.5 | 0.3 |
| Pressure resistance (MPa) | 1.2 | 1.2 | 1.2 | 1.2 | 1.2 | 1.2 | 1.2 |

TABLE 4

| Solute | Concentration |
|---|---|
| Calcium chloride dihydrate | 0.3 g/L |
| Potassium carbonate | 0.1 g/L |
| Magnesium chloride hexahydrate | 0.6 g/L |
| Potassium silicate | 1.0 g/L |
| Strontium chloride hexahydrate | 0.1 g/L |
| Sodium chloride | 62.0 g/L |
| Sodium hydrogencarbonate | 24.0 g/L |

[External Pressure Membrane Module]

Examples concretely illustrating the construction and effect of the invention will now be described, with the understanding that this embodiment is in no way limited by the Examples.

(1) Carrying Out Membrane Distillation

Figure 11:
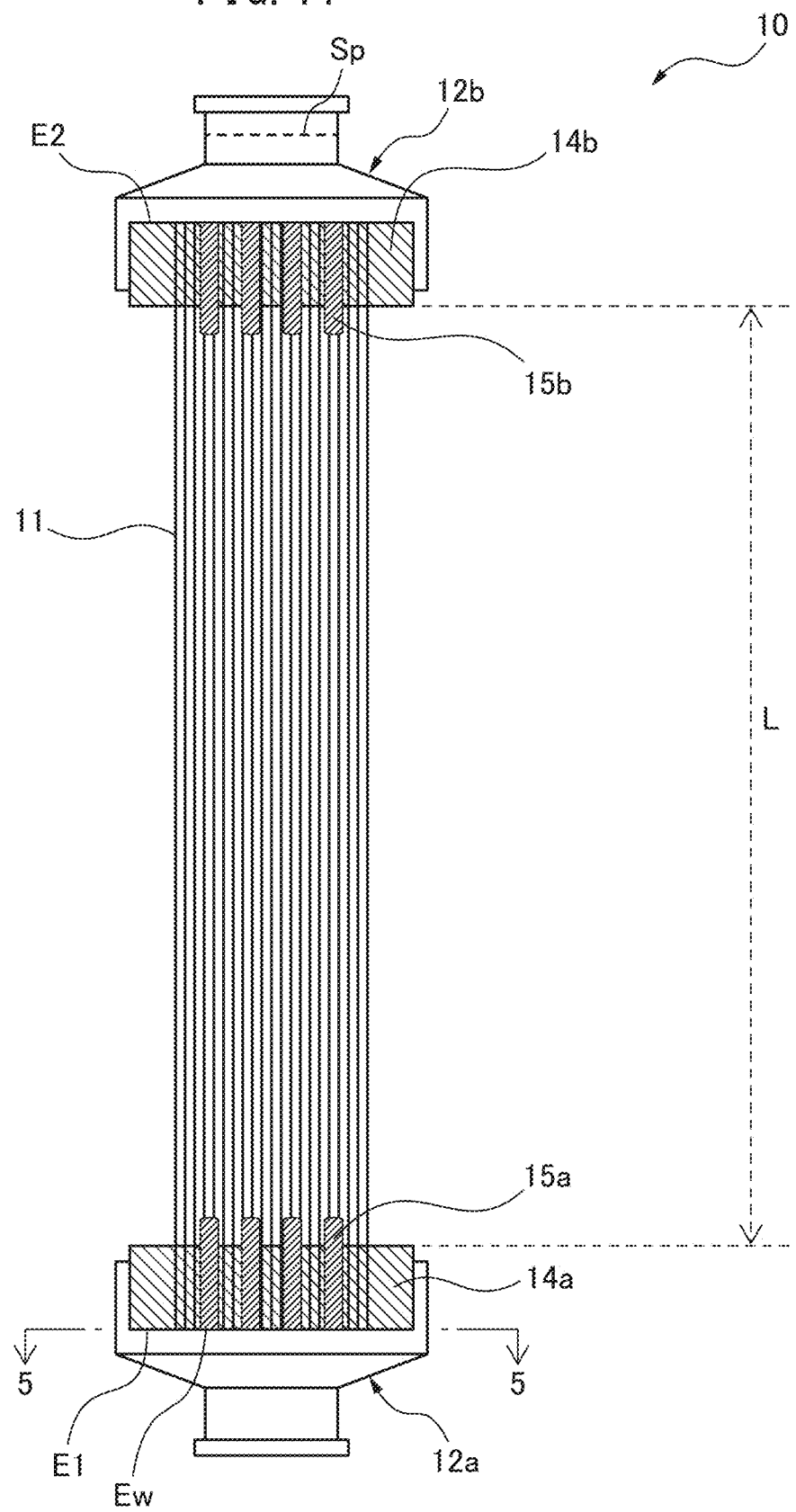
FIG. 11 is a diagram illustrating a membrane module for membrane distillation according to a preferred embodiment.

Membrane distillation was carried out using the membrane distillation device 1 having the membrane module for membrane distillation 10 shown in FIGS. 10 and 11. As shown in Table 1, the membrane module for membrane distillation 10 (distillation section) having the number of hydrophobic porous hollow fiber membranes listed in Table 1 and anchored to polysulfone headers with the inner diameters listed in Table 1, and the condensing module (condensing unit 20) having stainless steel tubes with inner diameters of 1 mm and outer diameters of 1.2 mm housed in an arbitrary number in a polysulfone case having the same inner diameter as that used in the distillation section, were connected as shown in FIG. 10. The shortest distance between the end faces E2 of the hollow fiber membranes on the steam extraction outlet side and the condensing unit 20 was set to be 150 mm.

The outlet of the condensing unit 20 was connected to the water collection container 30 by tubing and the gas phase unit of the water collection container 30 was connected to the pressure reduction device 50 via the pressure regulator 40, whereby the pressure in the system was adjusted.

The outer surfaces of the hydrophobic porous hollow fiber membranes were immersed in 1500 g of tap water at 65° C. in the container 13, and cooled by flushing 30° C. cooling water into the hollow interiors as the interior regions of the stainless steel tubes of the condensing unit 20, at a flow rate of 600 mL/min, a vacuum pump (as the pressure reduction device 50) was used for adjustment of the pressure in the system (specifically in the hollow sections of the hollow fiber membranes and in the condensing unit 20) to 10 kPaG (−90 kPaG), and membrane distillation was carried out while stirring the interior of the container 13 with a turbine blade (as the stirring mechanism 16) at 1000 rpm.

(2) Measurement (Flux Measurement)

Membrane distillation was carried out, and the flux was calculated by the following formula.

Flux=Weight of water obtained with operation for 1 hour÷membrane area÷1 hour (Outer Diameter, Inner Diameter, Membrane Thickness)

The outer diameters and inner diameters of the hydrophobic porous hollow fiber membranes were measured by thinly slicing them with a razor in the direction perpendicular to the lengthwise direction of the hollow fiber membranes, and using a microscope to determine the outer diameters and inner diameters of the cross-sections. The membrane thickness (mm) was determined as the membrane thickness (μm) calculated from the following formula (1) based on arithmetic mean.

[Mathematical Formula 3]

Membrane thickness [mm]=(Outer diameter [mm]+ inner diameter [mm])/2    (1)

(Void Percentage)

A hydrophobic porous hollow fiber membrane was cut to a fixed length using a razor, an electronic scale was used to measure the weight of the hollow fibers, and the void percentage was calculated from the following formula (2).

[Mathematical Formula 4]

Void percentage[%]=100−{(Hollow fiber weight[g]× 100)/(polymer density[g/cm$^3$]×((outer diameter [cm]/2)$^2$−(inner diameter[cm]/2)$^2$)×3.14×length [cm])}    (2)

(Average Pore Diameter)

Measurement was performed by the method of measuring average pore diameter described in ASTM:F316-86 (also known as the "half-dry method").

A hydrophobic porous hollow fiber membrane of approximately 10 cm length was measured, under standard measuring conditions of 25° C. with a pressurization rate of 0.01 atm/sec, using ethanol as the liquid.

The average pore diameter can be determined by the following formula:

Average pore diameter[μm]=2860×(surface tension of solution used[dyne/cm])/(half-dry air pressure[Pa]), but since the surface tension of ethanol at 25° C. is 21.97 dyne/cm, the average pore diameter was determined by the following formula:

Average pore diameter[μm]=62834/(half-dry air pressure[Pa]).

(Maximum Pore Diameter)

The maximum pore diameter of the hollow fiber porous membranes was measured using the bubble point method. One end of a porous hollow fiber membrane with a length of 8 cm was closed off, and a nitrogen gas supply line was connected to the other end via a pressure gauge. After supplying nitrogen gas in this state to exchange the line interior with nitrogen, the porous hollow fiber membrane was immersed in ethanol. The porous hollow fiber membrane was immersed while applying slight pressure with nitrogen so that the ethanol did not flow back through the line. With the porous hollow fiber membrane immersed, the nitrogen gas pressure was slowly increased and the pressure P at which nitrogen gas bubbles began to stably emerge from the porous hollow fiber membrane was recorded. The maximum pore diameter of the porous hollow fiber membrane was calculated from this using the following formula (I), where d is the maximum pore diameter and γ is the surface tension.

$$d = C_1 \gamma / P \quad (I)$$

In formula (I), C1 is a constant. With ethanol as the immersion liquid, the maximum pore diameter d (μm) was calculated by substituting P (kg/cm$^2$) in the above formula, with $C_1\gamma = 0.632$ (kg/cm).

(Surface Opening Ratio)

An electron micrograph was taken of the membrane surface of the hydrophobic porous hollow fiber membrane using a scanning electron microscope (S-4700 by Hitachi, Ltd.) at a magnification of 5000 to 50,000×, with an acceleration voltage of 1.0 kV and secondary electron detection conditions. The surface opening ratio on the inner surface and outer surface of the hydrophobic porous hollow fiber membrane was determined by processing the electron micrograph image with image analysis processing software. The processing is conducted using ImageJ (free software), for example, as the image analysis software. The taken image was accentuated and filtered to show the hole portions as black regions and the non-hole portions as white regions. The holes were then counted, with polymer chains of the lower layer being counted as non-hole portions when the polymer chains were visible in the hole interiors. The surface opening ratio was calculated by the following formula.

Surface opening ratio[%]=100×(sum of hole areas)/ (measured region area)

The (measured region area) is the (sum of the areas of each of the holes)+(sum of the areas of each of the non-hole portions). Holes on the boundary of the measured region were not excluded.

Example 1

Using a membrane module for membrane distillation with a hollow fiber membrane effective length of 70 mm, having 210 hollow fiber membranes each made of polyvinylidene fluoride and having an outer diameter of 1.22 mm and an inner diameter of 0.66 mm, and divided into 3 small bundles of 70 each, as shown in Table 1, and with both the upper ends and lower ends of the hollow fiber membranes having their gaps with the polysulfone headers anchored with a urethane resin, membrane distillation was carried out by the method according to (1) above, with a feed temperature of 65° C. and while stirring with a turbine blade at 1000 rpm. The flux for this Example was 18.8 kg/m$^2$/h.

Example 2

Membrane distillation was carried out in the same manner as Example 1, except that 210 hollow fiber membranes were used as a single bundle. The flux for this Example was 6.4 kg/m$^2$/h.

Example 3

Membrane distillation was carried out in the same manner as Example 1, except that 150 hollow fiber membranes were used as a single bundle. The flux for this Example was 7.8 kg/m$^2$/h.

Example 4

Membrane distillation was carried out in the same manner as Example 1, except that 250 hollow fiber membranes were used as a single bundle. The flux for this Example was 5.8 kg/m$^2$/h.

Example 5

Membrane distillation was carried out in the same manner as Example 1, except that one hollow fiber membrane was used, made of polyvinylidene fluoride and with an outer diameter of 3.90 mm and an inner diameter of 2.60 mm, as shown in Table 1, and the membrane module for membrane distillation had a hollow fiber membrane effective length of 295 mm. The flux for this Example was 7.5 kg/m$^2$/h.

Example 6

Membrane distillation was carried out in the same manner as Example 5, except that a membrane distillation membrane module with a hollow fiber membrane effective length of 560 mm was used. The flux for this Example was 7.4 kg/m$^2$/h.

Example 7

Membrane distillation was carried out in the same manner as Example 1, except that simulated coal bed methane waste water having the composition shown in Table 2 was used as the water to be treated. The flux for this Example was 16.0 kg/h.

Comparative Example 1

Membrane distillation was carried out in the same manner as Example 1, except that 4 hollow fiber membranes were used as a single bundle. The flux for this Example was 2.6 kg/m$^2$/h.

Comparative Example 2

Membrane distillation was carried out in the same manner as Example 1, except that 4 hollow fiber membranes, each made of polyvinylidene fluoride and with an outer diameter of 1.90 mm and an inner diameter of 1.10 mm as shown in Table 1, were used as a single bundle. The flux for this Example was 3.3 kg/m$^2$/h.

The physical properties of the membranes obtained in Examples 1 to 7 and Comparative Examples 1 and 2 and the results of the membrane distillation are shown in Table 1.

TABLE 5

| | Example 1 | Example 2 | Example 3 | Example 4 | Example 5 | Example 6 | Example 7 | Comp. Example 1 | Comp. Example 2 |
|---|---|---|---|---|---|---|---|---|---|
| Hollow fiber membrane outer diameter (mm) | 1.22 | 1.22 | 1.22 | 1.22 | 3.90 | 3.90 | 1.22 | 1.22 | 1.90 |
| Hollow fiber membrane inner diameter Dm (mm) | 0.66 | 0.66 | 0.66 | 0.66 | 2.60 | 2.60 | 0.66 | 0.66 | 1.10 |
| Hollow fiber membrane total number (num) | 210 | 210 | 150 | 250 | 1 | 1 | 210 | 4 | 4 |
| Membrane bundle number (bundles) | 3 | 1 | 1 | 1 | 1 | 1 | 3 | 1 | 1 |
| Hollow fiber membrane number per bundle (num) | 70 | 210 | 150 | 250 | 1 | 1 | 70 | 4 | 4 |
| Hollow fiber membrane effective length L (mm) | 70 | 70 | 70 | 70 | 295 | 560 | 70 | 70 | 70 |
| Total cross-sectional area Sm of opening at hollow fiber membrane end face ($m^2$) | 7.2E−05 | 7.2E−05 | 5.1E−05 | 8.6E−05 | 5.3E−06 | 5.3E−06 | 7.2E−05 | 1.4E−06 | 3.8E−06 |
| Cross-sectional area Sp per steam extraction port ($m^2$) | 1.3E−04 | 1.3E−04 | 1.3E−04 | 1.3E−04 | 1.3E−05 | 1.3E−05 | 1.3E−04 | 1.3E−05 | 1.3E−05 |
| L/Dm | 106 | 106 | 106 | 106 | 113 | 215 | 106 | 106 | 64 |
| Sp/Sm | 1.8 | 1.8 | 2.6 | 1.6 | 2.4 | 2.4 | 1.8 | 9.2 | 3.3 |
| Stirring blade rotational speed (rpm) | 1000 | 1000 | 1000 | 1000 | 1000 | 1000 | 1000 | 1000 | 1000 |
| Flux (kg/$m^2$/h) | 18.8 | 6.4 | 7.8 | 5.8 | 7.5 | 7.4 | 16.0 | 2.6 | 3.3 |
| Hollow fiber membrane average pore diameter (μm) | 0.27 | 0.27 | 0.27 | 0.27 | 0.22 | 0.22 | 0.27 | 0.27 | 0.60 |
| Hollow fiber membrane maximum pore diameter (μm) | 0.33 | 0.33 | 0.33 | 0.33 | | | 0.33 | 0.33 | 0.79 |
| Maximum pore diameter/average pore diameter ratio | 1.22 | 1.22 | 1.22 | 1.22 | | | 1.22 | 1.22 | 1.32 |
| Hollow fiber membrane surface opening ratio (%) | (inner) 28 (outer) 12 | (inner) 28 (outer) 12 | (inner) 28 (outer) 12 | (inner) 28 (outer) 12 | | | (inner) 28 (outer) 12 | (inner) 28 (outer) 12 | (inner) 24 (outer) 22 |
| Hollow fiber membrane void percentage (%) | 72 | 72 | 72 | 72 | | | 72 | 72 | 73 |

TABLE 6

| Solute | Concentration |
|---|---|
| Calcium chloride dihydrate | 0.3 g/L |
| Potassium carbonate | 0.1 g/L |
| Magnesium chloride hexahydrate | 0.6 g/L |
| Potassium silicate | 1.0 g/L |
| Strontium chloride hexahydrate | 0.1 g/L |
| Sodium chloride | 62.0 g/L |
| Sodium hydrogencarbonate | 24.0 g/L |

[1. Membrane with Large Pore Diameter (Average Pore Diameter: ≥0.20 μm), Large Void Percentage (≥60%) and Uniform Pore Size Distribution]

Examples concretely illustrating the construction and effect of the invention will now be described, with the understanding that this embodiment is in no way limited by the Examples. The measuring methods for hydrophobic porous hollow fiber membranes are described below, and the porous membranes may be measured with reference to these measuring methods.

(1) Measurement of Physical Properties of Porous Membranes (Weight-Average Molecular Weight)

The weight-average molecular weight of the hydrophobic polymer was measured by GPC, using a gel permeation chromatography (GPC) apparatus (HLC-8220GPC by Tosoh Corp., columns: one KF-606M by Shodex (6.0 mm ID×15 cm)+one KF-601 by Shodex (6.0 mm ID×15 cm)). The hydrophobic polymer was dissolved in an organic solvent such as N-methylpyrrolidone or dimethylformamide to a concentration of 1.0 mg/mL, and filtrate filtered by a 0.45 micron filter (Chromatdisk 25N by GL Sciences Inc.) was used as the GPC sample. A calibration curve was drawn using polymethyl methacrylate, and the weight-average molecular weight of the sample was calculated in terms of equivalent molecular weight.

(Outer Diameter, Inner Diameter, Membrane Thickness)

The hollow fiber membranes thinly sliced with a razor in the direction perpendicular to the lengthwise direction, and the outer diameters and inner diameters of the cross-sections were measured using a microscope.

The membrane thickness (mm) of each hollow fiber membrane was calculated from the following formula (1), as the arithmetic mean.

[Mathematical Formula 5]

$$\text{Membrane thickness [mm]} = (\text{Outer diameter [mm]} + \text{inner diameter [mm]})/2 \quad (1)$$

(Void Percentage)

A hydrophobic porous hollow fiber membrane was cut to a fixed length using a razor, an electronic scale was used to measure the weight of the hollow fibers, and the void percentage was calculated from the following formula (2).

[Mathematical Formula 6]

$$\text{Void percentage[\%]} = 100 - \{(\text{Hollow fiber weight[g]} \times 100)/(\text{polymer density[g/cm}^3] \times ((\text{outer diameter [cm]}/2)^2 - (\text{inner diameter[cm]}/2)^2) \times 3.14 \times \text{length [cm]})\} \quad (2)$$

(Average Pore Diameter)

The average pore diameter of each hollow fiber membrane was measured under the following conditions, by the method of measuring average pore diameter described in ASTM:F316-86 (also known as the "half-dry method").

The average pore diameter of a hydrophobic porous hollow fiber membrane of approximately 10 cm length was measured, under standard measuring conditions of 25° C. with a pressurization rate of 0.01 atm/sec, using ethanol as the liquid.

The average pore diameter can generally be determined by the following formula:

Average pore diameter[μm]=2860×(surface tension of solution used[dyne/cm])/(half-dry air pressure[Pa]), but since the surface tension of ethanol at 25° C. is 21.97 dyne/cm, the average pore diameter was determined by the following formula:

Average pore diameter[μm]=62834/(half-dry air pressure[Pa]).

(Surface Open Area Ratio)

The open area percentage on the inner surface and outer surface of the hydrophobic porous hollow fiber membrane was determined by processing the electron micrograph image of the hydrophobic porous hollow fiber membrane with image analysis processing software. An electron micrograph was taken of the membrane surface of the hydrophobic porous hollow fiber membrane using a scanning electron microscope (S-4700 by Hitachi, Ltd.) at a magnification of 5000 to 50,000×, with an acceleration voltage of 1.0 kV and secondary electron detection conditions. The processing is conducted using ImageJ (free software) as the image analysis software. The taken image was accentuated and filtered to show the hole portions as black regions and the non-hole portions as white regions. The holes were then counted, with polymer chains of the lower layer being counted as non-hole portions when the polymer chains were visible in the hole interiors. The surface open area ratio was calculated by the following formula:

Surface open area ratio[%]=100×(total area of holes)/(measured region area)

{where the (measured region area) is the (sum of the areas of each of the holes)+(sum of the areas of each of the non-hole portions), and the holes on the border of the measured region are not excluded}.

(Pore Size Distribution)

For measurement of the surface open area ratio, the pore diameters of an arbitrary number of hole portions in an electron micrograph of the membrane surface were measured, to obtain the pore size distribution and standard deviation.

(Tensile Strength)

The hollow fiber membranes were subjected to a tensile test according to MS K7127, using a Model TG-1 kN™ tensile tester by Minebea Co., Ltd., under conditions with a temperature of 23±2° C. and a pull rate of 200 mm/min. The tensile strength (kgf/cm$^2$) was calculated as the strength of the hollow fiber membrane during fracture divided by the cross-sectional area of the hollow fiber membrane before the test.

(Air Permeability Coefficient) The hydrophobic porous hollow fiber membrane was anchored in a resin container, the outside of the hollow fibers was pressurized with air at a fixed pressure, the amount of air permeating through the inside of the hollow fibers was measured using a soap film flowmeter, and the air permeability coefficient was calculated by the following formula (3):

[Mathematical Formula 7]

Air permeability coefficient[m$^3$/m$^2$·sec·Pa]=Air permeation amount[m$^3$/sec]/(membrane area[m$^2$]× pressure[Pa])   (3)

(2) Carrying Out Membrane Distillation

An evaporation module (evaporator) having an arbitrary number of hydrophobic porous hollow fiber membranes housed in a polysulfone case with an inner diameter of 20 mm, and a recovery module (recovery unit) having 20 stainless steel tubes each with an inner diameter of 1 mm and an outer diameter of 2 mm, housed in a case of the same shape as used for the evaporator, were connected as shown in FIG. 16(b). The shortest distance between the outer surfaces of the hydrophobic porous hollow fiber membranes in the evaporator and the outer surfaces of the stainless steel tubes in the recovery unit was 30 mm.

The outlet of the recovery unit was connected to the permeated water container by tubing and the gas phase unit of the permeated water container was connected to the pressure reduction device via the pressure regulator, whereby the pressure in the system was adjusted.

Simulated seawater (3.5 weight % sodium chloride aqueous solution) in an amount of 1.4 L and adjusted to a temperature of 65° C., was circulated through the hollow interiors of the hydrophobic porous hollow fiber membranes of the evaporator at a flow rate of 600 mL/min. Cooling water at 30° C. was circulated through the hollow interiors of the stainless steel tubes of the recovery unit at a flow rate of 1,000 mL/min. The pressure in the module system was adjusted to 10 kPa, and membrane distillation was carried out. The volume of the raw water reduced by membrane distillation was routinely supplemented by adding distilled water. Throughout the test, the volume reduction was kept to within 100 mL.

(Flux Measurement)

Membrane distillation was carried out, the weight of distilled water (i.e. permeated water) recovered in the permeated water container was measured using an electronic scale, and the flux was calculated by the following formula:

Flux=Weight of water obtained by1 hour of operation÷membrane area÷1 hour.

(Electric Conductivity of Water)

The electric conductivity of the membrane distillation water was measured using a conductivity meter (EC Testr (Registered Trademark) 11+ by Eutech Instruments).

Example 1

Membrane distillation was carried out following the method according to (2) above, using 35 hollow fiber membranes each made of polyvinylidene fluoride and having an outer diameter of 1.22 mm, an inner diameter of 0.66 mm, a membrane thickness of 280 μm, a void percentage of 71.5%, an average pore diameter of 0.27 μm, a standard deviation in the pore size distribution of 0.05, an inner surface open area percentage of 28%, an outer surface open area percentage of 12% and an air permeability coefficient of 9.6×10$^{-7}$ m$^3$/(m$^2$·sec·Pa), based on the methods for measuring the membrane physical properties in (1) above. The membrane area was 0.005 m$^2$.

The flux at 1 hour after the start of membrane distillation was 49 kg/m$^2$/h. The electric conductivity of the obtained membrane distillation water was 0.0 μS/cm at 25° C.

Example 2

Membrane distillation was carried out in the same manner as Example 1, except that hollow fiber membranes having the physical properties listed in Table 1 were used.

Example 3

Membrane distillation was carried out in the same manner as Example 1, except that simulated coal bed methane waste water having the composition shown in Table 2 was used as the raw water. The membrane area was 0.004 m².

The flux at 1 hour after the start of membrane distillation was 42 kg/m²/h. The electric conductivity of the obtained membrane distillation water was 0.0 μS/cm at 25° C.

Comparative Example 1

Membrane distillation was carried out following the method according to (2) above, using 33 hollow fiber membranes each made of polyethylene and having an outer diameter of 1.25 mm, an inner diameter of 0.68 mm, a membrane thickness of 285 μm, a void percentage of 81%, an average pore diameter of 0.19 μm, a standard deviation in the pore size distribution of 0.05, an inner surface open area percentage of 21%, outer surface open area percentage of 21% and an air permeability coefficient of $7.1 \times 10^{-7}$ m³/(m²·sec·Pa), based on the methods for measuring the membrane physical properties in (1) above. The membrane area was 0.005 m².

The flux at 1 hour after the start of membrane distillation was 33 kg/m²/h.

Comparative Examples 2 and 3

Membrane distillation was carried out in the same manner as Comparative Example 1, except that hollow fiber membranes having the physical properties listed in Table 1 were used.

Comparative Example 4

Membrane distillation was carried out in the same manner as Comparative Example 1, except that simulated coal bed methane waste water having the composition shown in Table 2 was used as the raw water, 66 hollow fiber membranes of Comparative Example 2 were used, and cooling water at 10° C. was circulated through the hollow interiors of the stainless steel tubes of the recovery unit. The membrane area was 0.01 m². The flux at 1 hour after the start of membrane distillation was 22 kg/m²/h.

The physical properties of the membranes obtained in Examples 1 to 3 and Comparative Examples 1 to 4 and the results of the membrane distillation are shown in Table 1.

TABLE 8-continued

| Solute | Concentration |
| --- | --- |
| Sodium chloride | 62.0 g/L |
| Sodium hydrogencarbonate | 24.0 g/L |

[2. Membrane with Medium Pore Diameter (Average Pore Diameter: 0.15 to 0.20 μm) and High Contact Angle)(≥90°)]

Example 1

Membrane distillation was carried out following the method according to (3) above, using 33 hollow fiber membranes each made of polyethylene and having an outer diameter of 1.25 mm, an inner diameter of 0.68 mm, a membrane thickness of 285 μm, a void percentage of 81%, an average pore diameter of 0.19 μm, an inner surface open area percentage of 21%, an outer surface open area percentage of 21% and an air permeability coefficient of $7.1 \times 10^{-7}$ m³/(m²·sec·Pa), based on the methods for measuring the membrane physical properties in (1) above.

Figure 17:
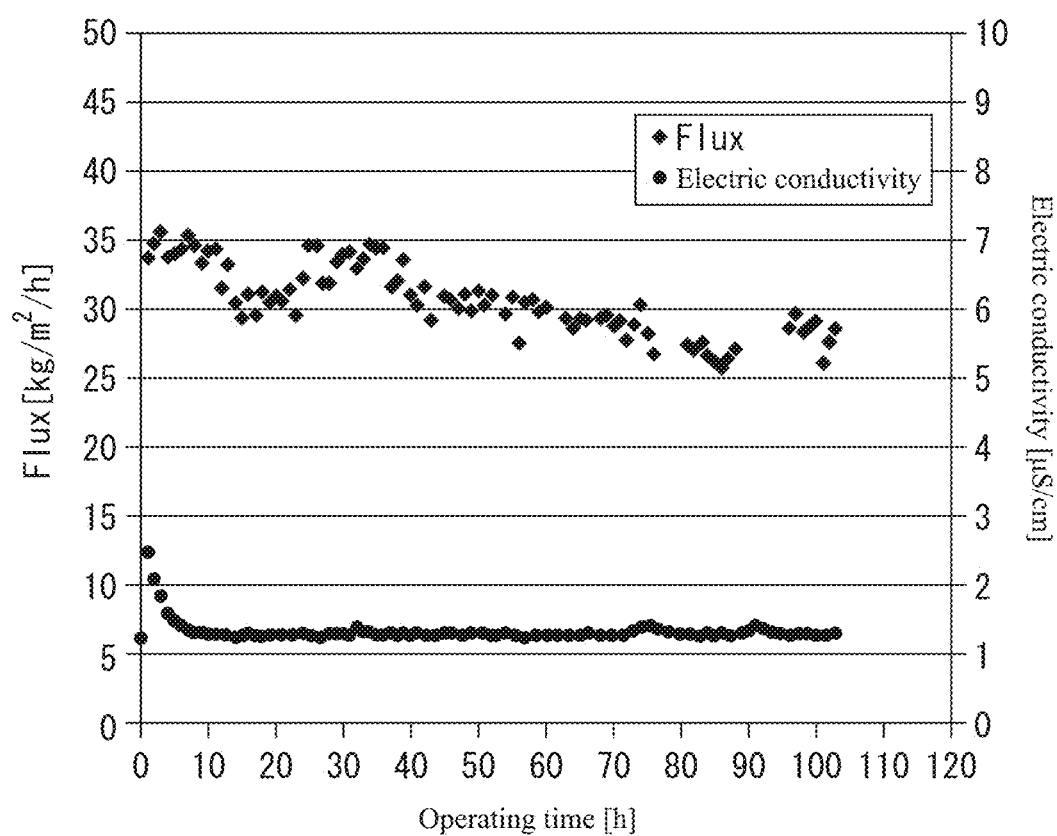
FIG. 17 is a graph showing time-dependent change in the electric conductivity and flux of purified water for membrane distillation carried out in Example 1, under "2. Membrane with medium pore diameter (average pore diameter: 0.15 to 0.20 μm) and high contact angle)(≥90°)".

The electric conductivity of the purified water and the time-dependent change in flux for the membrane distillation carried out in Example 1 are shown in the form of a graph in FIG. 17.

The flux immediately after the start of membrane distillation was 35 kg/m²/h. The electric conductivity of the purified water during 103 hours after starting varied within a range of 1.0 to 2.5 μS/cm, and no wetting was observed. The wetting time in Example 1 was longer than 103 hours. The water production volume upon elapse of 103 hours was about 17.0 kg.

Example 2

Membrane distillation was carried out in the same manner as Example 1, except that hollow fiber membranes having the physical properties listed in Table 1 were used.

Comparative Example 1

Membrane distillation was carried out following the method according to (3) above, using 35 hollow fiber membranes each made of polyvinylidene fluoride and having an outer diameter of 1.22 mm, an inner diameter of 0.66 mm, a membrane thickness of 280 μm, a void percentage of 71.5%, an average pore diameter of 0.27 μm, a maximum pore diameter of 0.33 μm, an inner surface open area percentage of 28%, an outer surface open area percentage of 12% and an air permeability coefficient of $9.6 \times 10^{-7}$ m³/(m²·sec·Pa), based on the methods for measuring the membrane physical properties in (1) above.

TABLE 7

| | Example 1 | Example 2 | Example 3 | Comp. Example 1 | Comp. Example 2 | Comp. Example 3 | Comp. Example 4 |
| --- | --- | --- | --- | --- | --- | --- | --- |
| Average pore diameter [μm] | 0.27 | 0.60 | 0.27 | 0.19 | 0.18 | 0.19 | 0.18 |
| Pore diameter distribution standard deviation [μm] | ≤0.05 | ≤0.05 | ≤0.05 | ≤0.05 | ≤0.05 | ≤0.05 | ≤0.05 |
| Membrane thickness [μm] | 280 | 400 | 280 | 285 | 285 | 450 | 285 |
| Surface open area ratio [%] | 28 (inner), 12 (outer) | 24 (inner), 22 (outer) | 28 (inner), 12 (outer) | 21 (inner), 21 (outer) | 20 (inner), 20 (outer) | 23 (inner), 15 (outer) | 20 (inner), 20 (outer) |
| Void percentage [%] | 71.5 | 73 | 71.5 | 81 | — | — | — |
| Air permeability coefficient [m³/(m²·sec·Pa)] | $9.6 \times 10^{-7}$ | $2.2 \times 10^{-6}$ | $9.6 \times 10^{-7}$ | $7.1 \times 10^{-7}$ | — | — | — |
| Tensile strength [kgf/cm²] | 89.8 | — | 89.8 | 43.9 | — | — | — |
| Flux [kg/m²/h] | 49 | 58 | 42 | 33 | 32 | 30 | 22 |

TABLE 8

| Solute | Concentration |
| --- | --- |
| Calcium chloride dihydrate | 0.3 g/L |
| Potassium carbonate | 0.1 g/L |
| Magnesium chloride hexahydrate | 0.6 g/L |
| Potassium silicate | 1.0 g/L |
| Strontium chloride hexahydrate | 0.1 g/L |

The flux immediately after the start of membrane distillation was 51 kg/m²/h. The electric conductivity of the purified water for 5 hours after starting varied in a range of about 0.8 to 1.8 μS/cm. The electric conductivity after elapse of 6.7 hours increased to about 20 μS/cm, and wetting was observed. The wetting time in Comparative Example 1 was 6.7 hours, and the water production volume was approximately 1.6 kg.

Comparative Example 2

Membrane distillation was carried out in the same manner as Comparative Example 2, except that hollow fiber membranes having the physical properties listed in Table 1 were used.

Reference Example 1

Membrane distillation was carried out in the same manner as Comparative Example 1, except that 3191 g of simulated coal bed methane waste water having the composition shown in Table 2 was used as the raw water, and the test was conducted without supplementing the raw water volume that was reduced by membrane distillation. After 7 hours of operation, the flux during 7 hours was 28 to 47 kg/m²/h, the electric conductivity of the purified water varied in a range of 1.5 to 2.7 μS/cm, and no wetting was observed. After 7 hours, the raw water decreased to 406 g, and therefore 7.9-fold concentration was possible.

The physical properties of the membranes obtained in Examples 1 and 2 and Comparative Examples 1 and 2 and the results of the membrane distillation are shown in Table 1.

understanding that this embodiment is in no way limited by the Examples. The measuring methods for hydrophobic porous hollow fiber membranes are described below, and the porous membranes may be measured with reference to these measuring methods.

(1) Measurement of Physical Properties of Porous Membranes (Weight-Average Molecular Weight)

The weight-average molecular weight of the hydrophobic polymer was measured by GPC, using a gel permeation chromatography (GPC) apparatus (HLC-8220GPC by Tosoh Corp., columns: one KF-606M by Shodex (6.0 mm ID×15 cm)+one KF-601 by Shodex (6.0 mm ID×15 cm)). The hydrophobic polymer was dissolved in an organic solvent such as N-methylpyrrolidone or dimethylformamide to a concentration of 1.0 mg/mL, and filtrate filtered by a 0.45 micron filter (Chromatdisk 25N by GL Sciences Inc.) was used as the GPC sample. A calibration curve was drawn using polymethyl methacrylate, and the weight-average molecular weight of the sample was calculated in terms of equivalent molecular weight.

(Outer Diameter, Inner Diameter, Membrane Thickness)

The outer diameters and inner diameters of the hydrophobic porous hollow fiber membranes were measured by thinly slicing them with a razor in the direction perpendicular to the lengthwise direction of the hollow fiber membranes, and using a microscope to determine the outer diameters and inner diameters of the cross-sections. The membrane thickness (mm) was determined as the membrane thickness (μm) calculated from the following formula (1) based on arithmetic mean.

TABLE 9

| | Example 1 | Example 2 | Comp. Example 1 | Comp. Example 2 |
|---|---|---|---|---|
| Membrane | Hollow fiber membrane | Hollow fiber membrane | Hollow fiber membrane | Hollow fiber membrane |
| Material | Polyethylene | Polyethylene | Polyvinylidene fluoride | Polyvinylidene fluoride |
| Average pore diameter [μm] | 0.19 | 0.19 | 0.27 | 0.60 |
| Pore diameter distribution standard deviation [μm] | ≤0.05 | ≤0.05 | ≤0.05 | ≤0.05 |
| Membrane thickness [μm] | 285 | 450 | 280 | 400 |
| Surface open area ratio [%] | 21 (inner), 21 (outer) | 23 (inner), 15 (outer) | 28 (inner), 12 (outer) | 24 (inner), 22 (outer) |
| Void percentage [%] | 81 | — | 71.5 | 73 |
| Contact angle with purified water [°] | ≥90 | ≥90 | <90 | <90 |
| Air permeability coefficient [m³/(m² · sec · Pa)] | $7.1 \times 10^{-7}$ | — | $9.6 \times 10^{-7}$ | $2.2 \times 10^{-6}$ |
| Tensile strength [kgf/cm²] | 43.9 | — | 89.8 | — |
| Membrane area [m²] | 0.005 | 0.005 | 0.005 | 0.005 |
| Flux [kg/m²/h] | 33 | 30 | 49 | 58 |
| Wetting time [h] | 103 | 30 | 6.7 | 0.1 |
| Water production volume [kg] | 17.0 | 4.5 | 1.6 | 0.0 |

TABLE 10

| Solute | Concentration |
|---|---|
| Calcium chloride dihydrate | 0.3 g/L |
| Potassium carbonate | 0.1 g/L |
| Magnesium chloride hexahydrate | 0.6 g/L |
| Potassium silicate | 1.0 g/L |
| Strontium chloride hexahydrate | 0.1 g/L |
| Sodium chloride | 62.0 g/L |
| Sodium hydrogencarbonate | 24.0 g/L |

[3. Membrane with Small Pore Diameter (Maximum Pore Diameter: ≤0.25 μm, Thick Film (≥60 μm)]

Examples concretely illustrating the construction and effect of the invention will now be described, with the

[Mathematical Formula 8]

$$\text{Membrane thickness [mm]} = (\text{Outer diameter [mm]} + \text{inner diameter [mm]})/2 \quad (1)$$

(Void Percentage)

A hydrophobic porous hollow fiber membrane was cut to a fixed length using a razor, an electronic scale was used to measure the weight of the hollow fibers, and the void percentage was calculated from the following formula (2).

[Mathematical Formula 9]

$$\text{Void percentage[\%]} = 100 - \{(\text{Hollow fiber weight[g]} \times 100)/(\text{polymer density[g/cm}^3] \times ((\text{outer diameter [cm]}/2)^2 - (\text{inner diameter[cm]}/2)^2) \times 3.14 \times \text{length [cm]})\} \quad (2)$$

(Maximum Pore Diameter)

The maximum pore diameter of the hollow fiber porous membranes was measured using the bubble point method. One end of a porous hollow fiber membrane with a length of 8 cm was closed off, and a nitrogen gas supply line was connected to the other end via a pressure gauge. After supplying nitrogen gas in this state to exchange the line interior with nitrogen, the porous hollow fiber membrane was immersed in ethanol. The porous hollow fiber membrane was immersed while applying slight pressure with nitrogen so that the ethanol did not flow back through the line. With the porous hollow fiber membrane immersed, the nitrogen gas pressure was slowly increased and the pressure P at which nitrogen gas bubbles began to stably emerge from the porous hollow fiber membrane was recorded. The maximum pore diameter of the porous hollow fiber membrane was calculated from this using the following formula (I), where d is the maximum pore diameter and γ is the surface tension.

$$d = C_1 \gamma / P \quad (I)$$

In formula (I), $C_1$ is a constant. With ethanol as the immersion liquid, the maximum pore diameter d (μm) was calculated by substituting P (kg/cm$^2$) in the above formula, with $C_1\gamma=0.632$ (kg/cm).

(Average Pore Diameter)

The average pore diameter of each hollow fiber membrane was measured under the following conditions, by the method of measuring average pore diameter described in ASTM:F316-86 (also known as the "half-dry method").

The average pore diameter of a hydrophobic porous hollow fiber membrane of approximately 10 cm length was measured, under standard measuring conditions of 25° C. with a pressurization rate of 0.01 atm/sec, using ethanol as the liquid.

The average pore diameter can generally be determined by the following formula:

Average pore diameter[μm]=2860×(surface tension of solution used[dyne/cm])/(half-dry air pressure[Pa]), but since the surface tension of ethanol at 25° C. is 21.97 dyne/cm, the average pore diameter was determined by the following formula:

Average pore diameter[μm]=62834/(half-dry air pressure[Pa]).

(Surface Open Area Ratio)

The open area percentage on the inner surface and outer surface of the hydrophobic porous hollow fiber membrane was determined by processing the electron micrograph image of the hydrophobic porous hollow fiber membrane with image analysis processing software. An electron micrograph was taken of the membrane surface of the hydrophobic porous hollow fiber membrane using a scanning electron microscope (S-4700 by Hitachi, Ltd.) at a magnification of 5000 to 50,000×, with an acceleration voltage of 1.0 kV and secondary electron detection conditions. The processing is conducted using ImageJ (free software) as the image analysis software. The taken image was accentuated and filtered to show the hole portions as black regions and the non-hole portions as white regions. The holes were then counted, with polymer chains of the lower layer being counted as non-hole portions when the polymer chains were visible in the hole interiors. The surface open area ratio was calculated by the following formula.

Surface open area ratio[%]=100×(sum of hole areas)/(measured region area)

{In the formula, the (measured region area) is the (sum of the areas of each of the holes)+(sum of the areas of each of the non-hole portions). Holes on the boundary of the measured region were not excluded.}

(Pore Size Distribution)

For measurement of the surface open area ratio, the pore diameters of an arbitrary number of hole portions in an electron micrograph of the membrane surface were measured, to obtain the pore size distribution and standard deviation.

(Tensile Strength)

The hollow fiber membranes were subjected to a tensile test according to JIS K7127, using a Model TG-1 kN™ tensile tester by Minebea Co., Ltd., under conditions with a temperature of 23±2° C. and a pull rate of 200 mm/min. The tensile strength (kgf/cm$^2$) was calculated as the strength of the hollow fiber membrane during fracture divided by the cross-sectional area of the hollow fiber membrane before the test.

(Air Permeability Coefficient)

The hydrophobic porous hollow fiber membrane was anchored in a resin container, the outside of the hollow fibers was pressurized with air at a fixed pressure, the amount of air permeating through the inside of the hollow fibers was measured using a soap film flowmeter, and the air permeability coefficient was calculated by the following formula (3):

[Mathematical Formula 10]

$$\text{Air permeability coefficient}[m^3/m^2\cdot\text{sec}\cdot Pa]=\text{Air permeation amount}[m^3/\text{sec}]/(\text{membrane area}[m^2]\times\text{pressure}[Pa]) \quad (3)$$

(2) Preparation of Wetting Test Solution (750 mg/L Sodium Dodecyl Sulfate Aqueous Solution)

After adding 2.00 L of distilled water to 1.50 g of sodium dodecyl sulfate (194-14041, product of Wako Corp.), they were mixed and dissolved with a magnetic stirrer to prepare 750 mg/L of a sodium dodecyl sulfate aqueous solution. When the electric conductivity of the obtained aqueous solution was measured using a Model "DS-52" benchtop conductivity meter by Horiba, Ltd., the electric conductivity was found to be about 180 μS/cm at 25° C.

(3) Carrying Out Membrane Distillation

An evaporation module (evaporator) having an arbitrary number of hydrophobic porous hollow fiber membranes housed in a polysulfone case with an inner diameter of 20 mm, and a recovery module (recovery unit) having 20 stainless steel tubes each with an inner diameter of 1 mm and an outer diameter of 2 mm, housed in a case of the same shape as used for the evaporator, were connected as shown in FIG. 16(b). The shortest distance between the outer surfaces of the hydrophobic porous hollow fiber membranes in the evaporator and the outer surfaces of the stainless steel tubes in the recovery unit was 30 mm.

The outlet of the recovery unit was connected to the permeated water container by tubing and the gas phase unit of the permeated water container was connected to the pressure reduction device via the pressure regulator, whereby the pressure in the system was adjusted.

Next, 1.4 L of the 750 mg/L sodium dodecyl sulfate aqueous solution prepared in (2) above, adjusted to a temperature of 65° C., was circulated as raw water through the hollow interiors of the hydrophobic porous hollow fiber membranes of the evaporator at a flow rate of 600 mL/min. Cooling water at 30° C. was circulated through the hollow interiors of the stainless steel tubes of the recovery unit at a flow rate of 1,000 mL/min. The pressure in the module system was adjusted to 10 kPa, and membrane distillation was carried out. The volume of the raw water reduced by membrane distillation was routinely supplemented by adding distilled water. Throughout the test, the volume reduction was kept to within 100 mL.

(4) Measurement (Electric Conductivity of Purified Water)

The electric conductivity of the purified water obtained by membrane distillation was measured using a Model "DS-52" benchtop conductivity meter by Horiba, Ltd.

(Wetting Time)

Wetting was defined as the electric conductivity of the purified water exceeding 3% of the electric conductivity of the 750 mg/L sodium dodecyl sulfate aqueous solution (5.4 μS/cm), and the time from the start of membrane distillation until wetting was recorded as the wetting time.

Membrane distillation was carried out, the weight of distilled water (i.e. permeated water) recovered in the permeated water container was measured using an electronic scale, and the flux was calculated by the following formula:

Flux=Weight of water obtained by1 hour of operation÷membrane area÷1 hour.

(Water Production Volume)

The permeated water volume of the membrane distillation water housed in the permeated water container was measured with an electronic scale, and the permeated water volume from the start of membrane distillation until wetting was recorded as the water production volume.

Example 1

Membrane distillation was carried out following the method according to (3) above, using 33 hollow fiber membranes each made of polyethylene and having an outer diameter of 1.25 mm, an inner diameter of 0.68 mm, a membrane thickness of 285 μm, a void percentage of 81%, a maximum pore diameter of 0.24 μm, an inner surface open area percentage of 21%, an outer surface open area percentage of 21% and an air permeability coefficient of $7.1 \times 10^{-7}$ $m^3/(m^2 \cdot sec \cdot Pa)$, based on the methods for measuring the membrane physical properties in (1) above.

Figure 18:
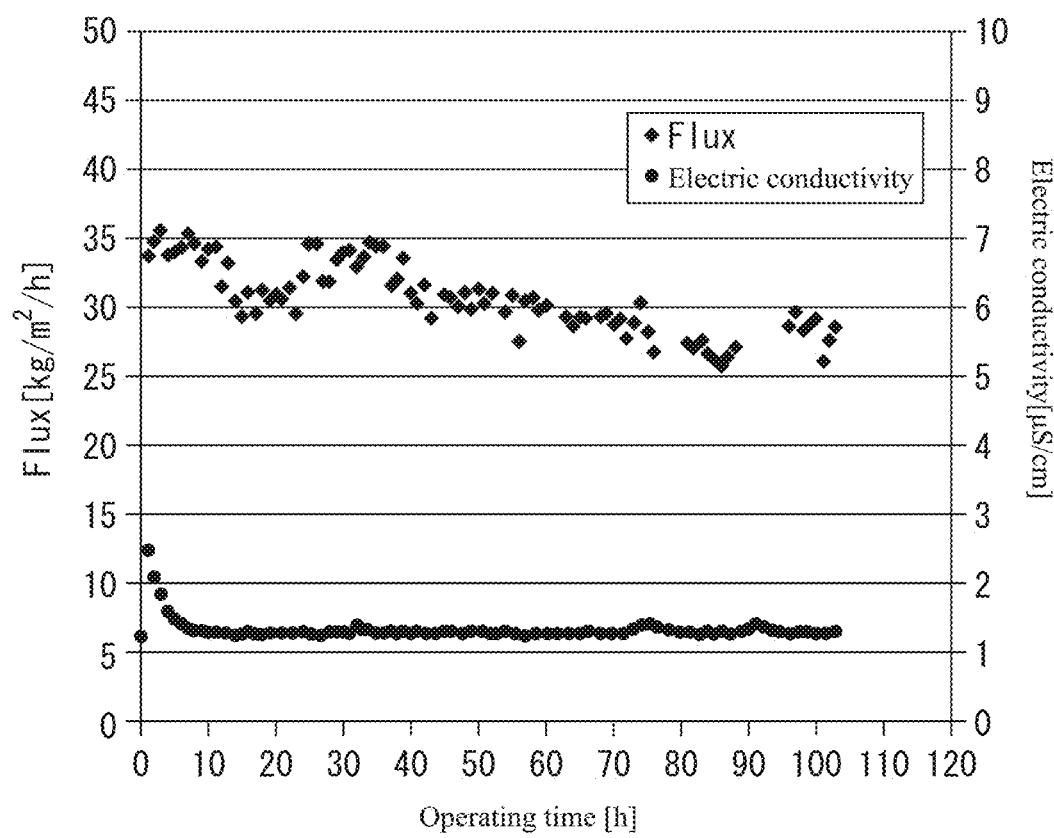
FIG. 18 is a graph showing time-dependent change in the electric conductivity and flux of purified water for membrane distillation carried out in Example 1, under "3. Small pore diameter (maximum pore diameter: ≤0.25 μm), thick film (≥60 μm) membrane".

The electric conductivity of the purified water and the time-dependent change in flux for the membrane distillation carried out in Example 1 are shown in the form of a graph in FIG. 18.

The flux immediately after the start of membrane distillation was 35 kg/m²/h. The electric conductivity of the purified water during 103 hours after starting varied within a range of 1.0 to 2.5 μS/cm, and no wetting was observed. The wetting time in Example 1 was longer than 103 hours. The water production volume upon elapse of 103 hours was about 17.0 kg.

Example 2

Membrane distillation was carried out in the same manner as Example 1, except that hollow fiber membranes having the physical properties listed in Table 1 were used.

Comparative Example 1

Membrane distillation was carried out following the method according to (3) above, using 35 hollow fiber membranes each made of polyvinylidene fluoride and having an outer diameter of 1.22 mm, an inner diameter of 0.66 mm, a membrane thickness of 280 μm, a void percentage of 71.5%, a maximum pore diameter of 0.33 μm, an inner surface open area percentage of 28%, an outer surface open area percentage of 12% and an air permeability coefficient of $9.6 \times 10^{-7}$ $m^3/(m^2 \cdot sec \cdot Pa)$, based on the methods for measuring the membrane physical properties in (1) above.

The flux immediately after the start of membrane distillation was 51 kg/m²/h. The electric conductivity of the purified water for 5 hours after starting varied in a range of about 0.8 to 1.8 μS/cm. The electric conductivity after elapse of 5 hours increased to about 20 μS/cm, and wetting was observed. The wetting time in Comparative Example 1 was 6.7 hours, and the water production volume was approximately 1.6 kg.

Comparative Example 2

Membrane distillation was carried out in the same manner as Comparative Example 2, except that hollow fiber membranes having the physical properties listed in Table 1 were used.

Reference Example 1

Membrane distillation was carried out in the same manner as Comparative Example 1, except that 3191 g of simulated coal bed methane waste water having the composition shown in Table 2 was used as the raw water, and the test was conducted without supplementing the raw water volume that was reduced by membrane distillation. After 7 hours of operation, the flux during 7 hours was 28 to 47 kg/m²/h, the electric conductivity of the purified water varied in a range of 1.5 to 2.7 μS/cm, and no wetting was observed. After 7 hours, the raw water decreased to 406 g, so that 7.9-fold concentration was possible.

The physical properties of the membranes obtained in Examples 1 and 2 and Comparative Examples 1 and 2 and the results of the membrane distillation are shown in Table 1.

TABLE 11

|  | Example 1 | Example 2 | Comp. Example 1 | Comp. Example 2 |
|---|---|---|---|---|
| Membrane | Hollow fiber membrane | Hollow fiber membrane | Hollow fiber membrane | Hollow fiber membrane |
| Material | Polyethylene | Polyethylene | Polyvinylidene fluoride | Polyvinylidene fluoride |
| Maximum pore diameter [μm] | 0.24 | 0.21 | 0.33 | 0.79 |
| Average pore diameter [μm] | 0.19 | 0.18 | 0.27 | 0.60 |
| Pore diameter distribution standard deviation [μm] | ≤0.05 | ≤0.05 | ≤0.05 | ≤0.05 |

TABLE 11-continued

|  | Example 1 | Example 2 | Comp. Example 1 | Comp. Example 2 |
|---|---|---|---|---|
| Membrane thickness [μm] | 285 | 285 | 280 | 400 |
| Surface open area ratio [%] | 21 (inner), 21 (outer) | 20 (inner), 20 (outer) | 28 (inner), 12 (outer) | 24 (inner), 22 (outer) |
| Void percentage [%] | 81 | — | 71.5 | 73 |
| Air permeability coefficient [m$^3$/(m$^2$ · sec · Pa)] | 7.1 × 10$^{-7}$ | — | 9.6 × 10$^{-7}$ | 2.2 × 10$^{-6}$ |
| Tensile strength [kgf/cm$^2$] | 43.9 | — | 89.8 | — |
| Membrane area [m$^2$] | 0.005 | 0.005 | 0.005 | 0.005 |
| Flux [kg/m$^2$/h] | 33 | 32 | 49 | 58 |
| Wetting time [h] | 103 | 30 | 6.7 | 0.1 |
| Water production volume [kg] | 17.0 | 4.8 | 1.6 | 0.0 |

TABLE 12

| Solute | Concentration |
|---|---|
| Calcium chloride dihydrate | 0.3 g/L |
| Potassium carbonate | 0.1 g/L |
| Magnesium chloride hexahydrate | 0.6 g/L |
| Potassium silicate | 1.0 g/L |
| Strontium chloride hexahydrate | 0.1 g/L |
| Sodium chloride | 62.0 g/L |
| Sodium hydrogencarbonate | 24.0 g/L |

[Water-Repellent Agent Coating]

Examples concretely illustrating the construction and effect of the invention will now be described, with the understanding that this embodiment is not in any way limited by the Examples. The measuring methods used for the hydrophobic porous hollow fiber membranes are described below, but the measurement of the hydrophobic porous membranes may also be carried out only with reference to these methods.

(Outer Diameter, Inner Diameter, Membrane Thickness)

The hollow fiber membranes were thinly sliced with a razor in the direction perpendicular to their lengthwise direction, and the outer diameters and inner diameters of the cross-sections were measured using a microscope to measure the outer diameters and inner diameters of the hollow fiber membranes.

The membrane thickness (mm) of each hollow fiber membrane was calculated from the following formula (1), as the arithmetic mean.

[Mathematical Formula 11]

$$\text{Membrane thickness [mm]} = (\text{Outer diameter [mm]} + \text{inner diameter [mm]})/2 \quad (1)$$

(Void Percentage)

A hollow fiber membrane was cut to a fixed length using a razor, an electronic scale was used to measure the weight of the hollow fibers, and the void percentage of the hollow fiber membrane was calculated from the following formula (2).

[Mathematical Formula 12]

$$\text{Void percentage[\%]} = 100 - \{(\text{Hollow fiber weight[g]} \times 100)/(\text{polymer density[g/cm}^3\text{]} \times ((\text{outer diameter [cm]}/2)^2 - (\text{inner diameter[cm]}/2)^2) \times 3.14 \times \text{length [cm]})\} \quad (2)$$

(Average Pore Diameter)

The average pore diameter of each hollow fiber membrane was measured under the following conditions, based on the method of measuring average pore diameter described in ASTM:F316-86 (also known as the "half-dry method").

The average pore diameter of a hydrophobic porous hollow fiber membrane of approximately 10 cm length is measured under standard measuring conditions of 25° C. with a pressurization rate of 0.01 atm/sec, using ethanol as the liquid.

The average pore diameter of a hollow fiber membrane can generally be determined by the following formula:

$$\text{Average pore diameter[\mu m]} = 2860 \times (\text{surface tension of solution used[dyne/cm]})/(\text{half-dry air pressure[Pa]}),$$

but since the surface tension of ethanol at 25° C. is 21.97 dyne/cm, the average pore diameter was determined by the following formula:

$$\text{Average pore diameter[\mu m]} = 62834/(\text{half-dry air pressure[Pa]}).$$

(Surface Opening Ratio)

The opening ratios on the inner surfaces and outer surfaces of the hydrophobic porous hollow fiber membranes were obtained by processing electron micrograph images of the hollow fiber membranes using image analysis processing software, according to the method described in PTL 1. An electron micrograph was taken of the membrane surface of the hydrophobic porous hollow fiber membrane using a scanning electron microscope (S-4700 by Hitachi, Ltd.) at a magnification of 5000 to 50,000×, with an acceleration voltage of 1.0 kV and secondary electron detection conditions. The processing was conducted using ImageJ (free software) as the image analysis software. The taken image was accentuated and filtered to show the hole portions as black regions and the non-hole portions as white regions. The holes were then counted, with polymer chains of the lower layer being counted as non-hole portions when the polymer chains were visible in the hole interiors. The surface opening ratio was calculated by the following formula.

$$\text{Surface opening ratio[\%]} = 100 \times (\text{sum of hole areas})/(\text{measured region area})$$

{In the formula, the (measured region area) is the (sum of the areas of each of the holes)+(sum of the areas of each of the non-hole portions). Holes on the boundary of the measured region were not excluded.}

(X-Ray Photoelectron Spectroscopy)

An X-ray Photoelectron Spectroscopy (XPS) measuring apparatus was used for XPS observation of the inner surface of the membrane. The relative element concentration measured by XPS was evaluated on the following scale:

G (Good): Satisfying the following (1) or (2):

(1) A C1s spectrum for $CF_3$-and for coupled $CF_2$—$CF_2$ is observed in the range of 295 to 291 eV, with a carbon element ratio for $CF_3$-and coupled $CF_2$—$CF_2$ of 0.5% or higher and lower than 15.0% among the total elements, and an O1s spectrum is observed in the range of 530 to 538 eV, with an oxygen element ratio of 1.0% or higher and lower than 15.0% among the total elements;

(2) A Si2p spectrum is observed in the range of 100 to 102 eV, with a silicon element ratio of 3.0% or higher and lower than 20.0% among the total elements, and an O1s spectrum is observed in the range of 530 to 538 eV, with an oxygen element ratio of 5.0% or higher and lower than 25.0% among the total elements.

P (Poor): Not satisfying (1) or (2) above.

(Water Contact Angle)

The water contact angle of the membrane was measured by the droplet method.

(Flux Measurement)

Membrane distillation was carried out, the weight of distilled water (i.e. permeated water) recovered in the permeated water container was measured using an electronic scale, and the flux was calculated by the following formula:

Flux=Weight of water obtained by1 hour of operation÷membrane area÷1 hour.

(Measurement of Salts)

The obtained hydrophobic porous hollow fiber membranes were used to prepare a membrane distillation device having the construction shown in FIG. 19. The membrane distillation device comprises a pencil-type module for membrane distillation, shown at left in the photograph of FIG. 20.

Membrane distillation operation was conducted under conditions of 3.5% brine, 65° C. temperature, 1 hour, 600 ml/min brine, 1000 ml/min cooling water flow rate and −90 kPaG pressure, and the flux was determined.

The pencil-type module was then removed from the membrane distillation device.

A dropper was used to inject approximately 10 ml of purified water into the pencil-type module case, and the module was manually shaken for rinsing of the module interior.

An electronic scale was used to measure the weight of the water in the module after rinsing. An conductivity meter was used to measure the conductivity of the water after rinsing.

Table 3 shows the results of calculating the amount of salt in the rinse solution from the weight and conductivity of the water after rinsing the module with purified water, and determining the weight of salt (mg/50 cm$^2$/hr) adhering to the membrane surfaces.

Example 1

A Henschel mixer was used to mix 23 parts by weight of hydrophobic silica (AEROSIL-R972 by Nippon Aerosil Co., Ltd.) having a mean primary particle size of 0.016 μm and an area-to-weight ratio of 110 m$^2$/g, 31 parts by weight of di(2-ethylhexyl) phthalate (DOP) and 6 parts by weight of dibutyl phthalate (DBP), and then 40 parts by weight of polyvinylidene fluoride (PVDF, KF polymer #1000, product of Kureha Corp.) with a weight-average molecular weight of 290,000 was added, and mixing was resumed with the Henschel mixer. The mixture was further mixed with a twin-screw kneading extruder to obtain pellets.

The obtained pellets were melt kneaded with a twin-screw kneading extruder (240° C.), and the melt was extruded from a melt extrusion ring hole with an outer diameter of 1.75 mm and an inner diameter of 0.92 mm, on the extrusion surface of a hollow fiber forming spinner mounted on the extrusion port inside the head (235° C.) at the tip of the extruder. At the same time, nitrogen gas, as hollow section-forming fluid, was discharged through a circular hole for hollow section-forming fluid discharge having a diameter of 0.6 mm, on the inside of the melt extrusion ring hole, for injection into the hollow section of the hollow fiber-like extrusion. The hollow fiber-like extrusion was introduced into a water bath (20° C.) with a run distance of 4.5 cm, and wound up at a speed of 14 m/min.

The obtained hollow fiber material was immersed in methylene chloride for extraction removal of the DOP and DBP in the hollow fiber material, and was dried. After then immersing it in a 50 weight % ethyl alcohol aqueous solution, it was immersed in a 15 weight % sodium hydroxide aqueous solution at 60° C. for 1 hour, for extraction removal of the hydrophobic silica in the hollow fiber material. It was then rinsed and dried to obtain a polyvinylidene fluoride porous hollow fiber membrane. A stretching procedure was carried out, in which tension was applied to a 50 cm length of the obtained polyvinylidene fluoride porous hollow fiber membrane in a 25° C. atmosphere to stretch it to a length of 100 cm, and the tension was then released.

An alcohol solution of dimethylpolysiloxane was used as a water-repellent agent for hydrophobic coating of the obtained porous hollow fiber membrane, to obtain a hydrophobic porous hollow fiber membrane. The outer diameter, inner diameter, membrane thickness, void percentage, average pore diameter and surface opening ratio of the obtained hydrophobic porous hollow fiber membrane were measured by the methods described above.

The outer diameter of the membrane was 1.23 mm, the inner diameter was 0.67 mm, the membrane thickness was 0.28 mm, the void percentage was 72%, the average pore diameter was 0.22 μm and the surface open area ratio was 27%.

Figure 20:
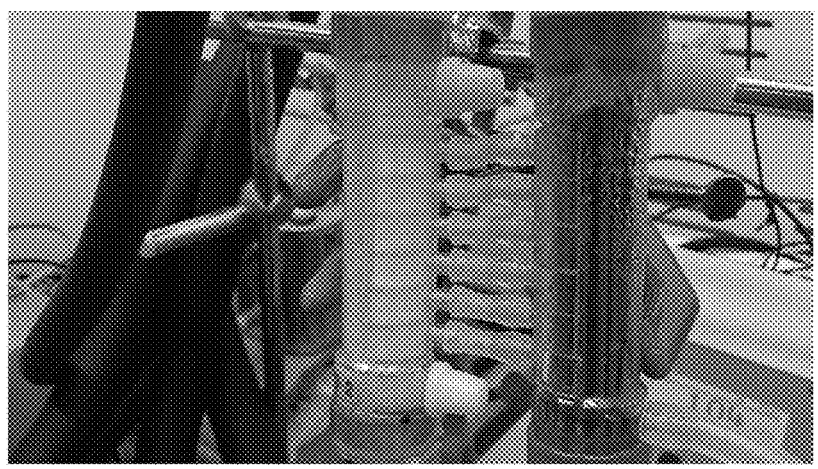
FIG. 20 is a photograph of a membrane distillation module comprising hydrophobic porous hollow fiber membranes.

Hydrophobic porous hollow fiber membranes thus obtained were used to prepare a membrane distillation device having the construction shown in FIG. 19. The membrane distillation device comprises a membrane distillation module, as shown in the photograph of FIG. 20.

High-temperature water in a treatment water tank was circulated through the hollow interiors of the hydrophobic porous hollow fiber membranes in the evaporator (first liquid phase unit) with a liquid feed pump, and as raw water passed through the hollow interiors of the hydrophobic porous hollow fiber membranes, a portion thereof permeated through the hydrophobic porous hollow fiber membranes as water vapor, migrating to the first gas phase unit.

Since the pressure reduction device maintains constant control of the pressure in the first and second gas phase units and the air gap within a range of 1 kPa or higher and no higher than the saturated vapor pressure of water at the temperature of the water to be treated, the water vapor passes through the second gas phase unit via the air gap and migrates to the condensing unit. The permeated water vapor is condensed on the condenser tubes of the condensing unit by the cooling water running through the hollow interiors of the condenser tubes in the condensing unit, yielding distilled water. The cooling water flows from the cooling tank through the condenser tubes by a liquid feed pump. The distilled water condensed on the condenser tubes is collected in the permeated water container as permeated water.

The pressure in the first and second gas phase units and the air gap is monitored by a pressure gauge. As shown in FIG. 19, the pressure gauge may be provided in the pressure regulator, in which case the pressure in the first and second gas phase units and the air gap may be monitored as the total pressure in the first and second gas phase units, the air gap, the permeated water container, the pressure regulator and the tubing connecting them.

Membrane distillation was carried out under the following evaluation conditions, and the flux and membrane surface salt precipitation were measured.

[Water-Repellent Agent Coating Conditions]

A membrane module with a membrane area of 50 cm² was used.

The side at one end of the membrane module was sealed, and 5 ml of water-repellent agent containing dimethylpolysiloxane was injected from the other end using a syringe, through the insides of the hollow fiber membranes. After removing the water-repellent agent that exuded from the membranes, dry air was flowed through the insides of the hollow fiber membranes to dry them. The procedure was repeated twice.

[Evaluation Conditions]
Raw water: 3.5% brine
Circulating flow rate in membranes: 600 ml/min
Raw water temperature (module entrance): 65° C.
Cooling water temperature: 15° C.
Cooling water circulating flow rate: 1000 ml/min Examples 2 and 3, Comparative Examples 2 and 3

The same procedure was carried out as in Example 1, except for changing the type of water-repellent agent, the coating method or the coating amount as shown in Table 1, Table 2 and below, to obtain hydrophobic porous hollow fiber membranes, and membrane distillation was carried out. Comparative Examples 2 and 3, which differed from Example 1 in the degree and amount of coating with the water-repellent agent, confirmed that the water-repellent agent had not reached to the surfaces of the through-holes of the hydrophobic porous hollow fiber membranes.

Example 2

A solution of TEFLON® AF2400 by Mitsui-DuPont Fluorochemicals Co. Ltd. was used, diluted to a polymer concentration of 0.5 wt % with Novec7300 by 3M Corp.

Example 3

The water-repellent agent FS-392B by Fluorotechnology Co. was used.

Comparative Example 2

A solution of FS-392B was used, diluted 7-fold by weight with Novec7300.

Comparative Example 3

The water-repellent agent used in Example 1 was used for coating 4 times by the same method as Example 1.

Comparative Example 1

Membrane distillation was carried out with the porous hollow fiber membranes obtained in Example 1, without hydrophobic coating with a water-repellent agent.

Example 4

Membrane distillation was carried out by the same procedure as Example 3, except that simulated coal bed methane waste water having the composition shown in Table 4 was used as the water to be treated. The flux was 46 kg/m²/hr, and the salt precipitation on the membrane surfaces was 0.36 mg/50 cm²/hr.

Figure 21:
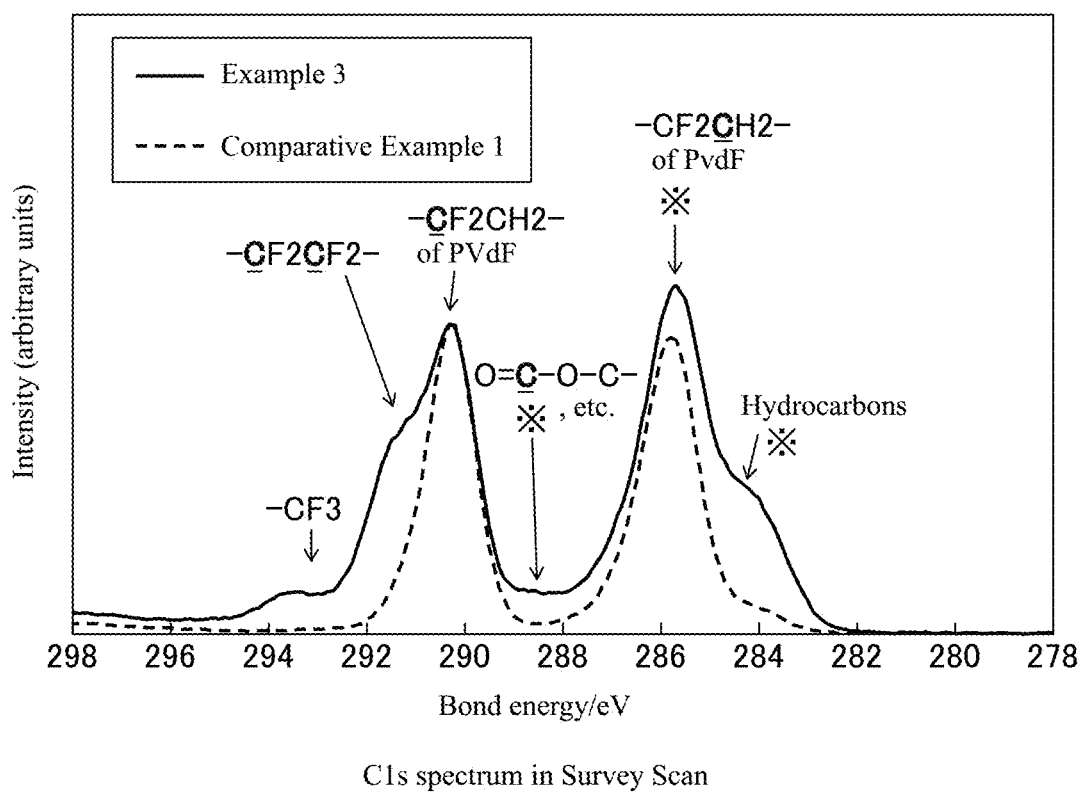
FIG. 21 is a graph showing C1s spectra, and their assignments, for the surfaces of the porous membranes obtained in Example 3 and Comparative Example 1, as "water-repellent agent-coated films", based on X-ray Photoelectron Spectroscopy (XPS) measurement.

The proportions of each element in the membranes of Examples 1 to 3 and Comparative Examples 1 to 3 as determined by XPS are shown in Table 1, the evaluation results for the membranes are shown in Table 2, and the evaluation results for membrane distillation are shown in Table 3. C1s spectra and their assignments, for the inner surfaces of the membranes obtained in Example 3 and Comparative Example 1, as obtained by X-ray Photoelectron Spectroscopy (XPS), are shown in FIG. 21.

TABLE 13

Detected elements and relative element concentrations

| | Relative element concentration (atomic %) | | | | | |
|---|---|---|---|---|---|---|
| | [C] Total | | | | [O] | [Si] |
| Sample | 295 to 291 eV | 291 to 289 eV | 285 to 283 eV | [F] | 538-530 eV | 102-100 eV |
| Example 1 | | 52.0 | | 16.0 | 19.0 | 13.0 |
| Inner surface | | 23.0 | 29.0 | | | |
| Example 2 | | 43.0 | | 54.0 | 3.0 | |
| Inner surface | 8.3 | 25.1 | 9.6 | | | |
| Example 3 | | 49 | | 46 | 5.1 | 0.3 |
| Inner surface | 2.2 | 40 | 6.0 | | | |
| Comp. Example 1 | | 52.0 | | 48.0 | | 0.6 |
| Inner surface | | 50.0 | 1.9 | | | |
| Comp. Example 2 | | 50.2 | | 49.0 | | 0.8 |
| Inner surface | 0.3 | 48.5 | 1.4 | | | |
| Comp. Example 3 | | 38.2 | | 11.8 | 28.5 | 21.5 |
| Inner surface | | 16.7 | 21.5 | | | |

TABLE 14

Membrane evaluation results

| | Water-repellent agent | XPS spectrum (F/O element) | XPS spectrum (Si/O element) | Used of hollow fiber membrane | Water contact angle (°) |
|---|---|---|---|---|---|
| Example 1 | Dimethylpolysiloxane/alcohol | — | G | Used | 100 |
| Example 2 | TEFLON AF/Novec7300 | G | — | Used | 110 |
| Example 3 | FLUOROSURF FS392B | G | — | Used | 120 |
| Comp. Example 1 (untreated) | — | — | — | Used | 93 |
| Comp. Example 2 | FLUOROSURF FS392B/Novec7300 | P (deficiency) | — | Used | 104 |
| Comp. Example 3 | Dimethylpolysiloxane/alcohol | — | P (excess) | Used | 106 |

As shown in Table 2, the carbon element ratio for $CF_3$-and coupled $CF_2$—$CF_2$ among the total elements was less than 0.5% with the membranes obtained in Comparative Example 2, while the silicon element ratio among the total elements was 20.0% with the membranes obtained in Comparative Example 3.

TABLE 15

Membrane distillation evaluation results

| | FLUX kg/L/hr. | Salt precipitation on membrane surface mg/50 cm²/hr. |
|---|---|---|
| Example 1 | 41 | 0.10 |
| Example 2 | 48 | 0.05 |
| Example 3 | 49 | 0.04 |
| Comp. Example 1 | 50 | 0.51 |
| Comp. Example 2 | 44 | 0.49 |
| Comp. Example 3 | 15 | 0.11 |

TABLE 16

| Solute | Concentration |
|---|---|
| Calcium chloride dihydrate | 0.3 g/L |
| Potassium carbonate | 0.1 g/L |
| Magnesium chloride hexahydrate | 0.6 g/L |
| Potassium silicate | 1.0 g/L |
| Strontium chloride hexahydrate | 0.1 g/L |
| Sodium chloride | 62.0 g/L |
| Sodium hydrogencarbonate | 24.0 g/L |

INDUSTRIAL APPLICABILITY

[Internal Pressure Membrane Module]

The membrane distillation module of the invention can maintain high permeated water production efficiency while also maintaining high flux, and has high treatment efficiency per unit volume of the module, and it can therefore be suitably used as a main member in a low-cost and high-efficiency membrane distillation device.

[End-Supplied External Pressure Membrane Module]

The membrane module for membrane distillation and membrane distillation device of the invention can maintain high permeated water production efficiency while also maintaining high flux, and has high treatment efficiency per unit volume of the module, and it can therefore be suitably used as a main member in a low-cost and high-efficiency membrane distillation device.

[External Pressure Membrane Module]

The membrane module for membrane distillation and membrane distillation device of the invention can maintain high permeated water production efficiency while also maintaining high flux, and has high treatment efficiency per unit volume of the module, and it can therefore be suitably used as a main member in a low-cost and high-efficiency membrane distillation device.

[1. Membrane with Large Pore Diameter (Average Pore Diameter: $\geq 0.20$ μm), Large Void Percentage ($\geq 60\%$) and Uniform Pore Size Distribution]

The porous membrane for membrane distillation and the membrane distillation device of the invention can be suitably used in the field of water treatment, and may be used in a purified water-supply system. They may also be used in a solute concentration system.

[2. Membrane with Medium Pore Diameter (Average Pore Diameter: 0.15 to 0.20 μm) and High Contact Angle)($\geq 90°$)]

The porous membrane for membrane distillation and the membrane distillation device of the invention can be suitably used in the field of water treatment, and may be used in a purified water-supply system. They may also be used in a solute concentration system.

[3. Membrane with small pore diameter (maximum pore diameter: $\leq 0.25$ μm, thick film ($\geq 60$ μm)]

The porous membrane for membrane distillation and the membrane distillation device of the invention can be suitably used in the field of water treatment, and may be used in a purified water-supply system. They may also be used in a solute concentration system.

[Water-Repellent Agent Coating]

The water-repellent agent-coated porous membrane and membrane distillation device of the invention can be suitably used in the field of water treatment, and may be used in a purified water-supply system. They may also be used in a solute concentration system.

REFERENCE SIGNS LIST

[Internal Pressure Membrane Distillation Device]

1 Membrane module for membrane distillation

2 Cylindrical container

3 Hydrophobic porous hollow fiber membrane

4, 4' Anchoring resin 5, 5' Head section
6 Side wall opening
7, 7' Water flow opening
8 Condenser
10 Membrane distillation device
Dh Inner diameter of cylindrical container
Db Reduced diameter of bundle of plurality of hollow fiber membranes
Df Circle diameter when cross-section of water flow opening is circular
[End-Supplied External Pressure Membrane Distillation Device]
1 Membrane distillation device
10 Membrane module for membrane distillation
11 Hydrophobic porous hollow fiber membrane
12 Container
121 Body portion
122 Treatment water introduction unit
123 Steam extractor
124a, 124b Treatment water extractor
13a, 13b Anchoring resin
14a, 14b Head section
15 Spacer
20 Condensing unit
21 Cooling unit
22 Head section
30 Treatment water tank
40 Pump
50 Water collection container
60 Pressure regulator
70 Pressure reduction device
[External Pressure Membrane Distillation Device]
1 Membrane distillation device
10, 20, 30 Membrane module for membrane distillation
11 Hydrophobic porous hollow fiber membrane
12a, 12b Head section
13, 23, 33 Container
14a, 14b Anchoring resin
15a, 15b Spacer
16 Stirring mechanism
17, 27, 37 Heating section
20 Condensing unit
30 Water collection container
40 Pressure regulator
50 Pressure reduction device
[1. Membrane with Large Pore Diameter (Average Pore Diameter: ≥0.20 μm), Large Void Percentage (≥60%) and Uniform Pore Size Distribution]
1 Hydrophobic porous membrane
2 Condenser
[2. Membrane with Medium Pore Diameter (Average Pore Diameter: 0.15 to 0.20 μm) and High Contact Angle)(≥90°]
1 Hydrophobic porous membrane
2 Condenser
[3. Membrane with Small Pore Diameter (Maximum Pore Diameter: ≥0.25 μm, Thick Film (≥60 μm)]
1 Hydrophobic porous membrane
2 Condenser
[Water-Repellent Agent-Coated Film]
1 Hydrophobic porous membrane
2 Condenser

The invention claimed is:
1. A membrane distillation device comprising:
a membrane distillation module that includes a plurality of hydrophobic porous hollow fibers, and
a condenser for condensation of steam extracted from the membrane distillation module,
wherein:
an average pore diameter of the plurality of hydrophobic porous hollow fibers is from 0.01 μm to 1 μm,
a filling ratio of the plurality of hydrophobic porous hollow fibers of the membrane distillation module is from 10% to 80%,
a water-repellent agent is on at least a surface of the plurality of hydrophobic porous hollow fibers, and
when at least a portion of (i) one surface of a hydrophobic porous hollow fiber membrane formed of the plurality of hydrophobic porous hollow fibers, (ii) the other surface of the hydrophobic porous hollow fiber membrane or (iii) the surfaces of the through-holes of the hydrophobic porous hollow fiber membrane, is measured by X-ray Photoelectron Spectroscopy (XPS), the water-repellent agent satisfies (A) or (B):
(A) the water-repellent agent has: (i) a C1s spectrum for $CF_3$- and $CF_2$—$CF_2$ coupled states observed in a range of 295 to 291 eV, (ii) a carbon element ratio of $CF_3$- and $CF_2$—$CF_2$ coupled states of 0.5% or higher and lower than 15.0% among a total elements, (iii) an O1s spectrum observed in a range of 530 to 538 eV, and (iv) an oxygen element ratio of 1.0% or higher and lower than 15.0% among the total elements; or
(B) the water-repellent agent has: (i) a Si2p spectrum observed in a range of 100 to 102 eV, (ii) a silicon element ratio of 3.0% or higher and lower than 20.0% among the total elements, (iii) an O1s spectrum observed in a range of 530 to 538 eV, and (iv) an oxygen element ratio of 5.0% or higher and lower than 25.0% among the total elements, and
membrane distillation conditions are 1 kPa or higher and no higher than a saturated vapor pressure of water at a temperature of water to be treated.
2. The membrane distillation device according to claim 1, wherein the plurality of hydrophobic porous hollow fibers form a bundle of a plurality of hydrophobic porous hollow fiber membranes, the bundle having an effective length of 60 mm to 2000 mm and being disposed in a cylindrical container of the membrane distillation module, and
a ratio Db/Dh between a reduced diameter Db of the bundle and an inner diameter Dh of the cylindrical container is no greater than 0.85.
3. The membrane distillation device according to claim 2, wherein:
the bundle has a first gap between the plurality of hydrophobic porous hollow fiber membranes and a second gap between the bundle and the cylindrical container, both of the first and second gaps being filled with an anchoring resin at ends of the plurality of hydrophobic porous hollow fiber membranes, an inside and an outside of each hydrophobic porous hollow fiber membrane being anchored to an inside of the cylindrical container so as to allow communication only through the through-holes of each hydrophobic porous hollow fiber membrane,
an upper end face and a lower end face of the bundle are open,
a head section having a water flow opening is fitted at each of an upper end and a lower end of the cylindrical container, communicating with the inside of each hydrophobic porous hollow fiber membrane,
on a side wall of the cylindrical container, there is at least one side wall opening on the outside of each hydro- phobic porous hollow fiber membrane and the inside of the cylindrical container for extraction of steam, and the at least one side wall opening is at a location from the upper end of the cylindrical container which is 10% to 90% of the full length from the lower end to the upper end of the cylindrical container, and a total cross-sectional area of the at least one side wall opening is from 0.2% to 2% of a total of an inner surface areas of each of the hydrophobic porous hollow fiber membranes.

4. The membrane distillation device according to claim 1, further comprising a plurality of hydrophobic porous hollow fiber membranes having a maximum pore diameter of no greater than 0.25 μm, a standard deviation of a pore size distribution of no greater than 0.05 μm, a membrane thickness of 60 μm or greater, and a surface open area ratio on at least one surface of the plurality of hydrophobic porous hollow fiber membranes of 20% or higher.

5. The membrane distillation device according to claim 4, wherein the plurality of hydrophobic porous hollow fiber membranes include at least one resin selected from the group consisting of polysulfone, polyethersulfone, polyvinylidene fluoride, polytetrafluoroethylene, ethylene-ethylene tetrafluoride copolymer, and polyolefins.

6. The membrane distillation device according to claim 5, wherein the resin is a polyolefin, and the polyolefin includes at least one of polyethylene and polypropylene.

7. The membrane distillation device according to claim 1, wherein a contact angle of the hydrophobic porous hollow fiber membrane with purified water is from 95° to 150° when measured by dropping 2 μL of purified water onto the hydrophobic porous hollow fiber membrane.

8. The membrane distillation device according to claim 1, wherein when the membrane distillation module is subjected to a process for 1 hour, the process including contacting 3.5 weight % brine at 65° C., as raw water, with one surface of each of the hydrophobic porous hollow fiber membranes formed of the plurality of hydrophobic porous hollow fibers at a linear speed of 100 cm/sec, and subjecting the other surface of each of the hydrophobic porous hollow fiber membranes to pressure reduction at −90 kPa, an amount of permeated water permeating the hydrophobic porous hollow fiber membranes is from 20 kg·L$^{-1}$·hr$^{-1}$ to 80 kg·L$^{-1}$·hr$^{-1}$, and a weight of salt solute precipitating on the other surface of the hydrophobic porous hollow fiber membrane is from 0.002 mg·cm$^{-2}$·hr$^{-1}$ to 0.4 mg·cm$^{-2}$·hr$^{-1}$.

9. A method of obtaining permeated water using the membrane distillation device according to claim 1, the method comprising continuously operating the membrane distillation device, and removing substances that clog a plurality of the hydrophobic porous hollow fiber membranes formed of the hydrophobic porous hollow fibers by contacting the plurality of hydrophobic porous hollow fiber membranes with a solvent at a flow rate of 0.1 to 20 m/sec or contacting the plurality of hydrophobic porous hollow fiber membranes with a liquid in which the substances are soluble.

10. The membrane distillation device according to claim 1, wherein:

the plurality of hydrophobic porous hollow fibers form a bundle of a plurality of hydrophobic porous hollow fiber membranes, the bundle having first gaps between the plurality of hydrophobic porous hollow fiber membranes and second gaps between the bundle and the cylindrical container, both of the first and second gaps being filled with an anchoring resin at ends of the plurality of hydrophobic porous hollow fiber membranes, an inside and an outside of each hydrophobic porous hollow fiber membrane being anchored to an inside of the cylindrical container so as to allow communication only through the through-holes of each hydrophobic porous hollow fiber membrane, an upper end face and a lower end face of the bundle are open, a head section having a water flow opening is fitted at each of an upper end and a lower end of the cylindrical container, communicating with the inside of each hydrophobic porous hollow fiber membrane, on a side wall of the cylindrical container, there is at least one side wall opening on the outside of each hydrophobic porous hollow fiber membrane and the inside of the cylindrical container for extraction of steam present, and the at least one side wall opening is at a location from the upper end of the cylindrical container which is 10% to 90% of the full length from the lower end to the upper end of the cylindrical container, and a total cross-sectional area of the at least one side wall opening is from 0.2% to 2% of a total of an inner surface areas of each of the hydrophobic porous hollow fiber membranes.

11. The membrane distillation device according to claim 4, wherein a contact angle of the hydrophobic porous hollow fiber membrane with purified water is from 95° to 150° when measured by dropping 2 μL of purified water onto the hydrophobic porous hollow fiber membrane.

12. The membrane distillation device according to claim 4, wherein when the membrane distillation module is subjected to a process for 1 hour, the process including contacting 3.5 weight % brine at 65° C. as raw water with one surface of each of the hydrophobic porous hollow fiber membranes formed of the plurality of hydrophobic porous hollow fibers at a linear speed of 100 cm/sec, and subjecting the other surface of each of the hydrophobic porous hollow fiber membranes to pressure reduction at −90 kPa, an amount of permeated water permeating the hydrophobic porous hollow fiber membranes is from 20 kg·L$^{-1}$·hr$^{-1}$ to 80 kg·L$^{-1}$·hr$^{-1}$, and a weight of salt solute precipitating on the other surface of each of the hydrophobic porous hollow fiber membranes is from b 0.002 mg·cm$^{-2}$·hr$^{-1}$ to 0.4 mg·cm$^{-2}$·hr$^{-1}$.

* * * * *